(12) United States Patent
Scott et al.

(10) Patent No.: US 7,747,572 B2
(45) Date of Patent: Jun. 29, 2010

(54) METHOD AND SYSTEM FOR SUPPLY CHAIN PRODUCT AND PROCESS DEVELOPMENT COLLABORATION

(75) Inventors: Steve Toren Scott, Yorktown, IN (US); William A. Kivett, New Palestine, IN (US); Robert A. Burdick, Westfield, IN (US); Dwight E. Funk, Muncie, IN (US); Kevin Jackson, Noblesville, IN (US); David McCauley, Greenwood, IN (US); Rebecca Ruselink, Indianapolis, IN (US); Jason Brown, Indianapolis, IN (US); Kyle Jones, Indianapolis, IN (US)

(73) Assignee: Waypoint Global II, Inc., Indianapolis, IN (US)

( * ) Notice: Subject to any disclaimer, the term of this patent is extended or adjusted under 35 U.S.C. 154(b) by 2336 days.

(21) Appl. No.: 09/802,398

(22) Filed: Mar. 9, 2001

(65) Prior Publication Data
US 2002/0052862 A1 May 2, 2002

Related U.S. Application Data

(60) Provisional application No. 60/221,422, filed on Jul. 28, 2000.

(51) Int. Cl.
*G06F 17/30* (2006.01)
(52) U.S. Cl. ............... 707/636; 707/618; 707/654; 707/694
(58) Field of Classification Search ............ 707/103, 707/2, 3, 6, 10, 618, 636, 654, 694; 705/2, 705/8, 7, 9, 1, 10; 715/733, 835; 726/1
See application file for complete search history.

(56) References Cited

U.S. PATENT DOCUMENTS

| | | | |
|---|---|---|---|
| 5,487,144 A | 1/1996 | Takahashi et al. | |
| 5,754,858 A | 5/1998 | Broman et al. | 717/1 |
| 5,765,038 A | 6/1998 | Flannery et al. | |
| 5,826,252 A | 10/1998 | Wolters, Jr. et al. | |
| 5,842,185 A | 11/1998 | Chancey et al. | 705/40 |
| 5,930,785 A | 7/1999 | Lohman et al. | |
| 5,953,707 A * | 9/1999 | Huang et al. | 705/10 |

(Continued)

OTHER PUBLICATIONS

General Motors Corporation, "GM Global APQP—Advanced Product Quality Planning." Jun. 1999.

*Primary Examiner*—Thuy N Pardo
(74) *Attorney, Agent, or Firm*—Taft Stettinius & Hollister LLP; Keith J. Swedo

(57) ABSTRACT

A method and system for supply chain product and process development collaboration. The supply chain is comprised of at least one project, each project having a part (or family of parts), a supplier of the part, and a customer. The system may include a data storage and retrieval device operably connected to a processor. The system's functions include collaboration tools and security based on the users' project roles. The method uses a methodology that ensures certain requirements are met prior to satisfying the methodology. The system and method of the present invention ensures that current, applicable methodologies are applied to a specific part and allows for collaboration between the customer and supplier during all phases of the project. Because all projects in a supply chain are present, a user can navigate throughout the supply chain. The supply chain's reporting functions permit determination of potential performance risks and the source thereof.

22 Claims, 45 Drawing Sheets

U.S. PATENT DOCUMENTS

| | | | |
|---|---|---|---|
| 5,974,395 A | 10/1999 | Bellini et al. | 705/9 |
| 6,041,303 A | 3/2000 | Mathews | |
| 6,151,582 A * | 11/2000 | Huang et al. | 705/8 |
| 6,157,915 A | 12/2000 | Bhaskaran et al. | 705/7 |
| 6,167,378 A | 12/2000 | Webber, Jr. | 705/8 |
| 6,189,019 B1 | 2/2001 | Blumer et al. | 707/513 |
| 6,222,533 B1 * | 4/2001 | Notani et al. | 715/733 |
| 6,253,206 B1 | 6/2001 | Burton et al. | |
| 6,618,733 B1 * | 9/2003 | White et al. | 707/103 Y |
| 7,155,419 B2 * | 12/2006 | Blackman et al. | 705/80 |
| 7,587,328 B2 * | 9/2009 | Kawahara et al. | 705/8 |
| 7,630,986 B1 * | 12/2009 | Herz et al. | 707/10 |
| 2002/0077850 A1 * | 6/2002 | McMenimen et al. | 705/2 |
| 2009/0254971 A1 * | 10/2009 | Herz et al. | 726/1 |

* cited by examiner

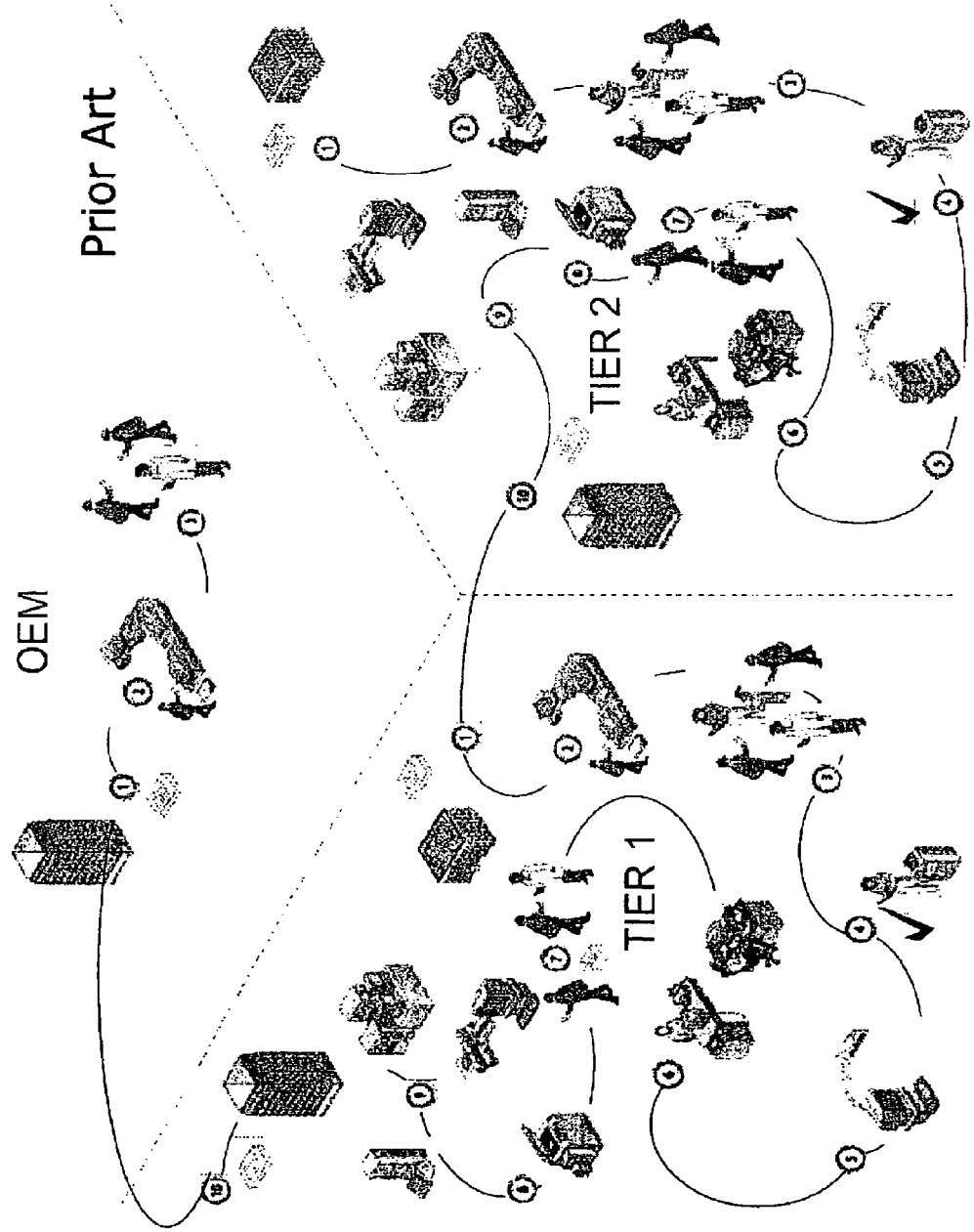
Figure: 1A

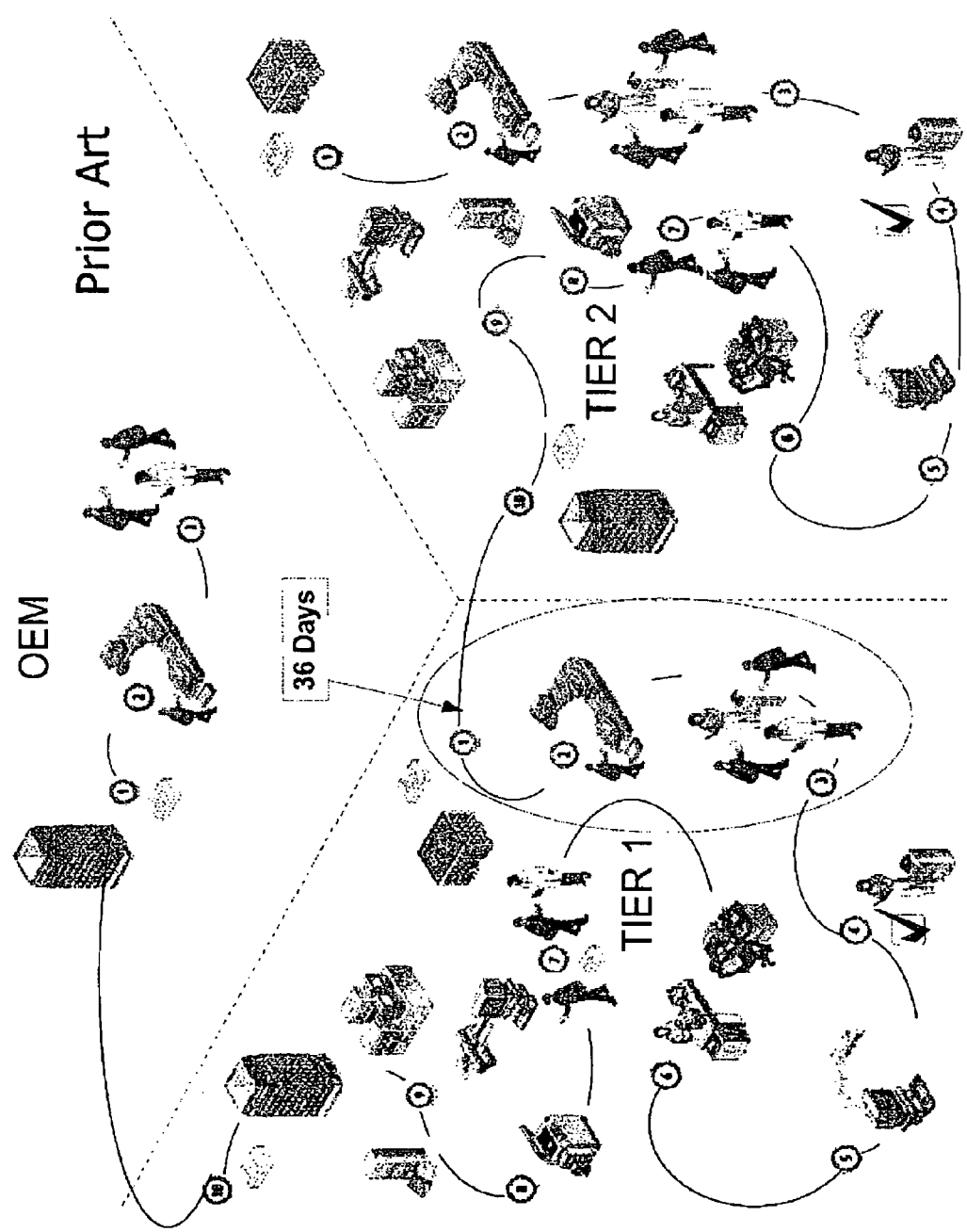
Figure: 1B

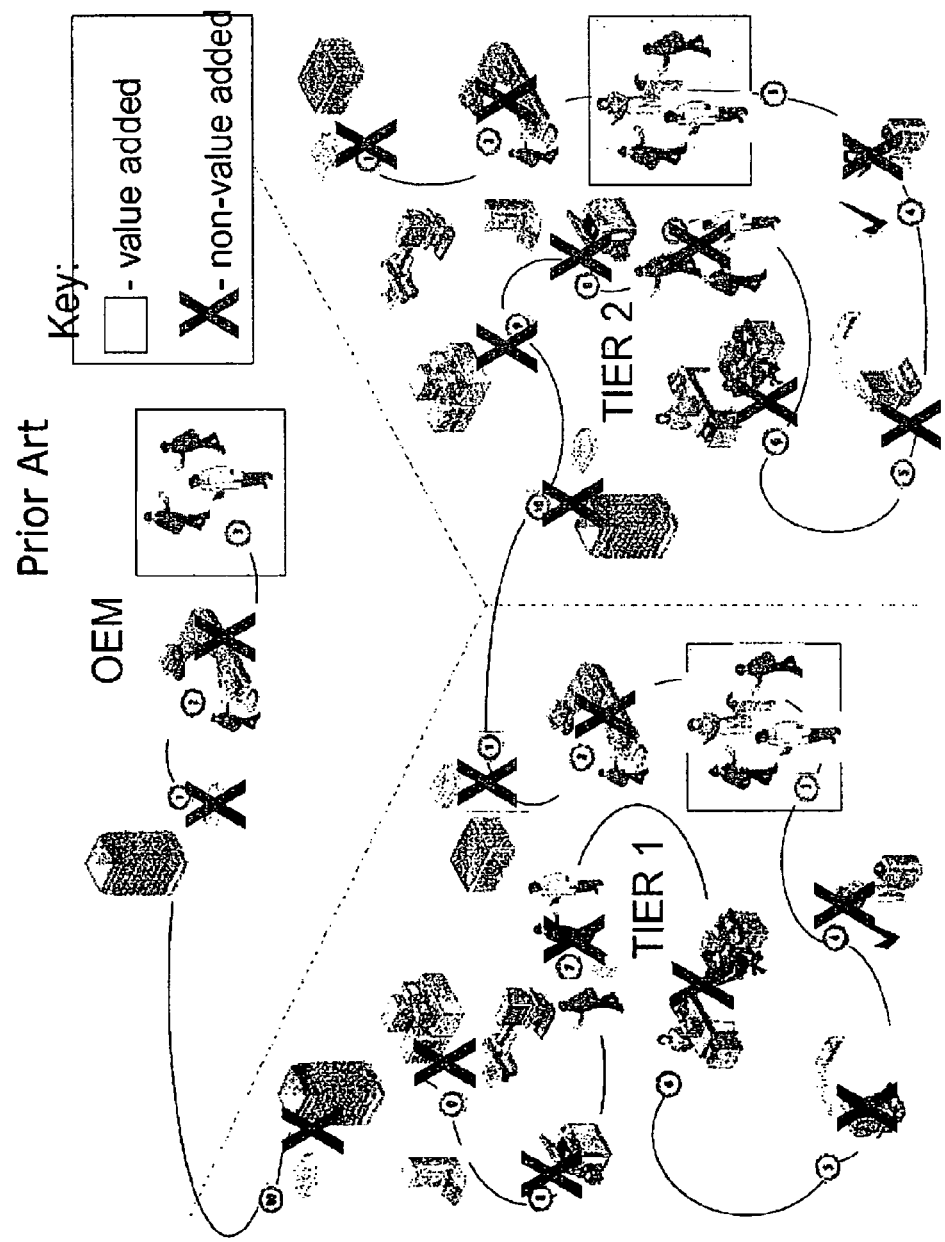
Figure: 1C

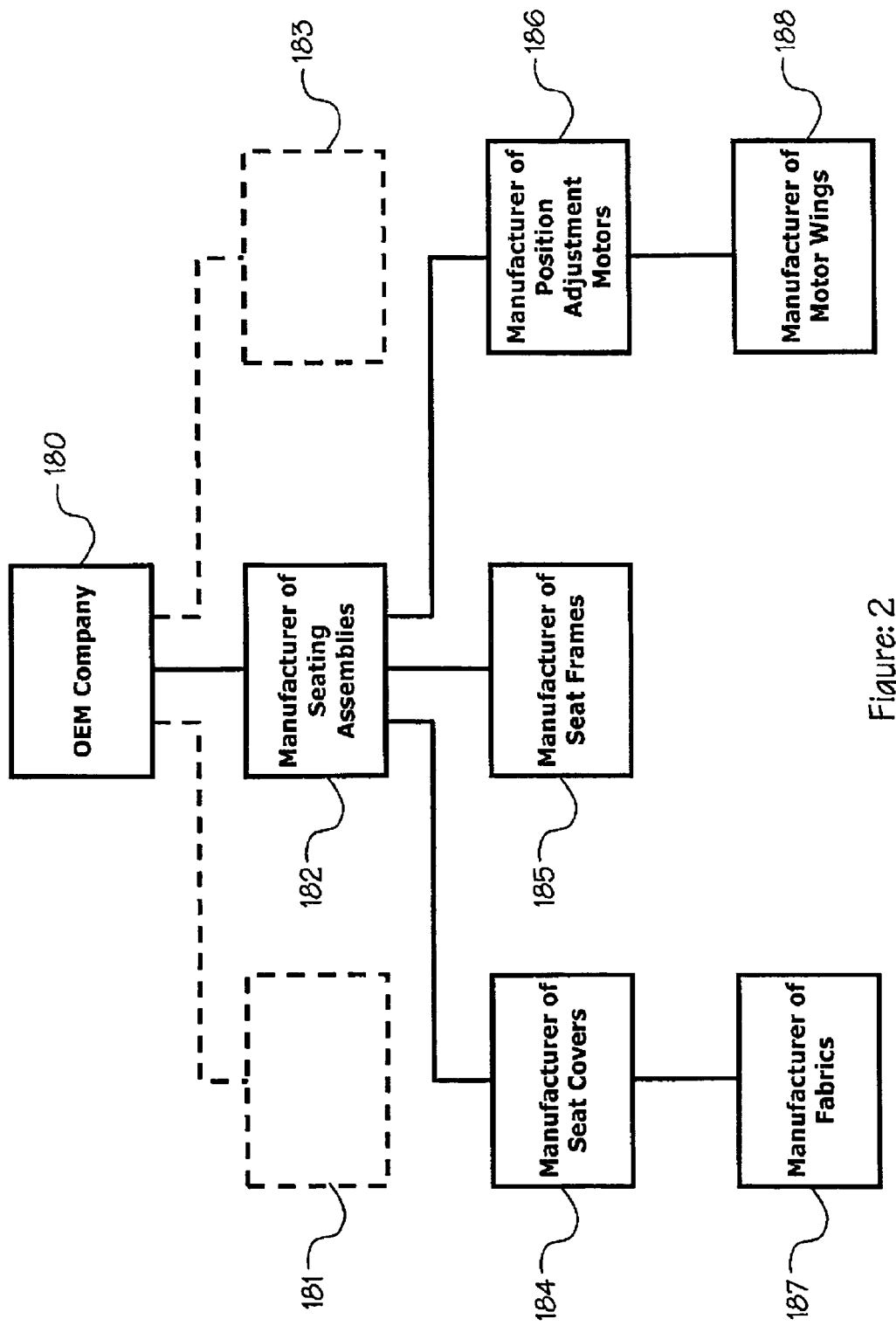
Figure: 2

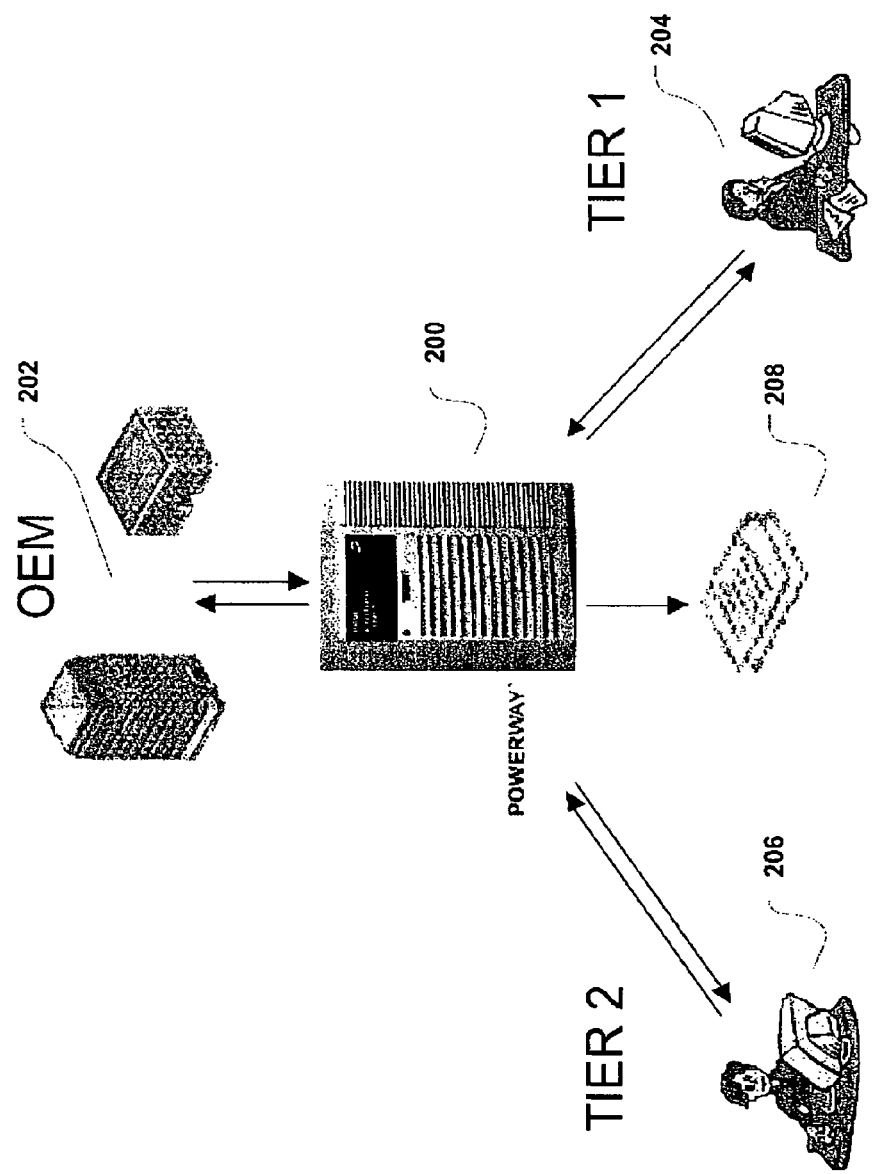
Figure: 3A

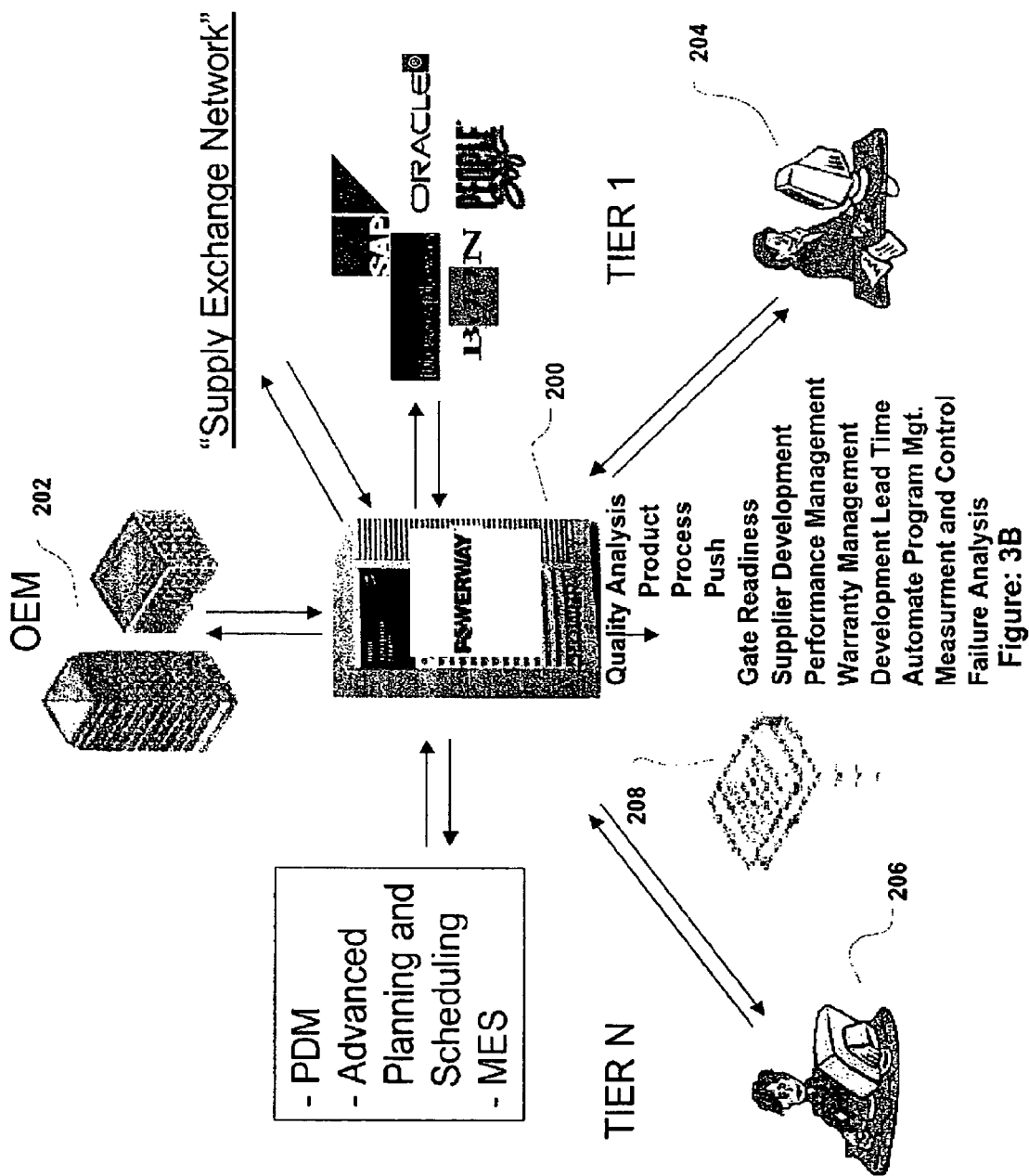

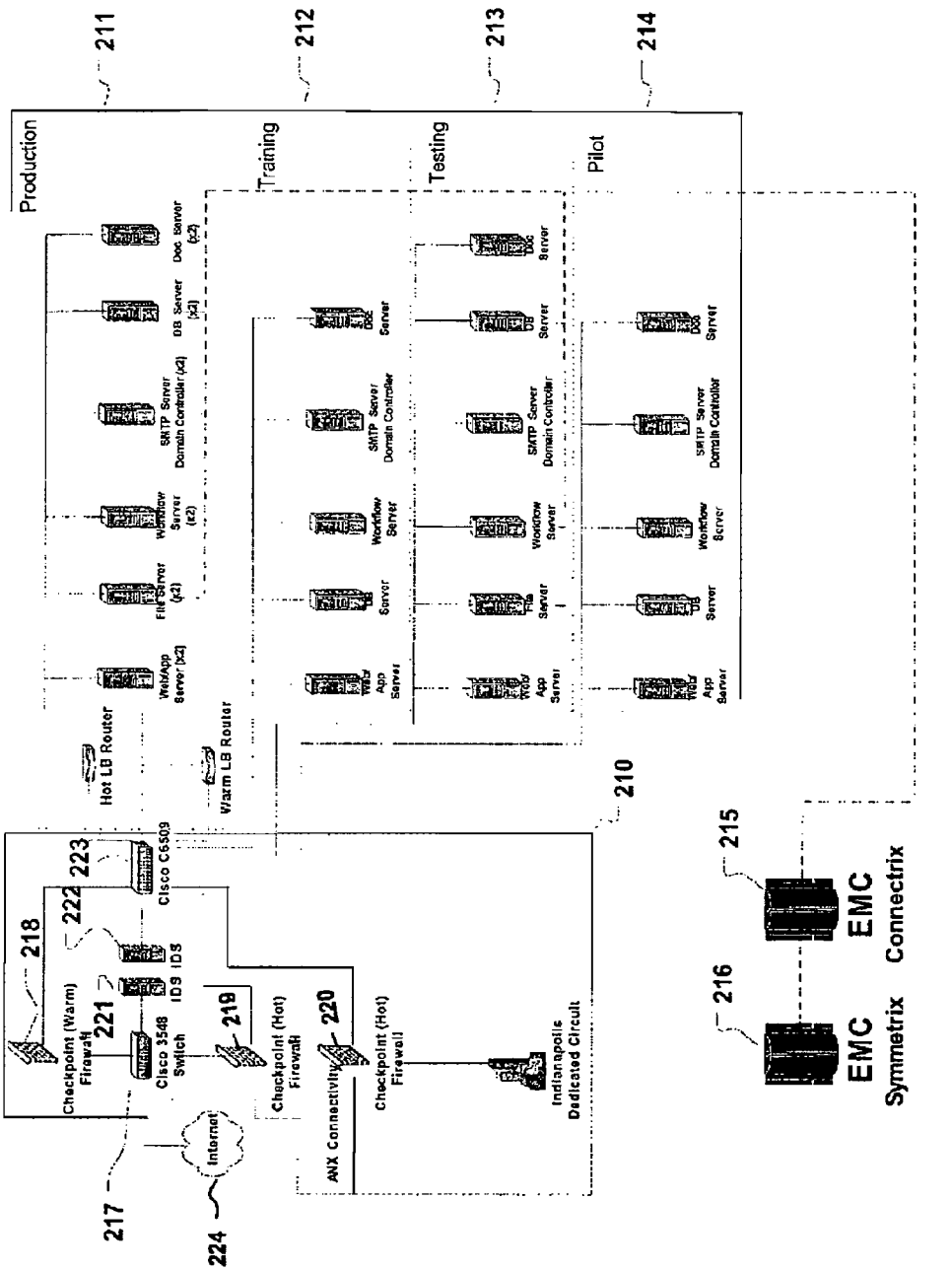
Figure: 4

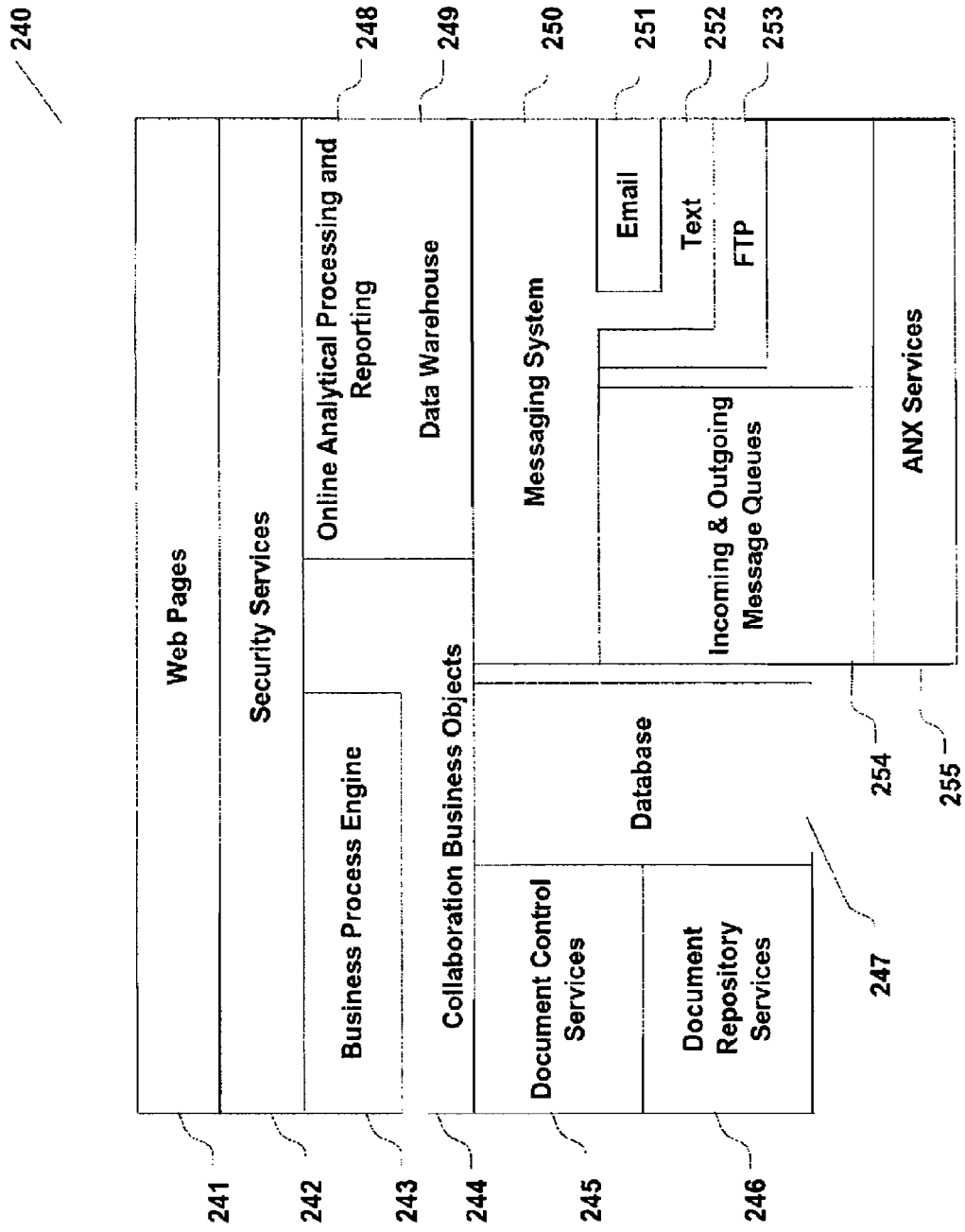
Figure: 5

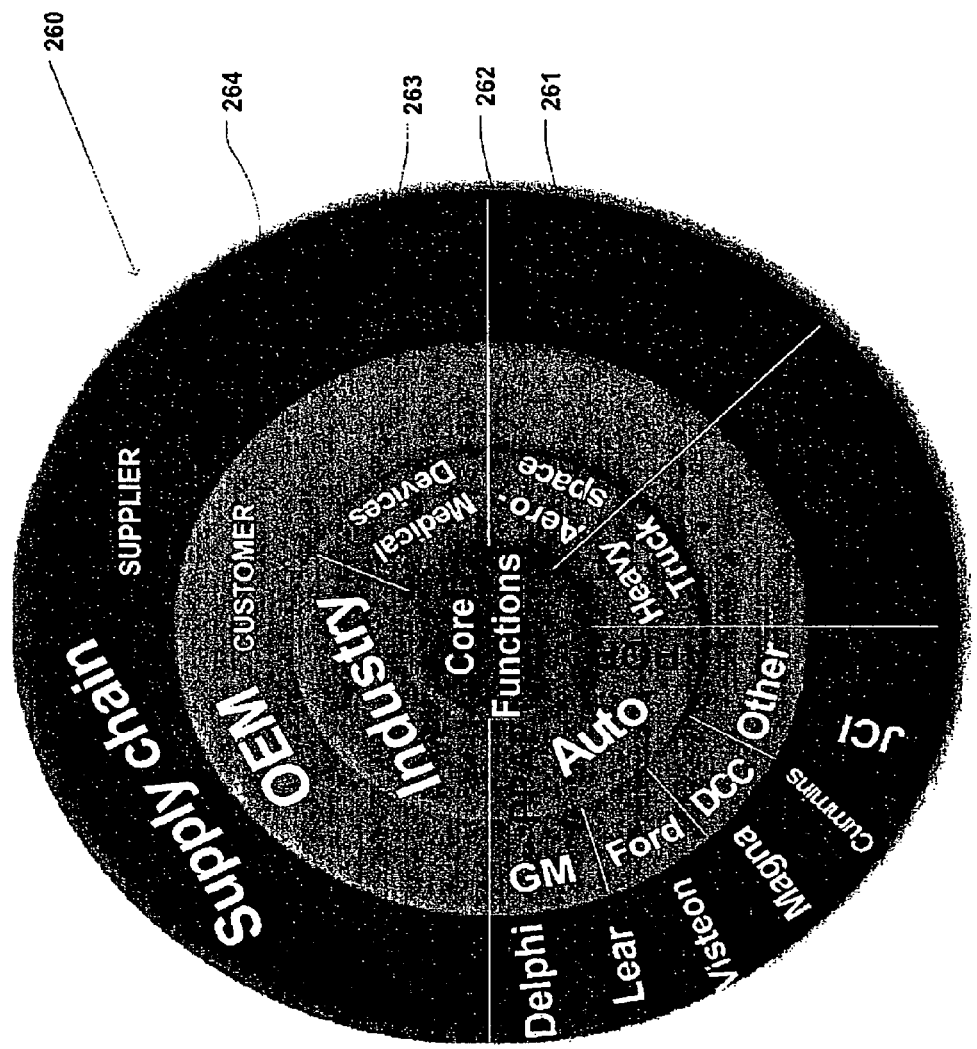
Figure: 6

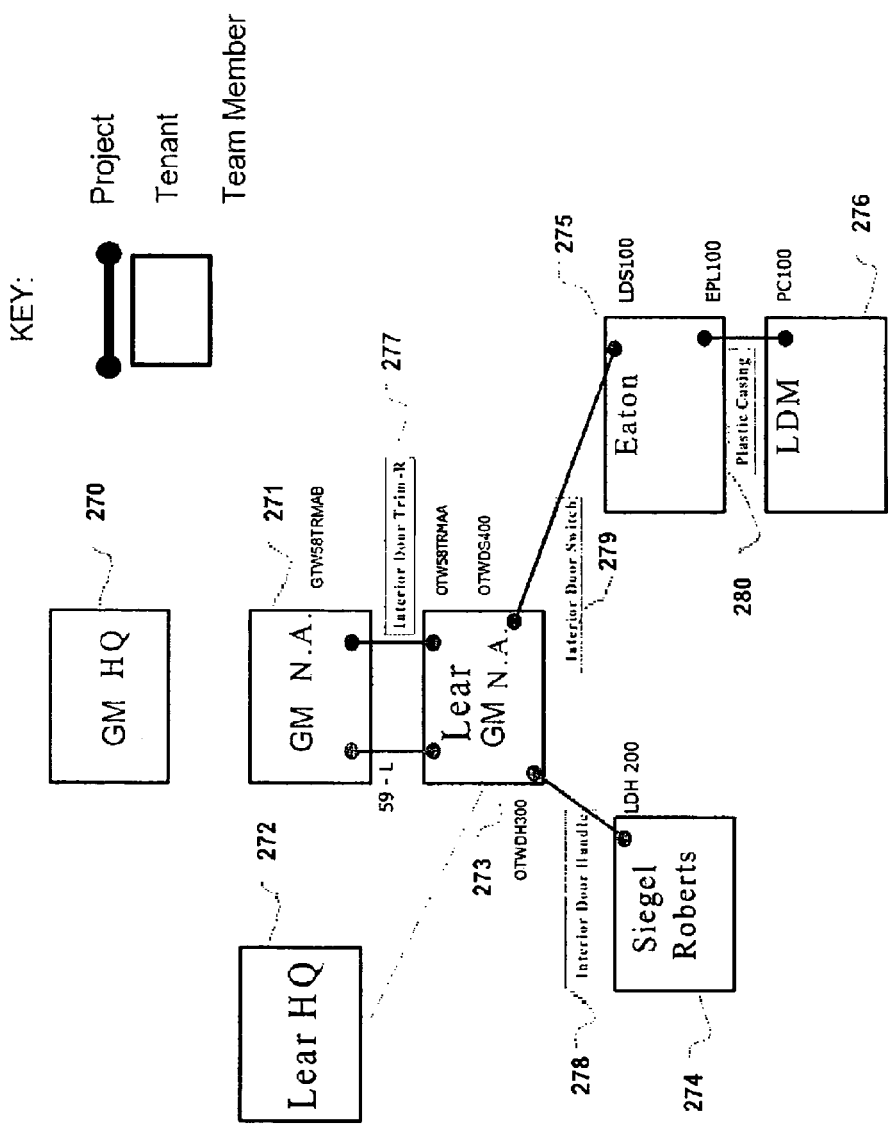
Figure: 7

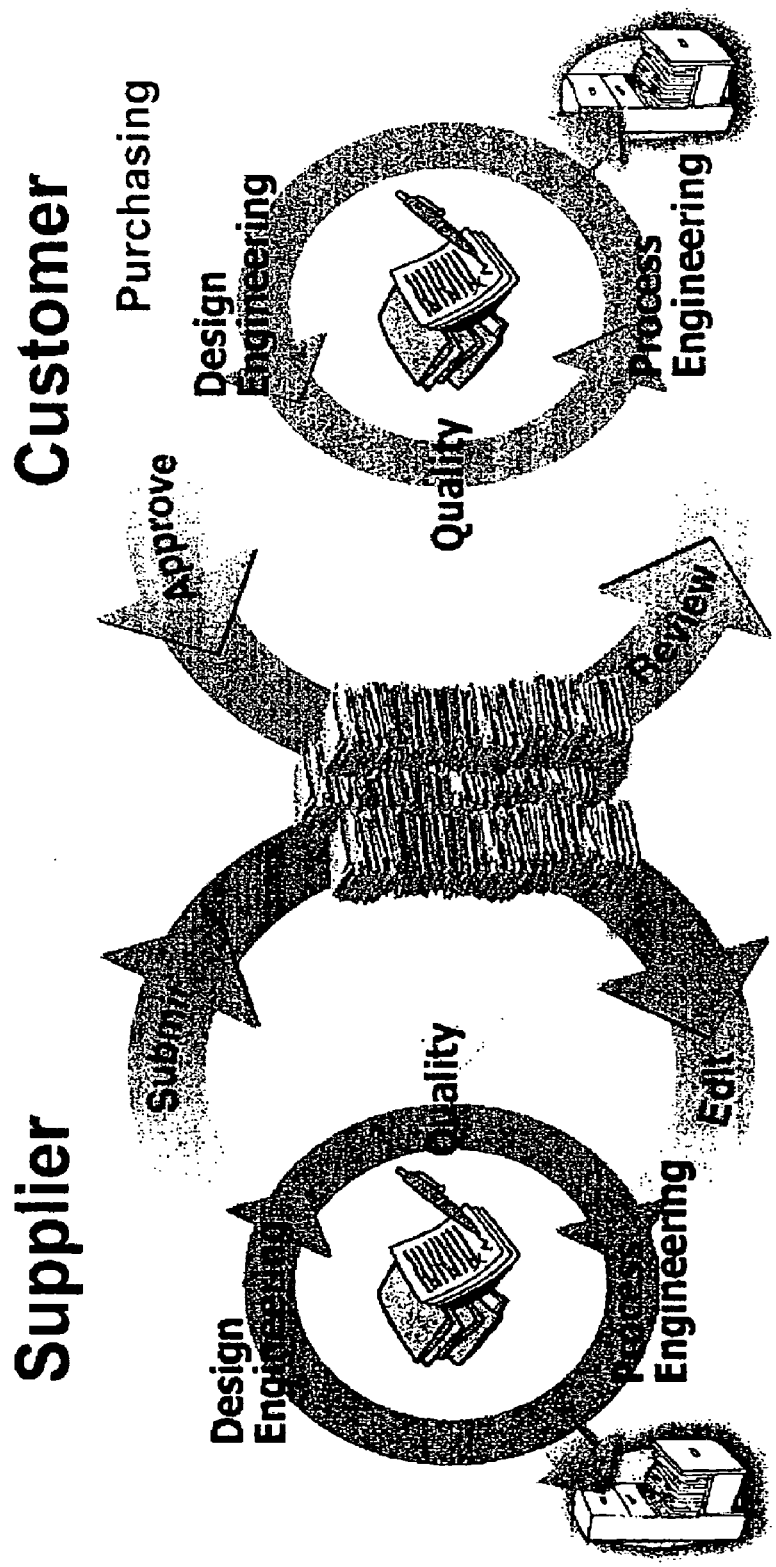
Figure: 8

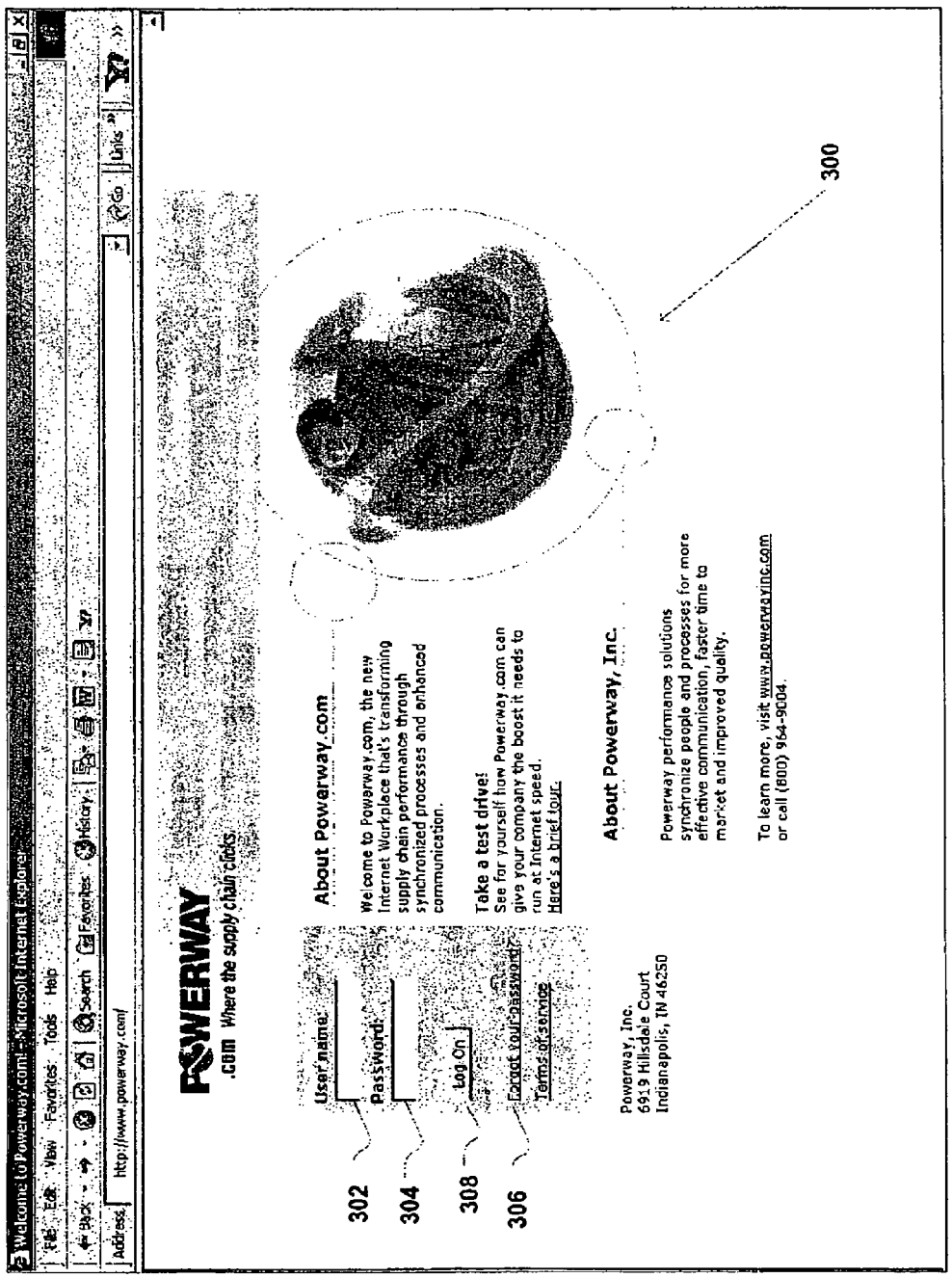
Figure: 9

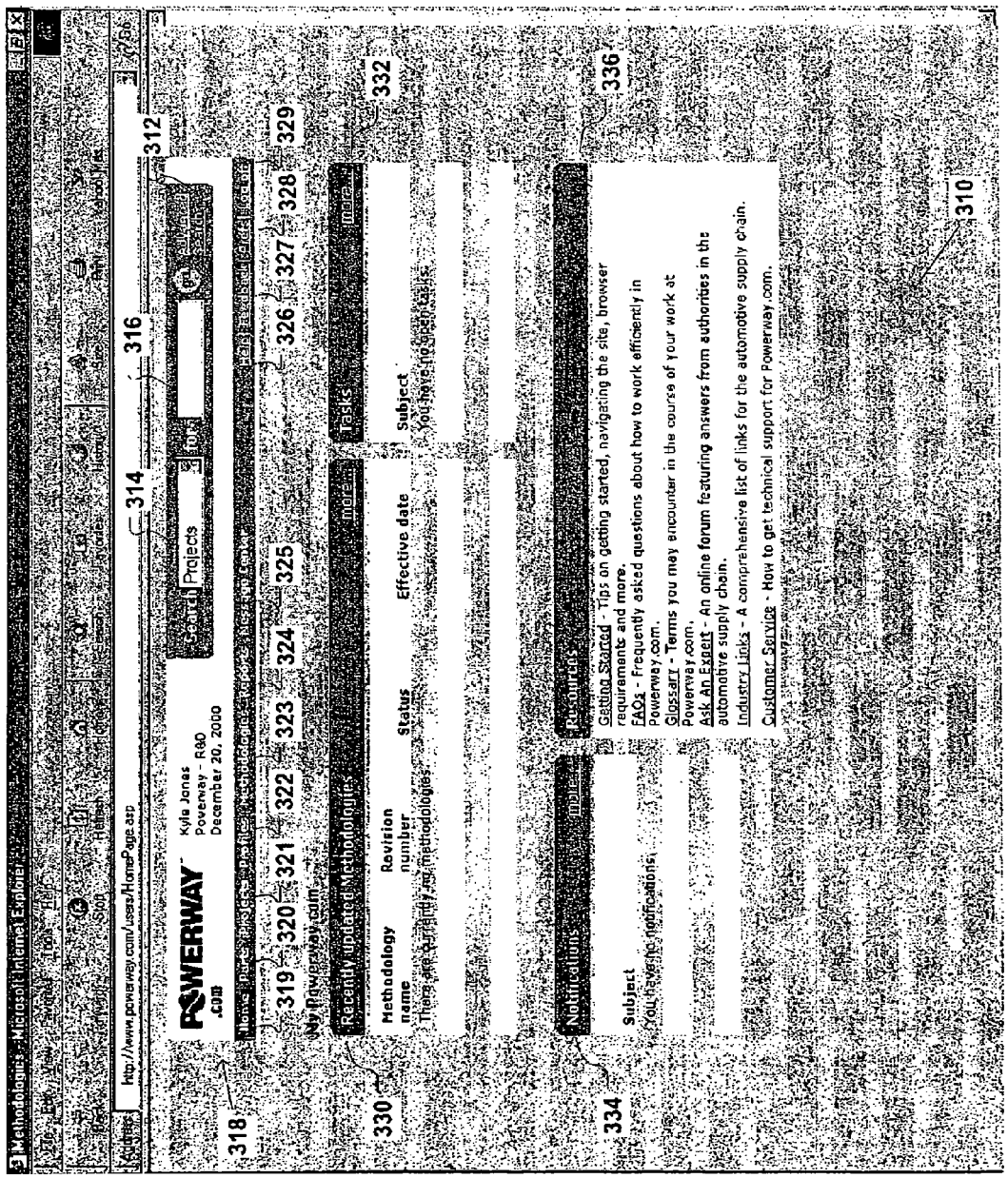
Figure: 10

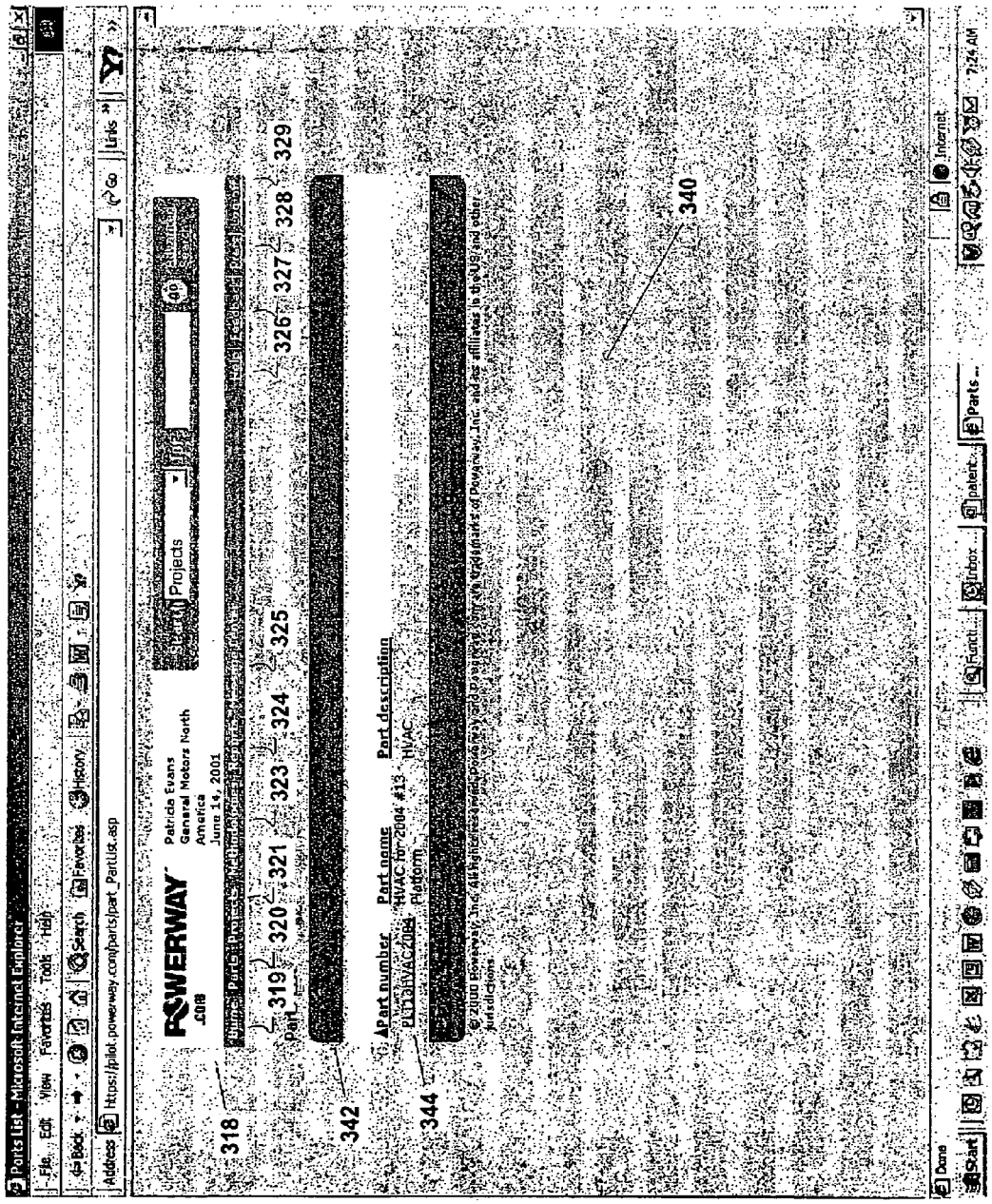
Figure: 11

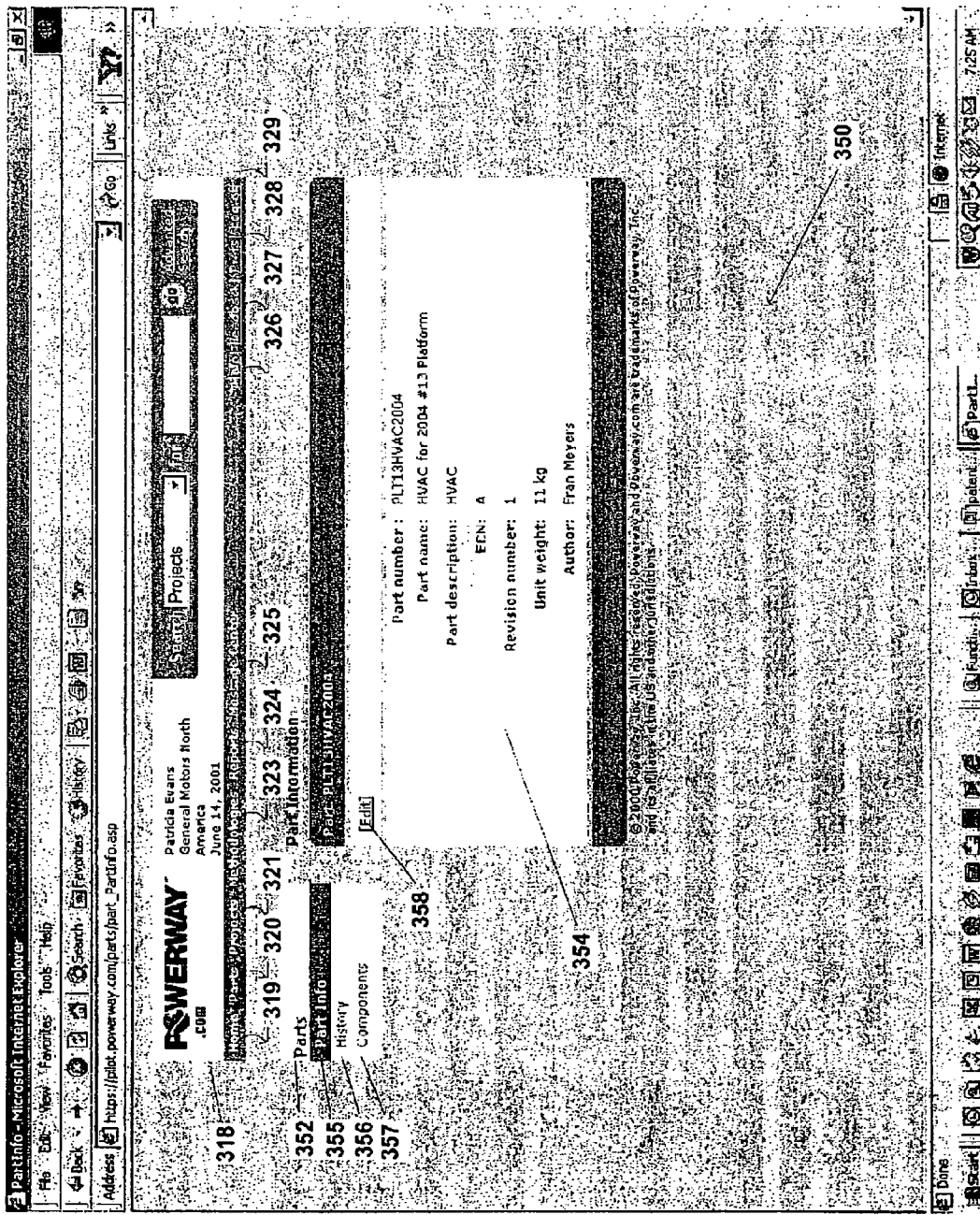
Figure: 12

Figure: 13

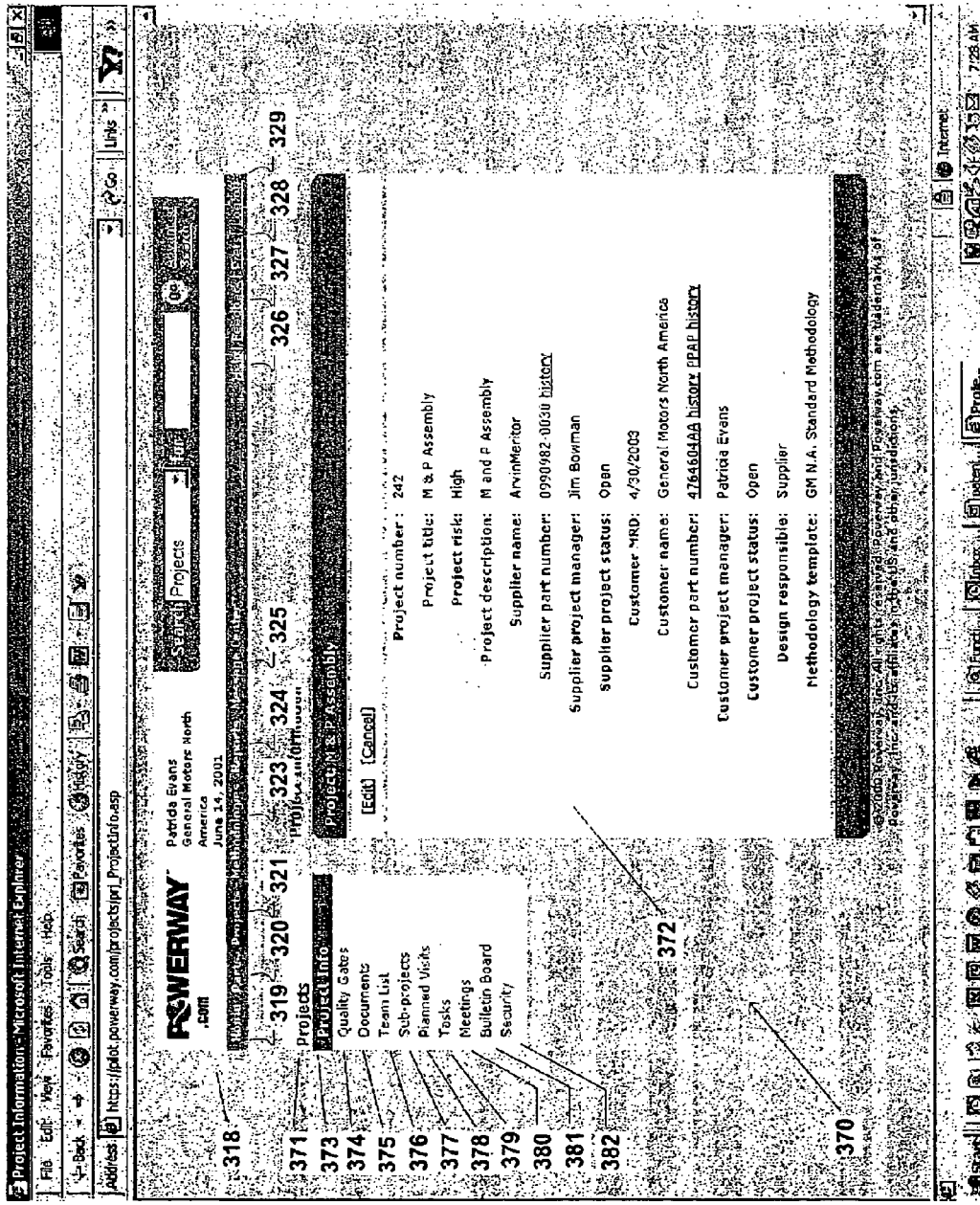
Figure: 14

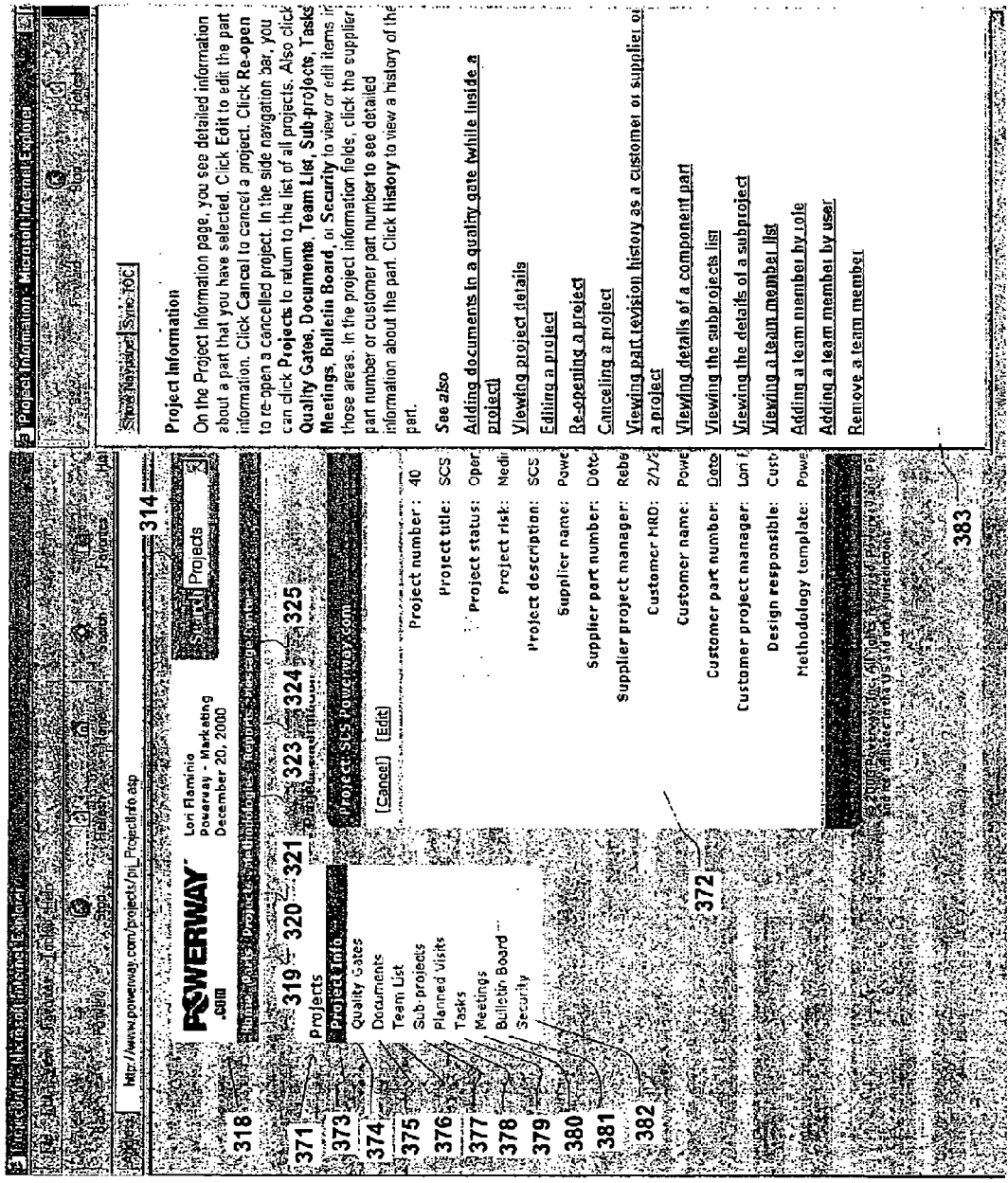
Figure: 15

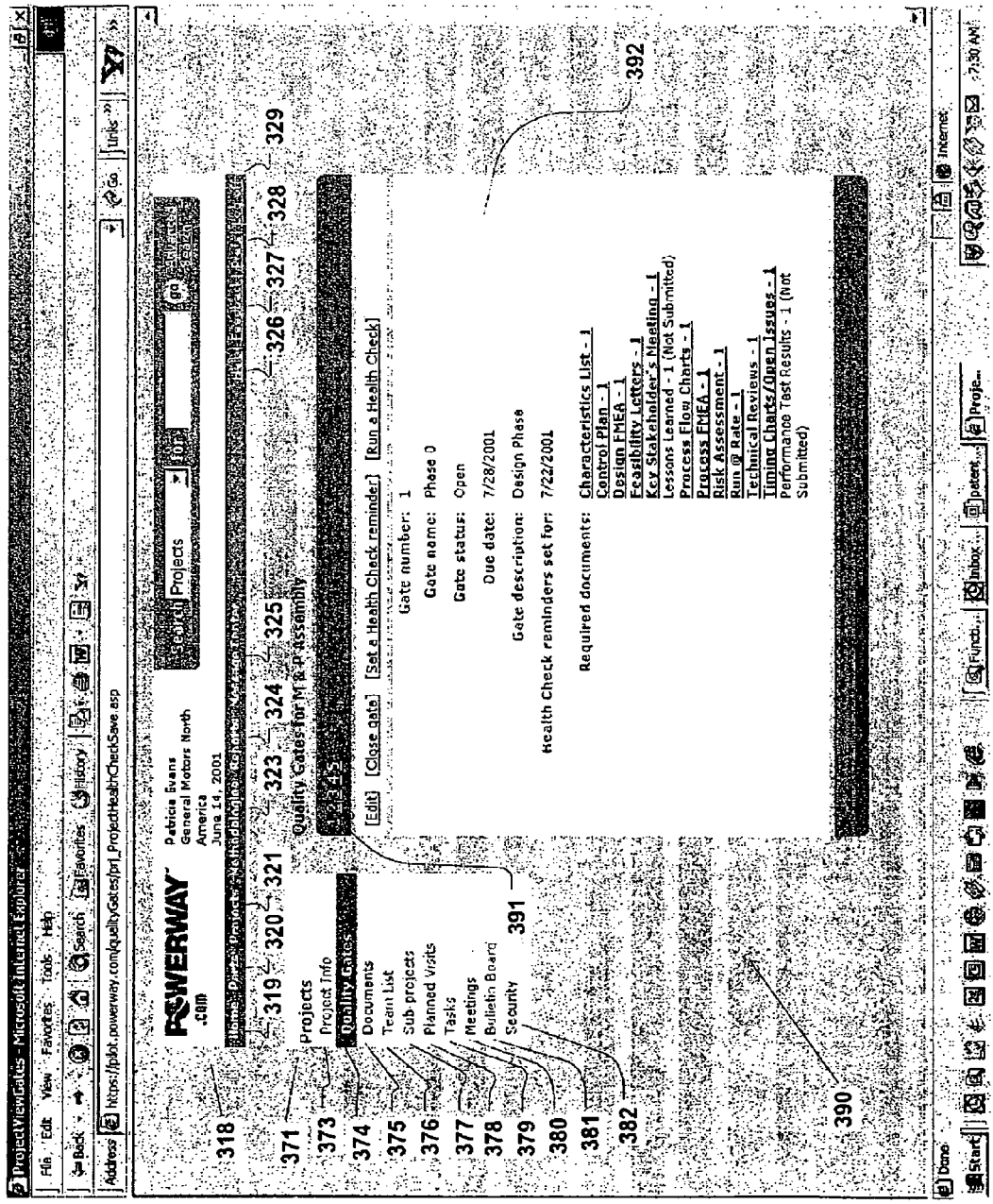
Figure: 16

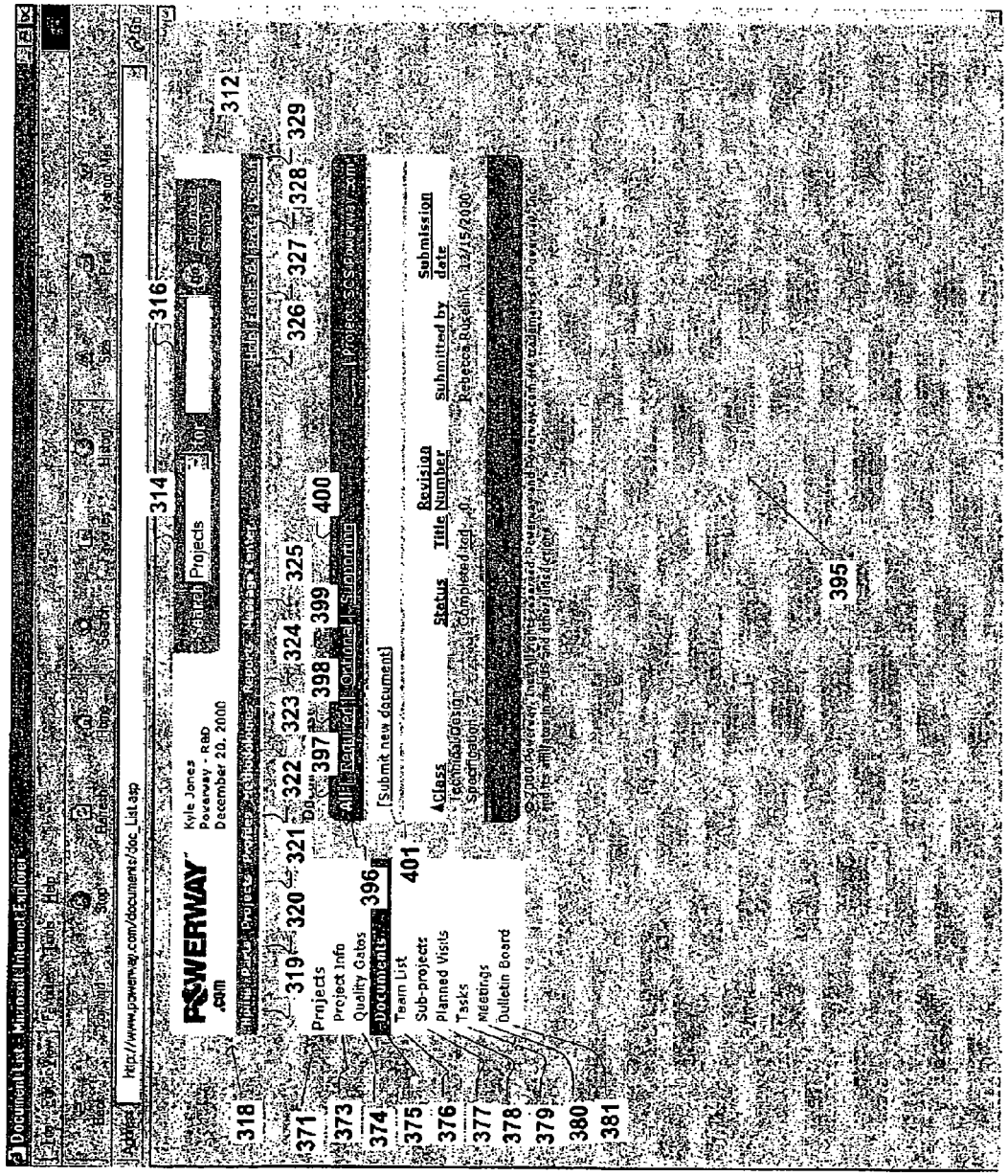
Figure: 17

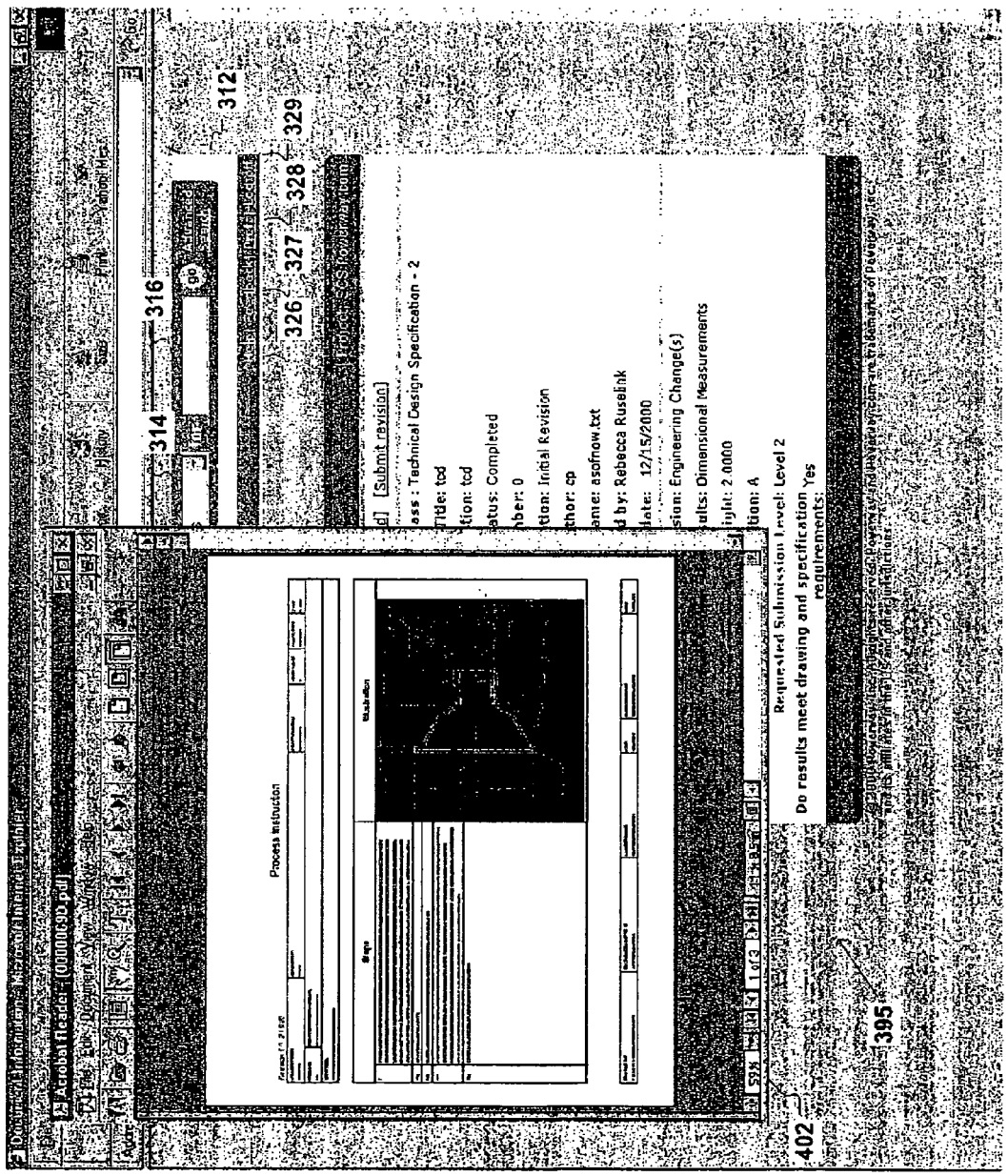
Figure: 18

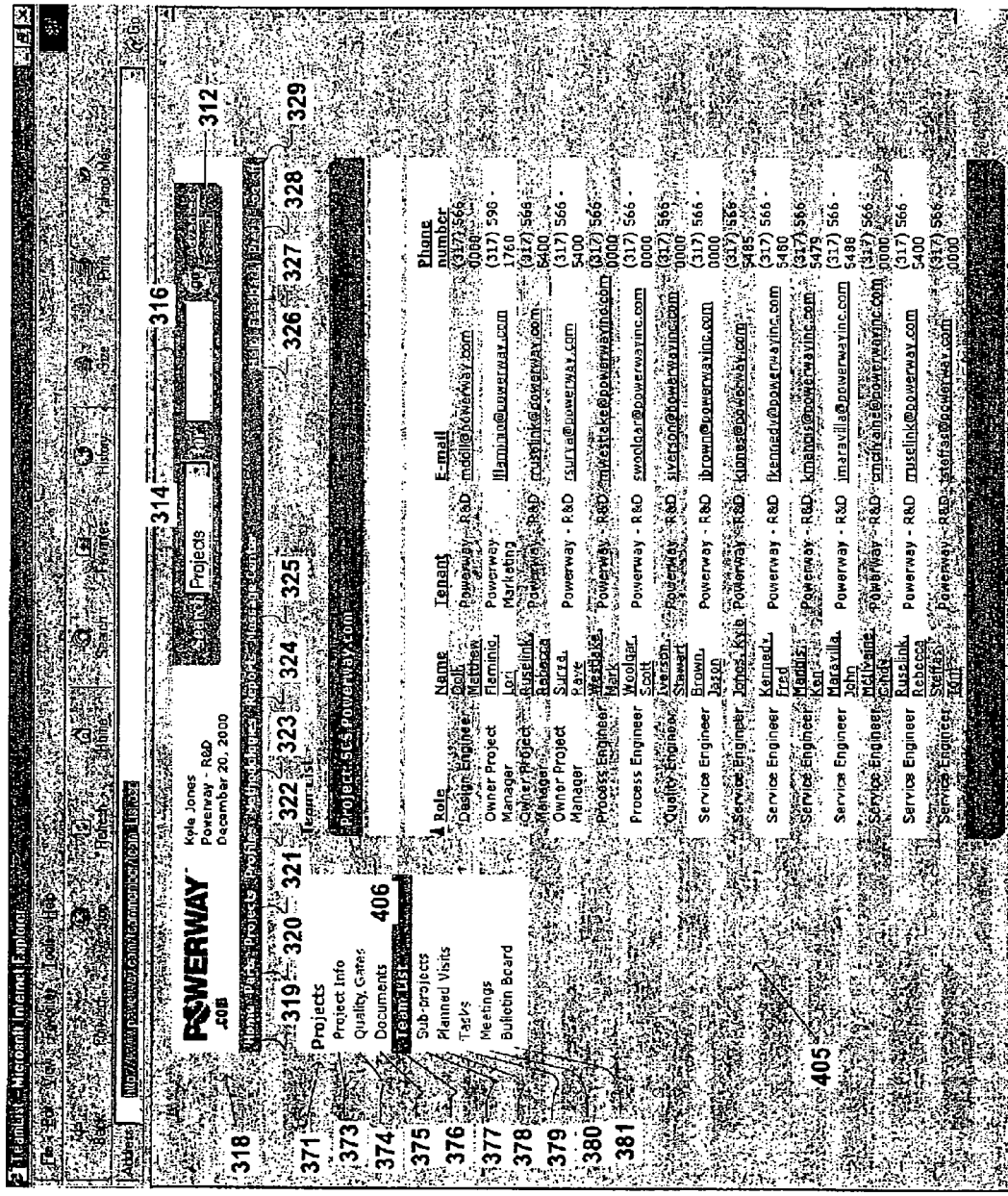
Figure: 19

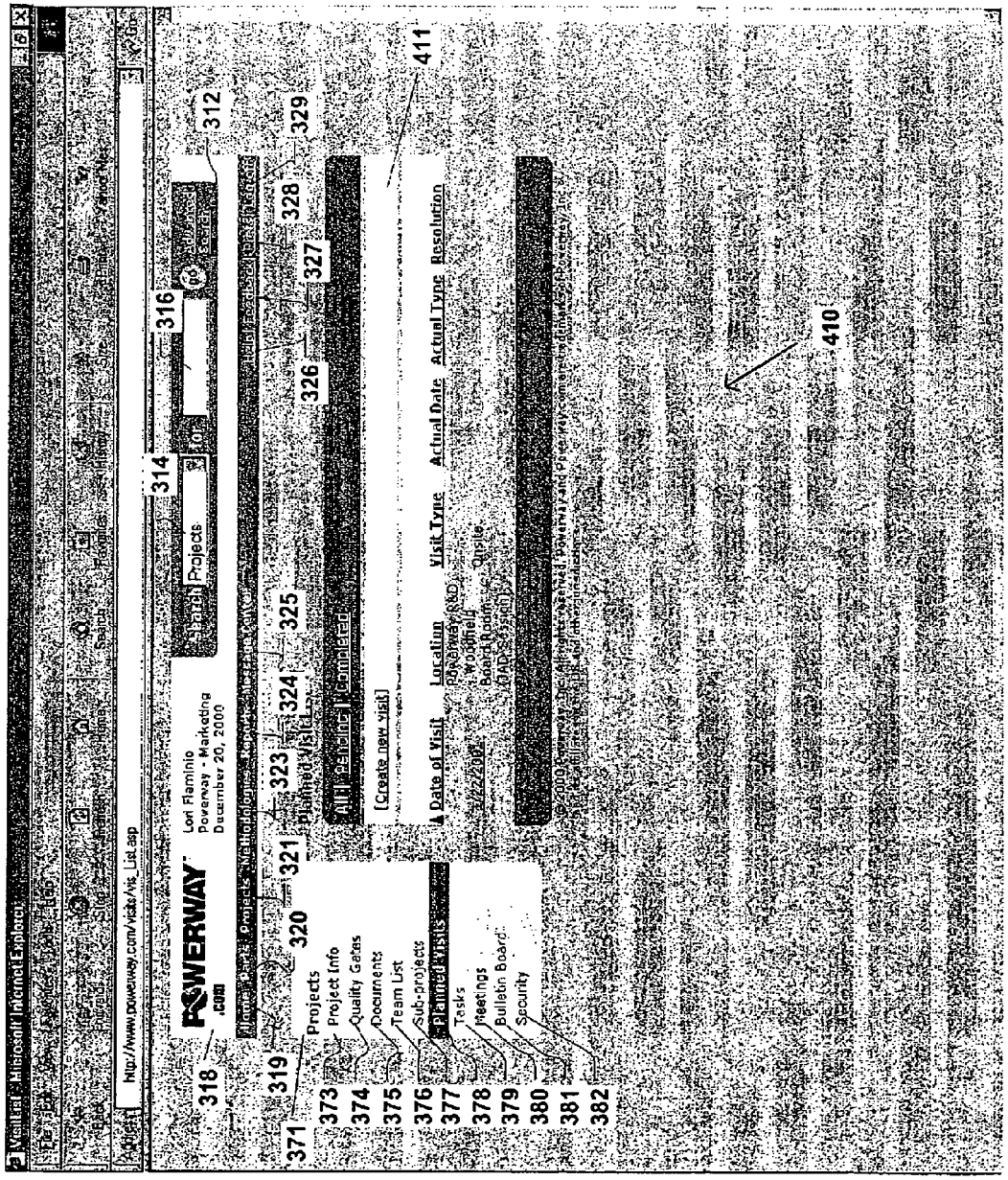
Figure: 20

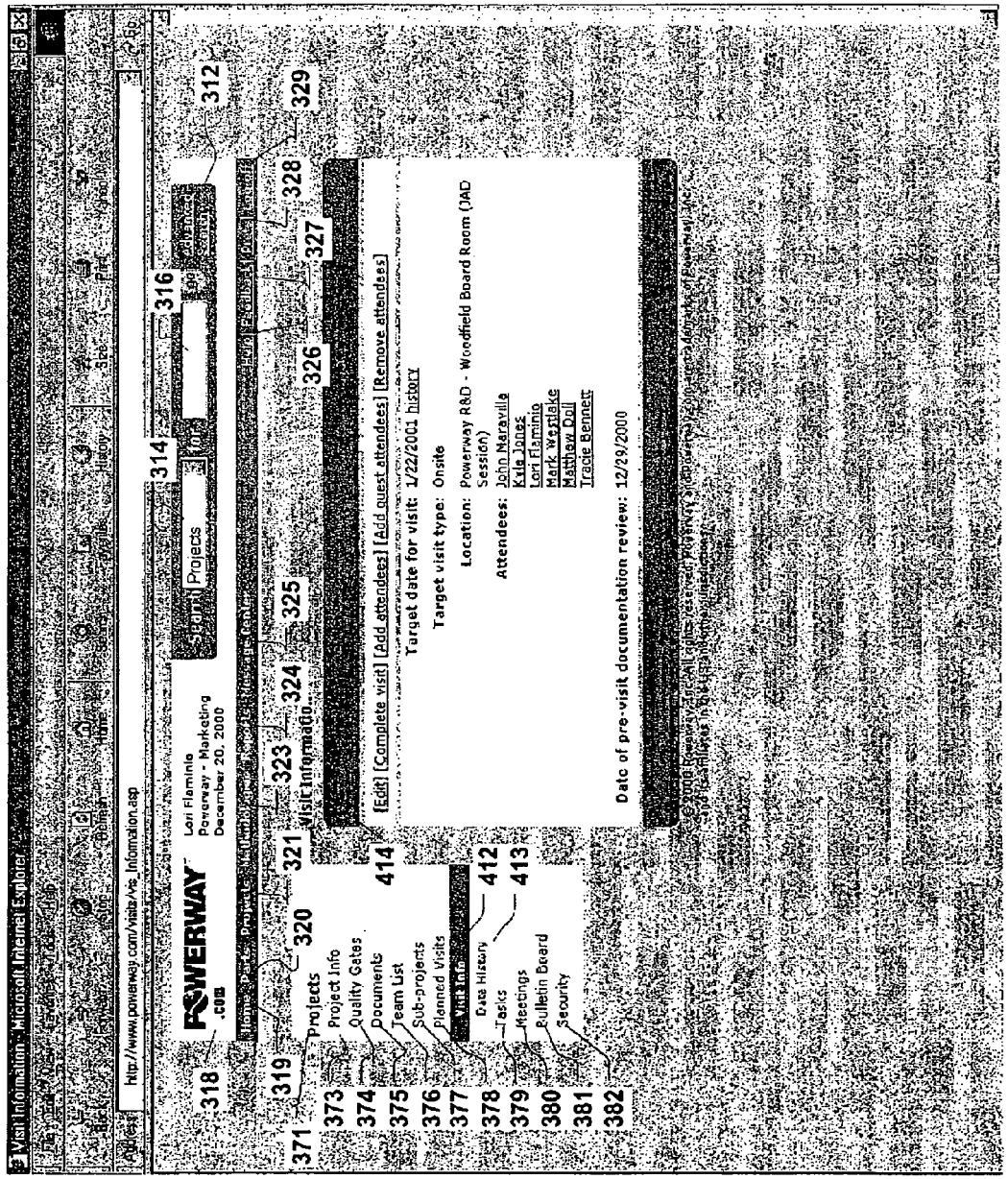
Figure: 21

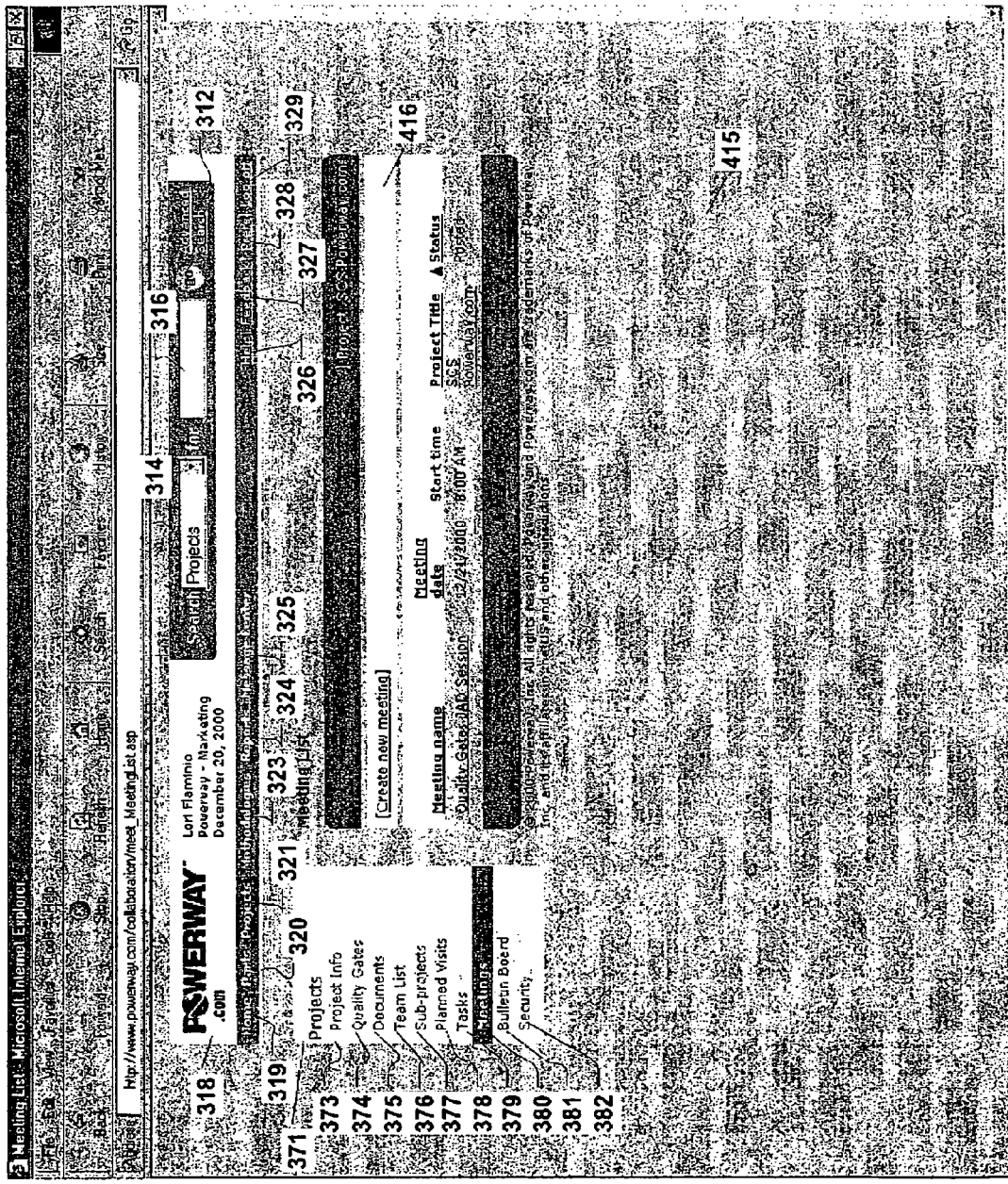
Figure: 22

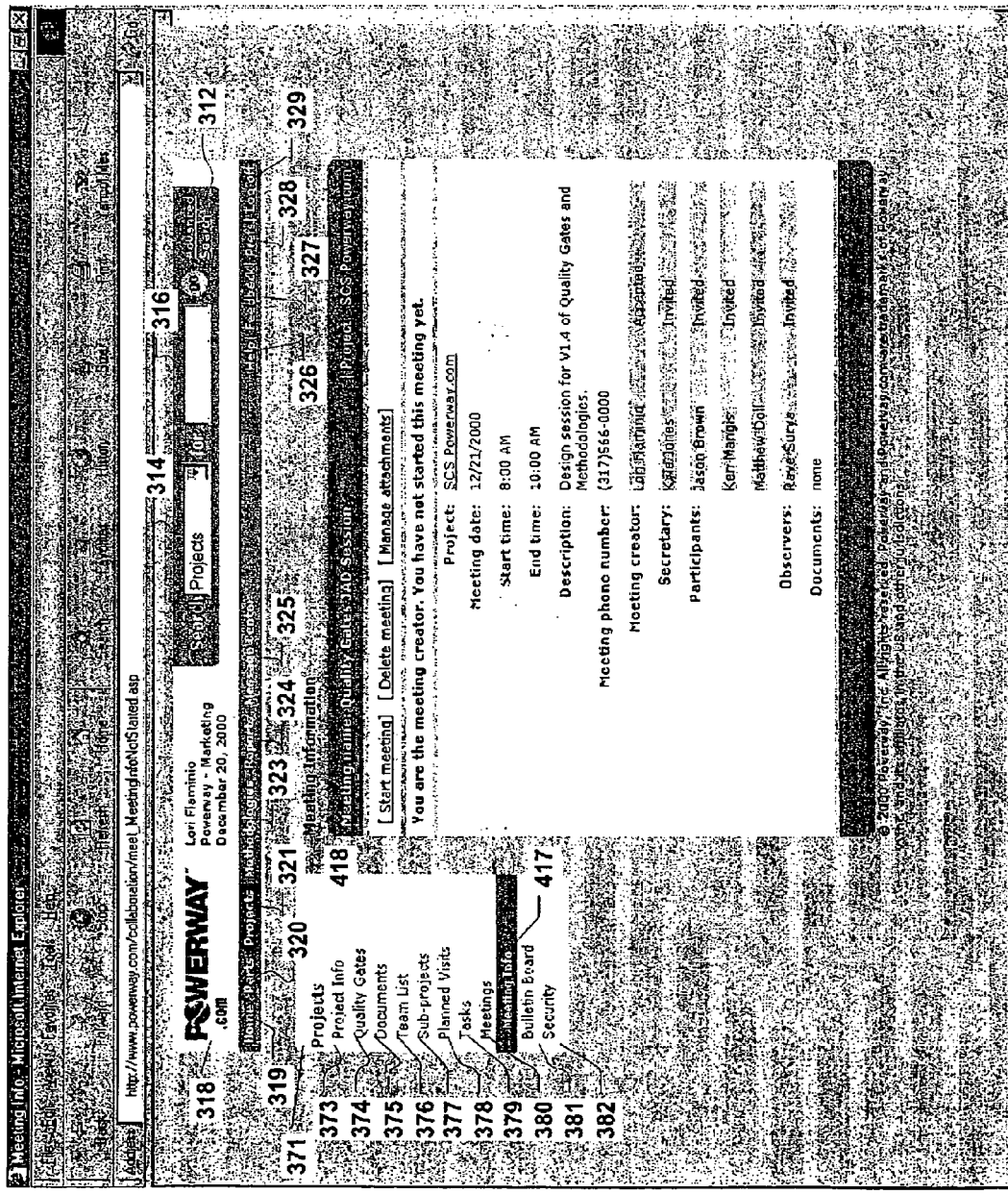
Figure: 23

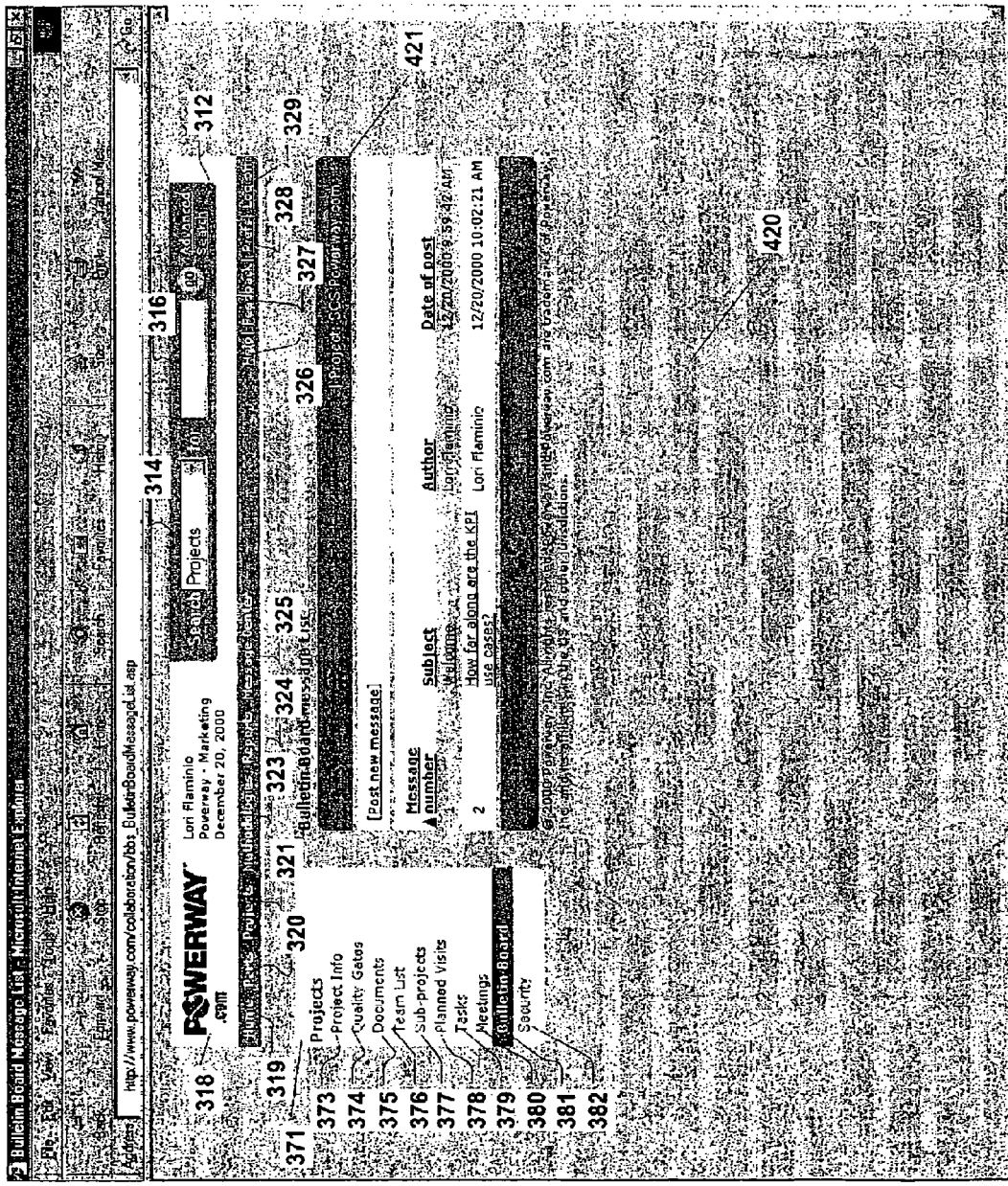
Figure: 24

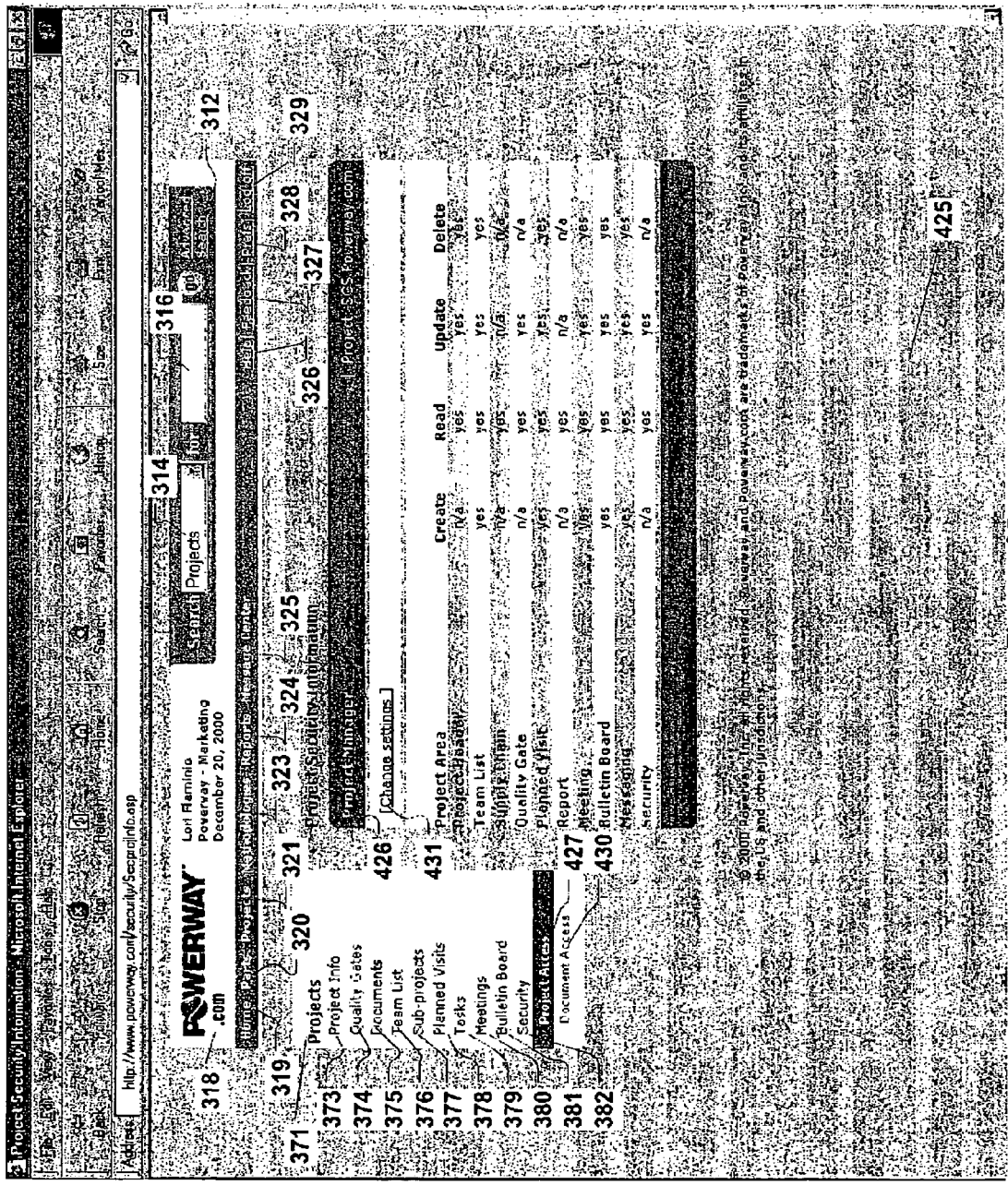
Figure: 25

Figure: 26

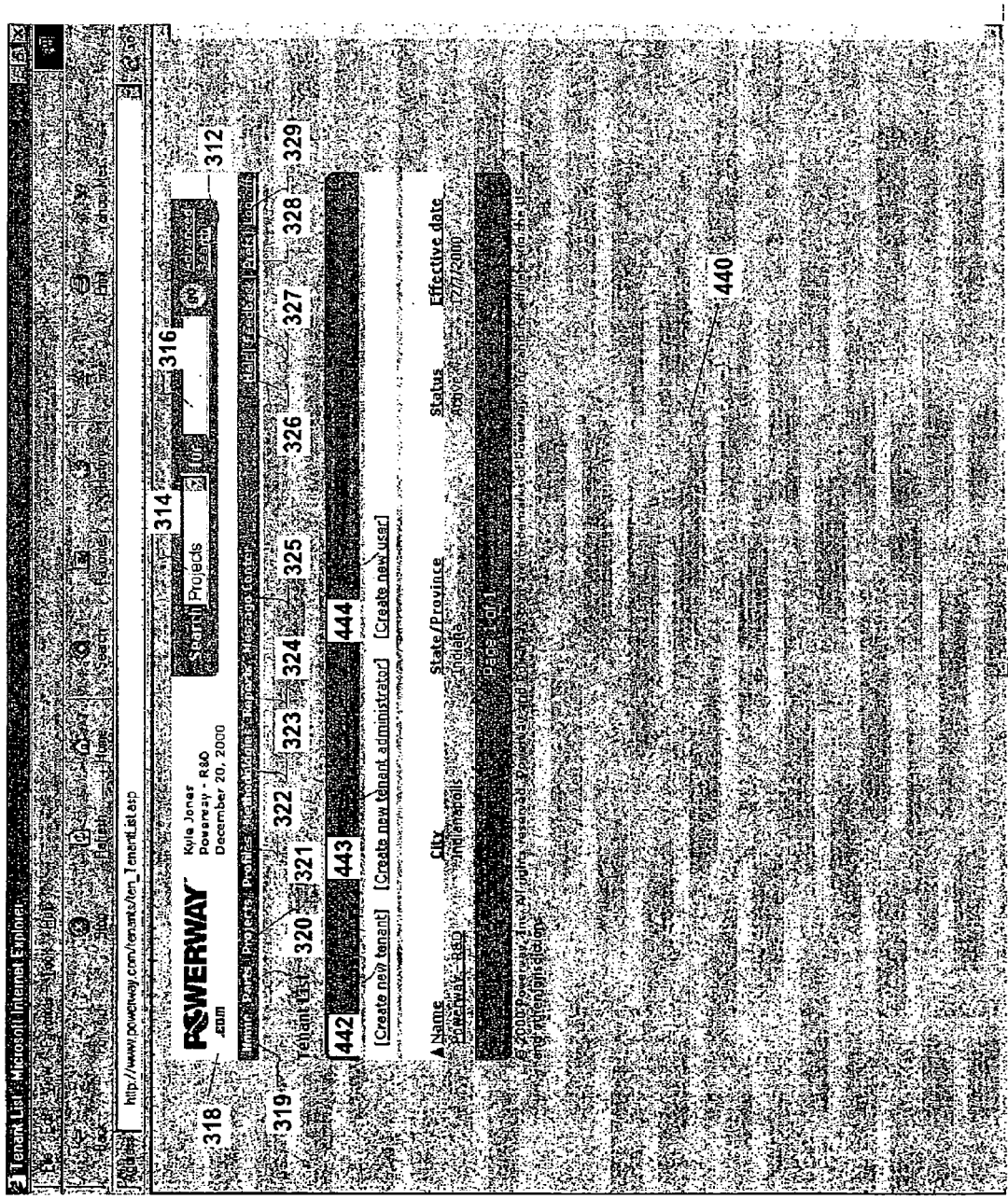
Figure: 27

Figure: 28

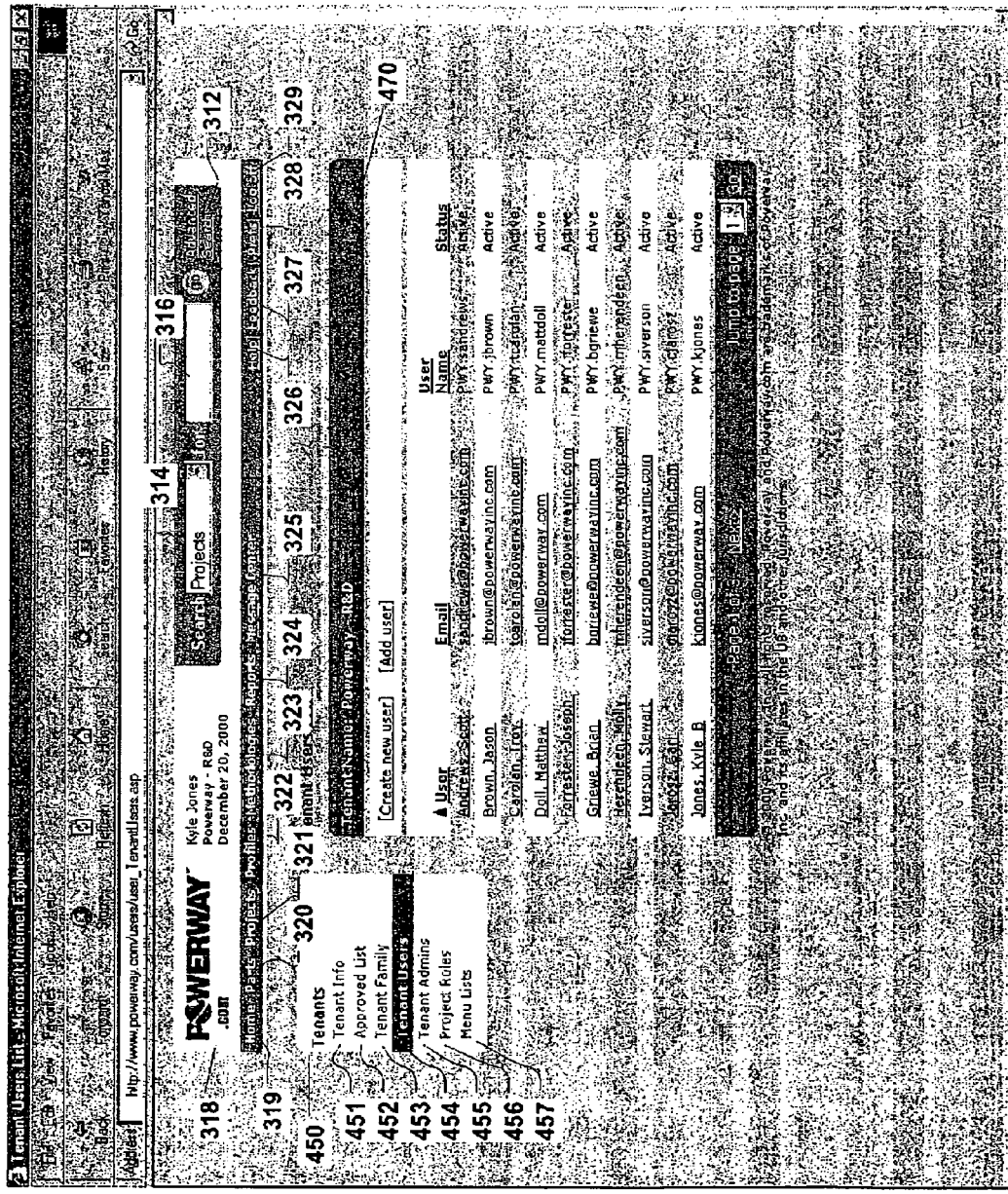
Figure: 29

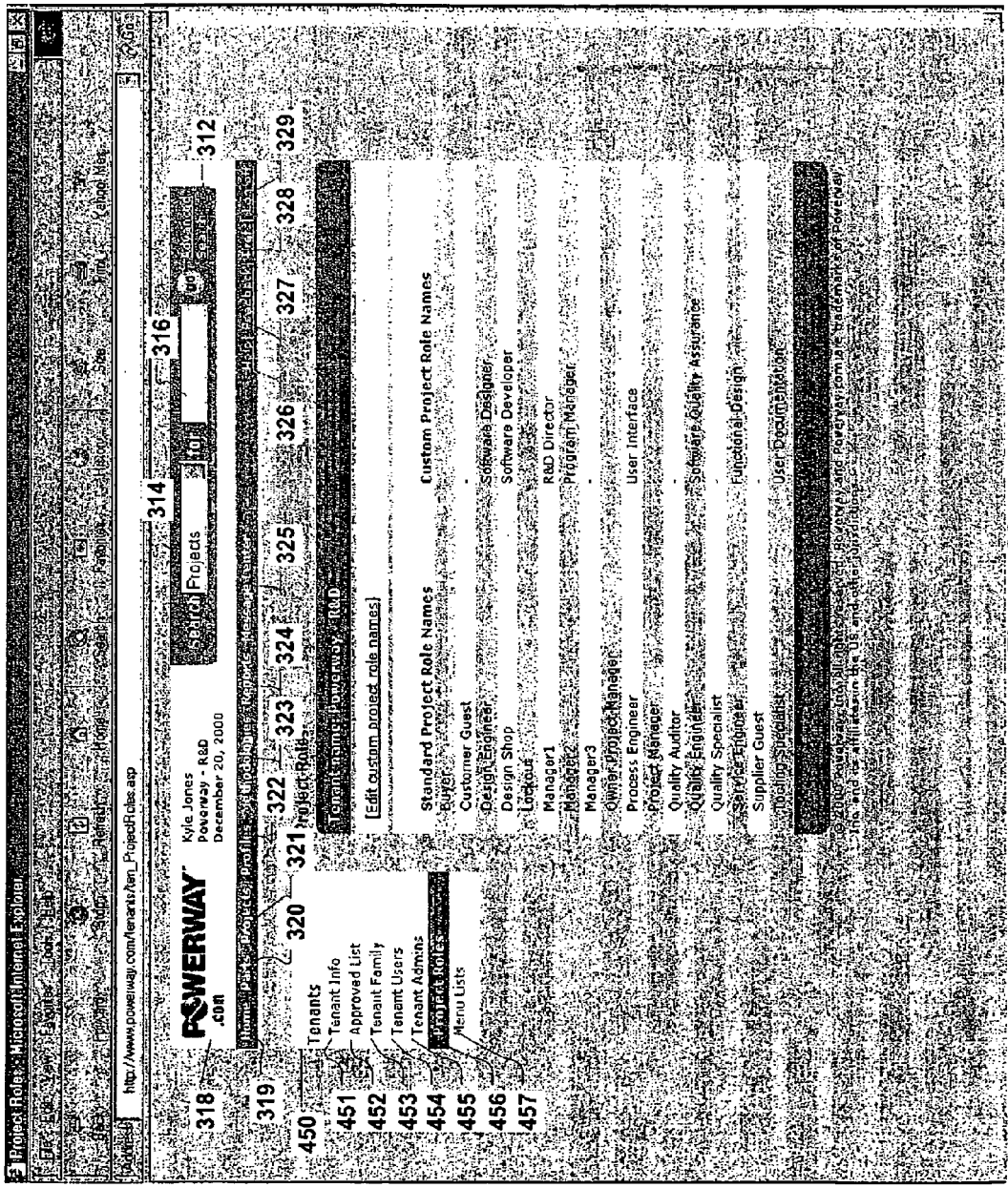
Figure: 30

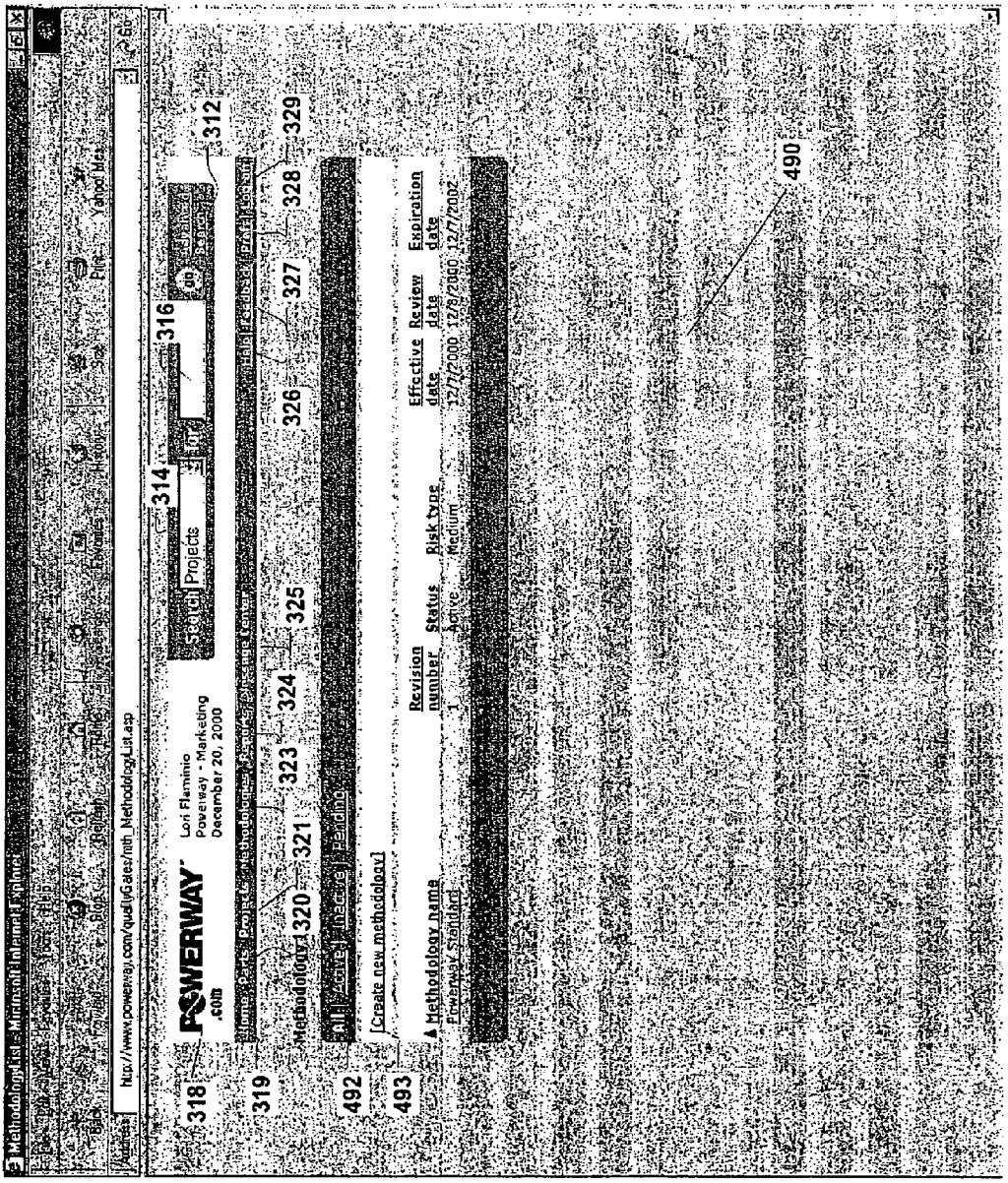
Figure: 31

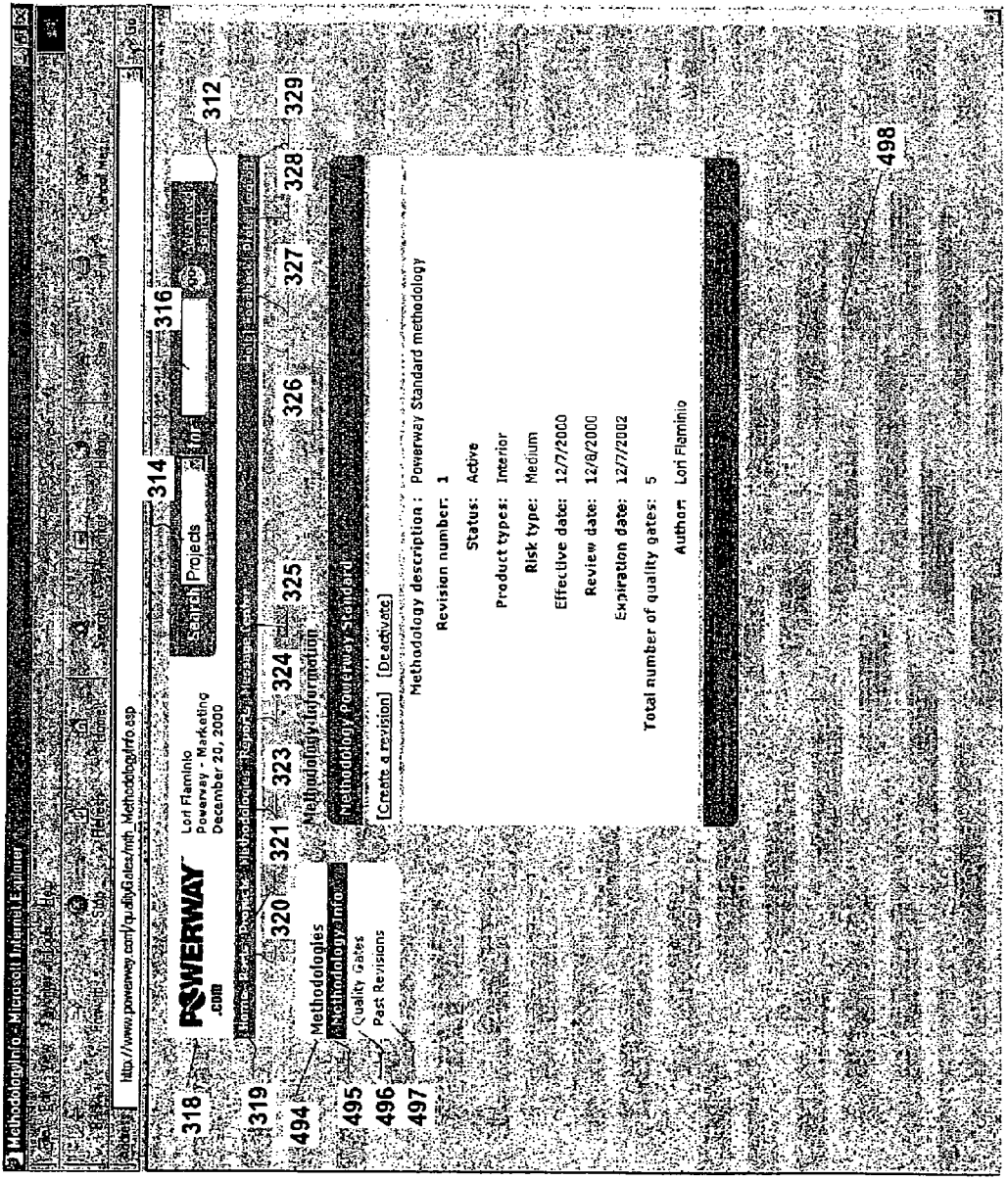
Figure: 32

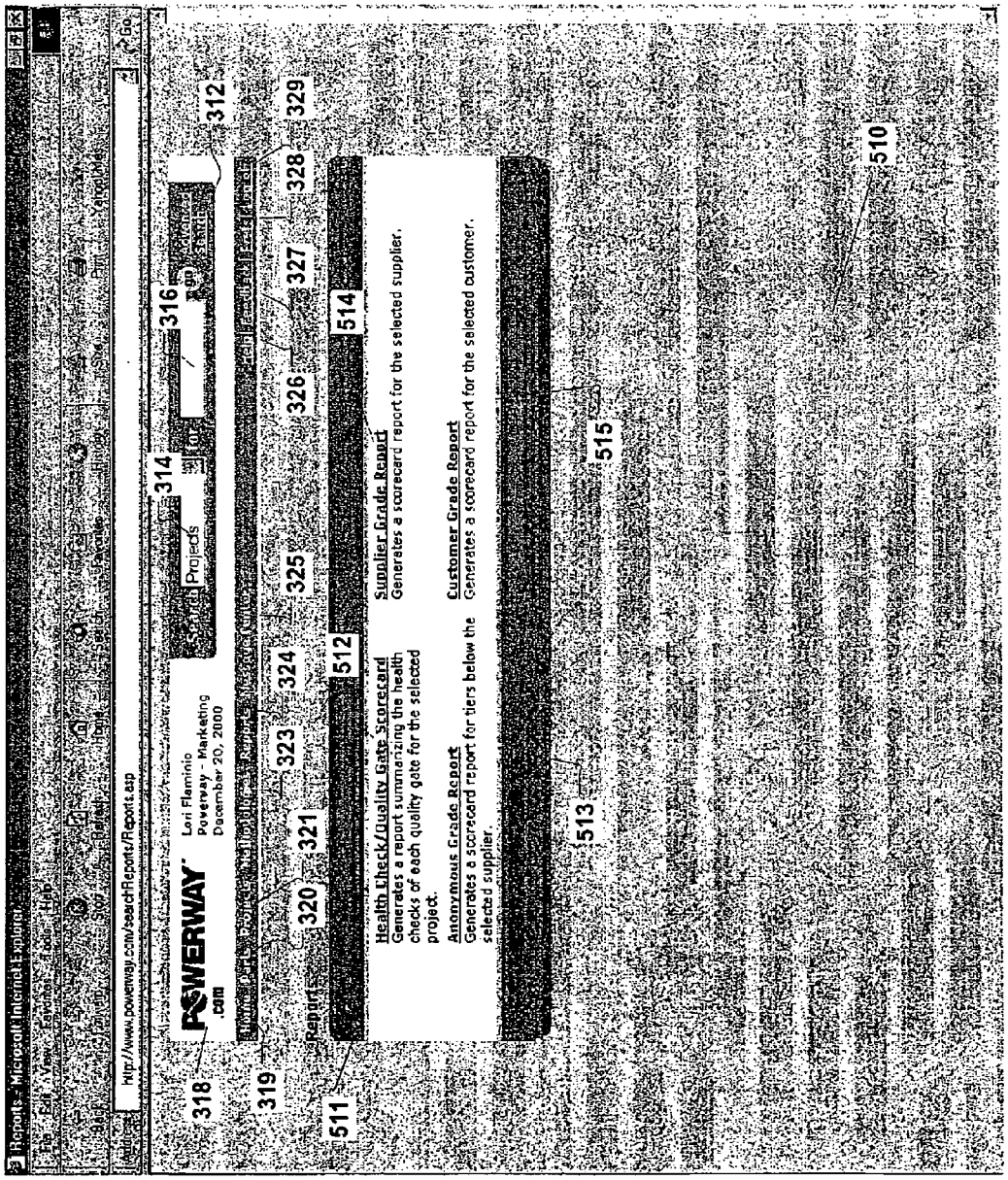
Figure: 33

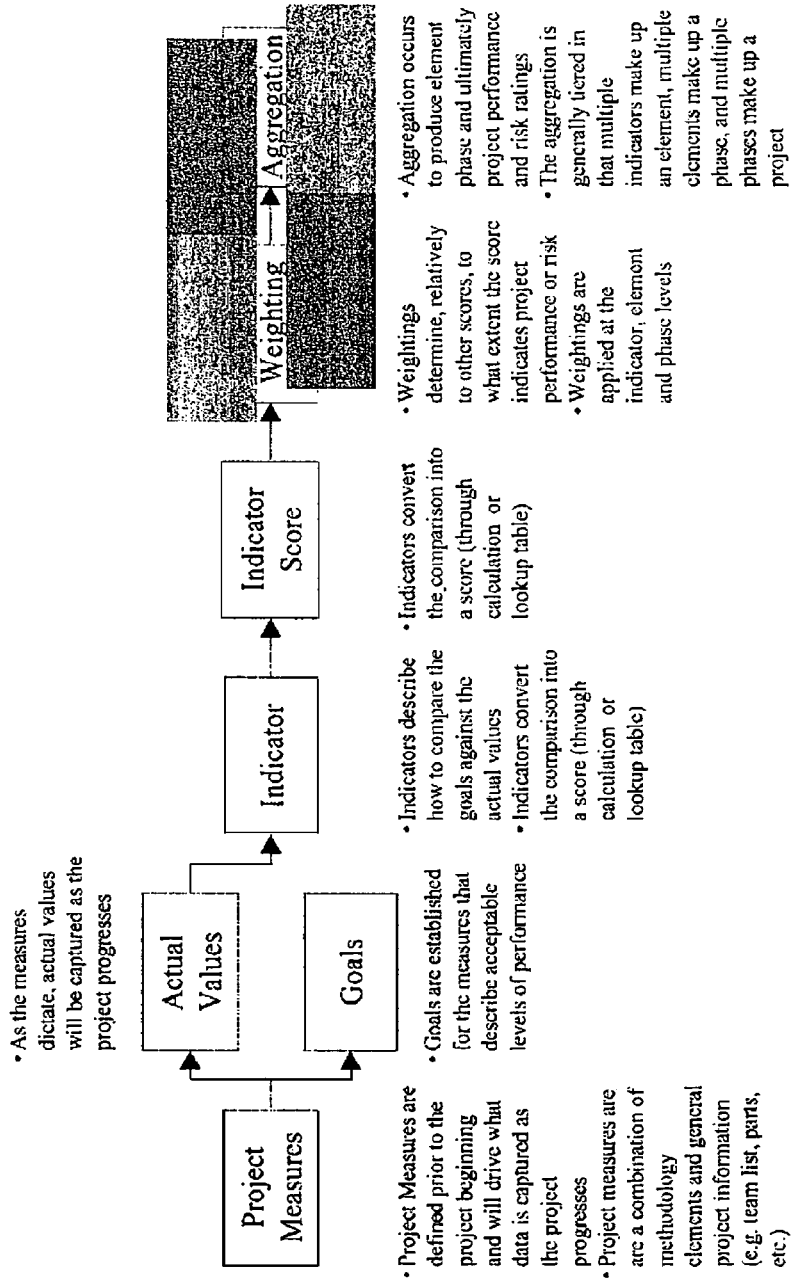
Figure: 34

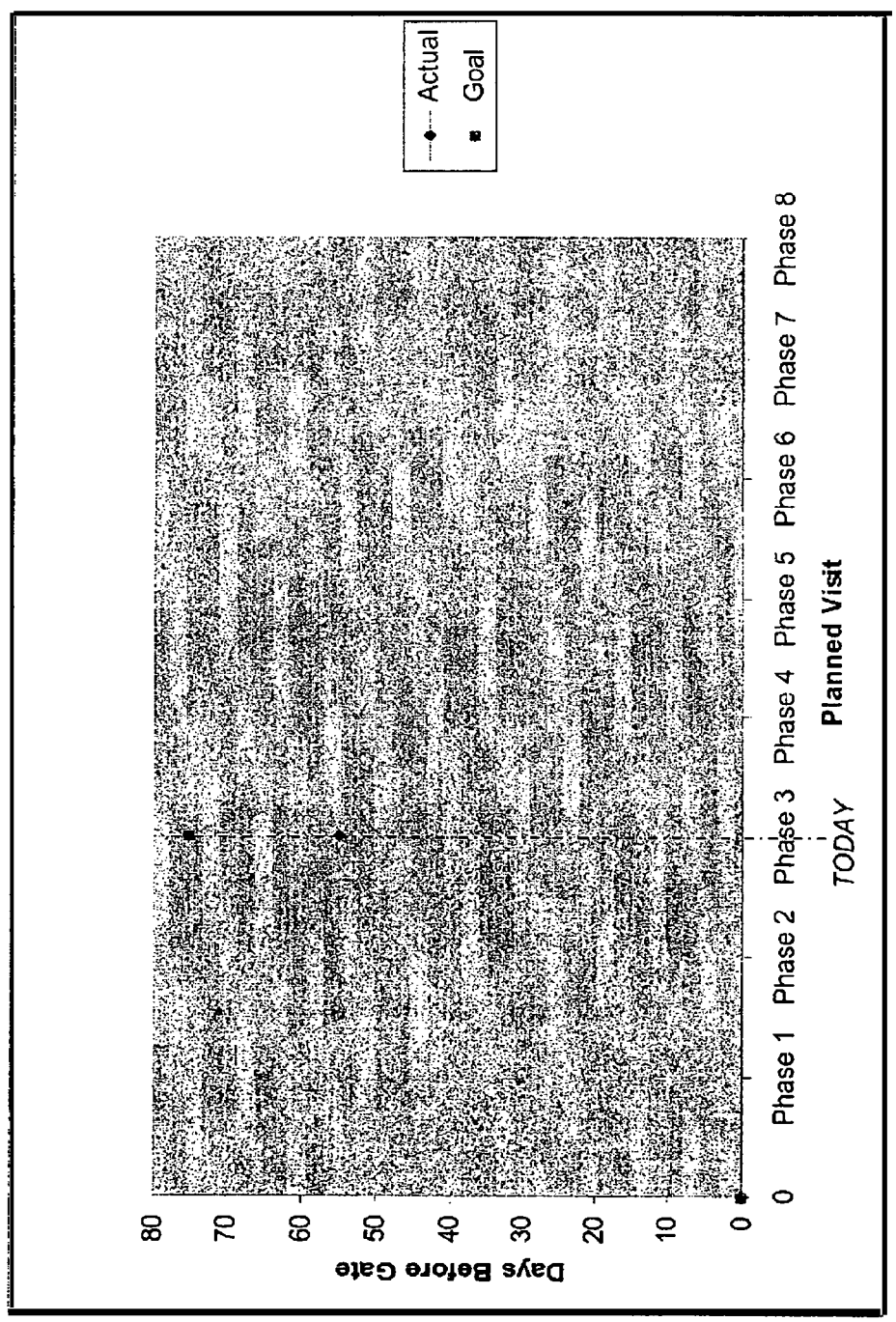
Figure: 35

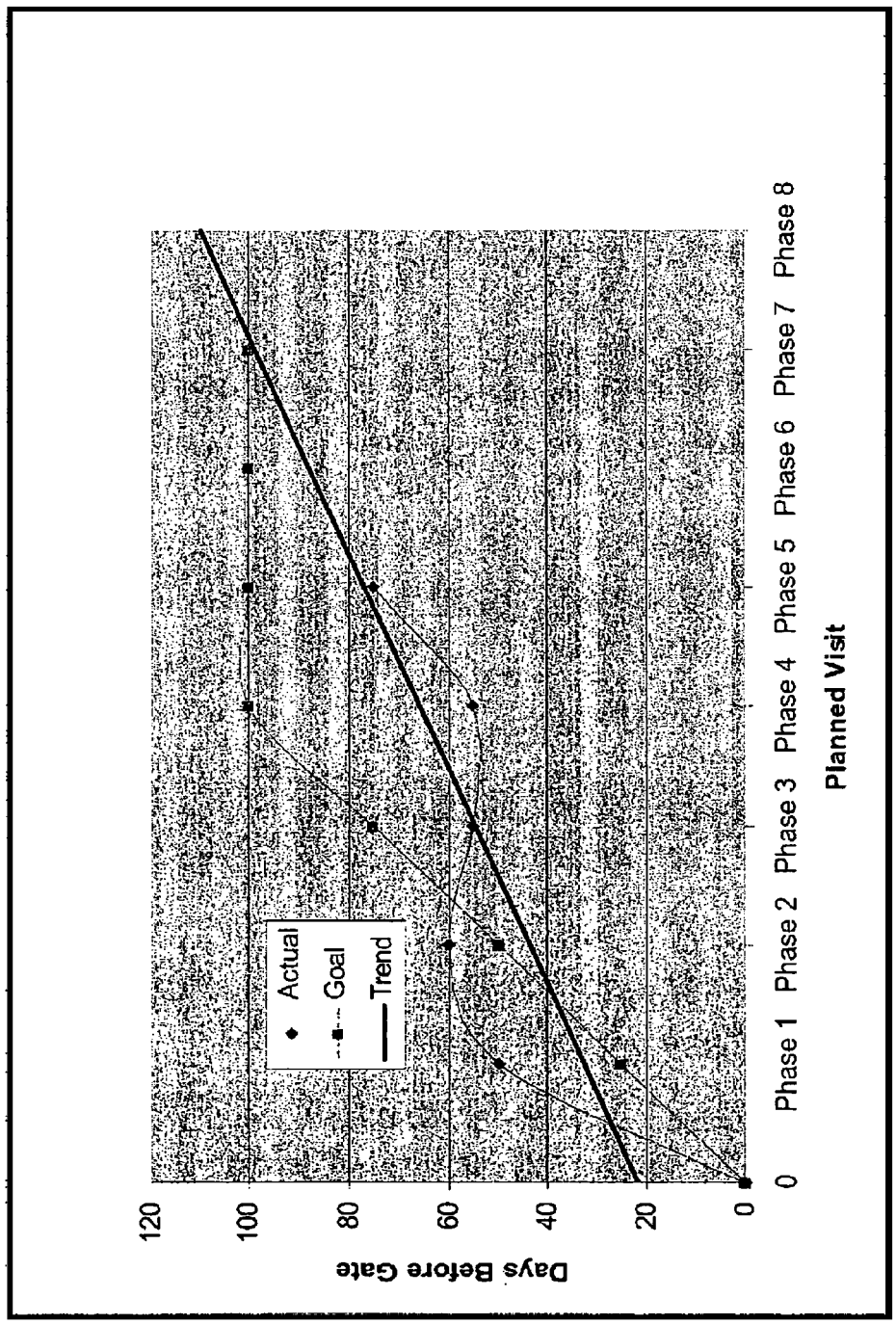
Figure: 36

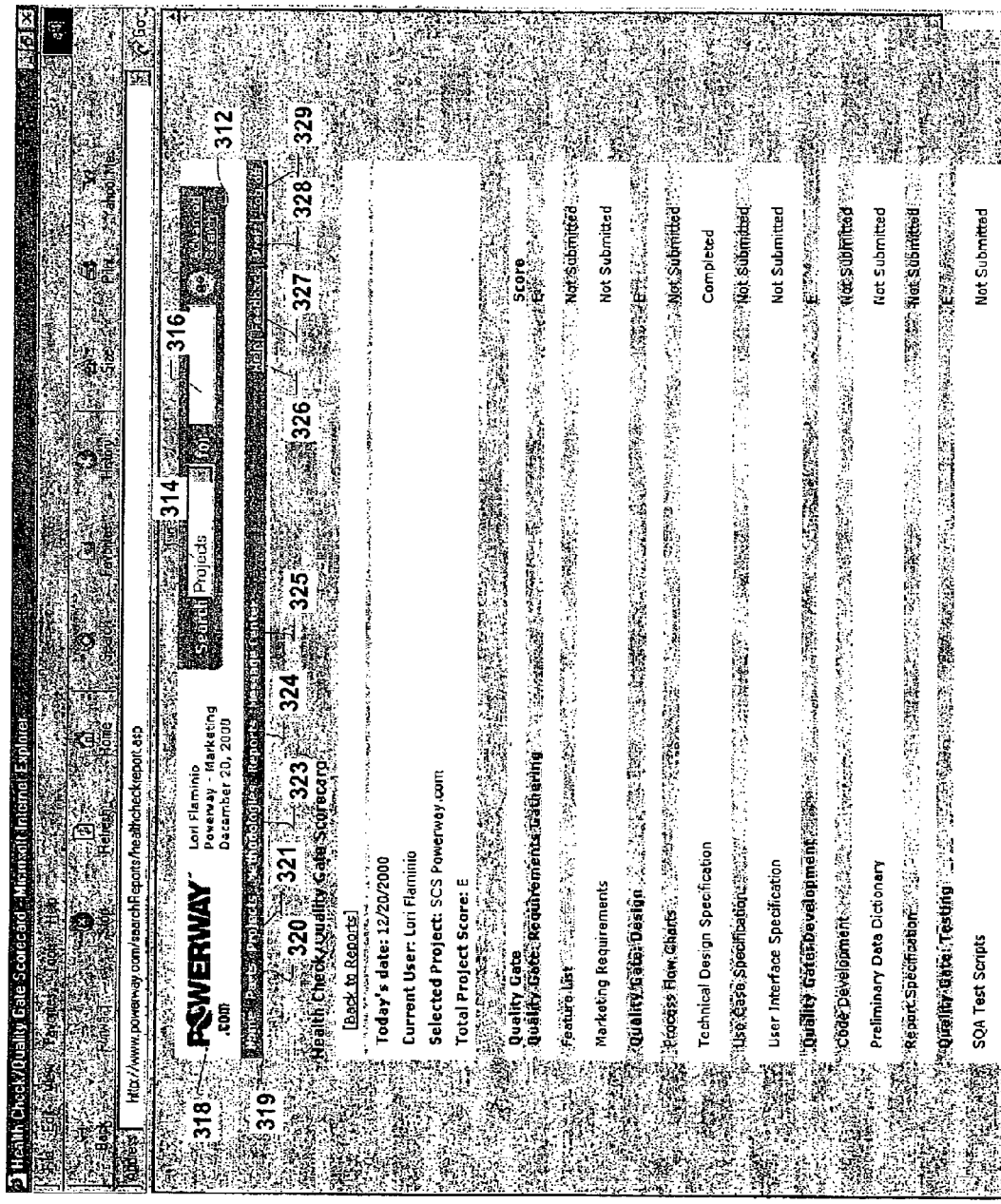
Figure: 37

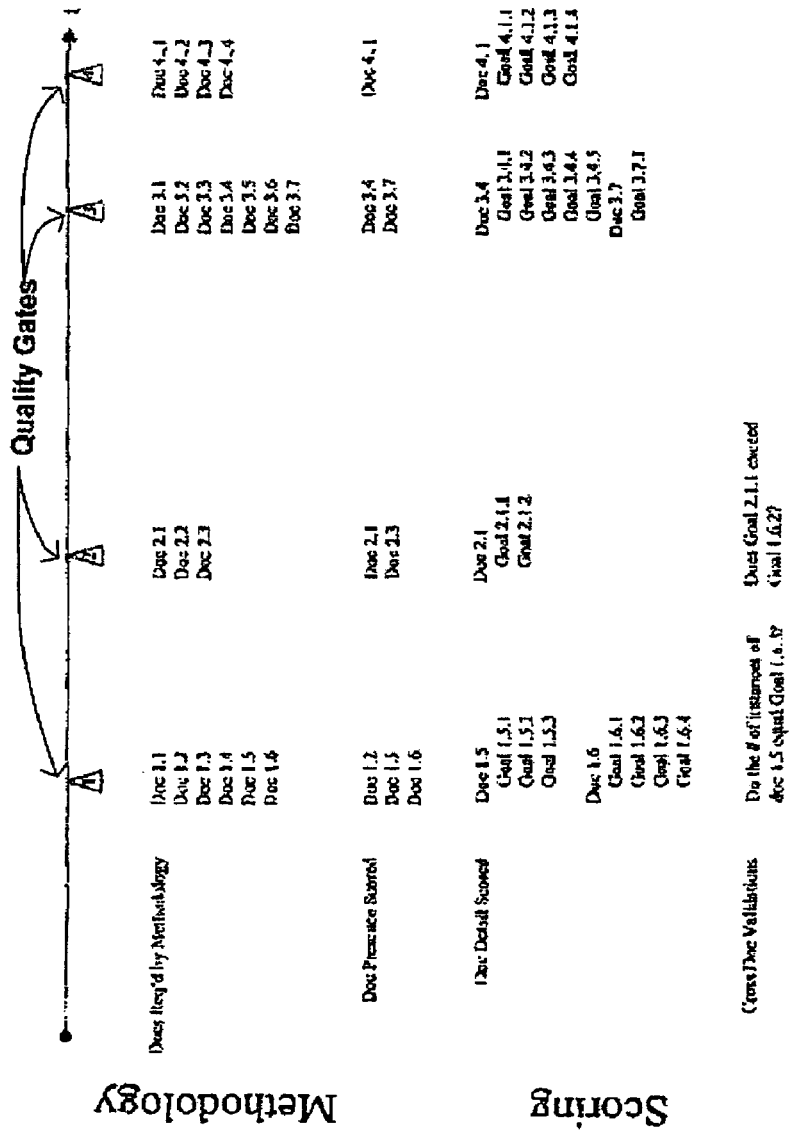
Figure: 38

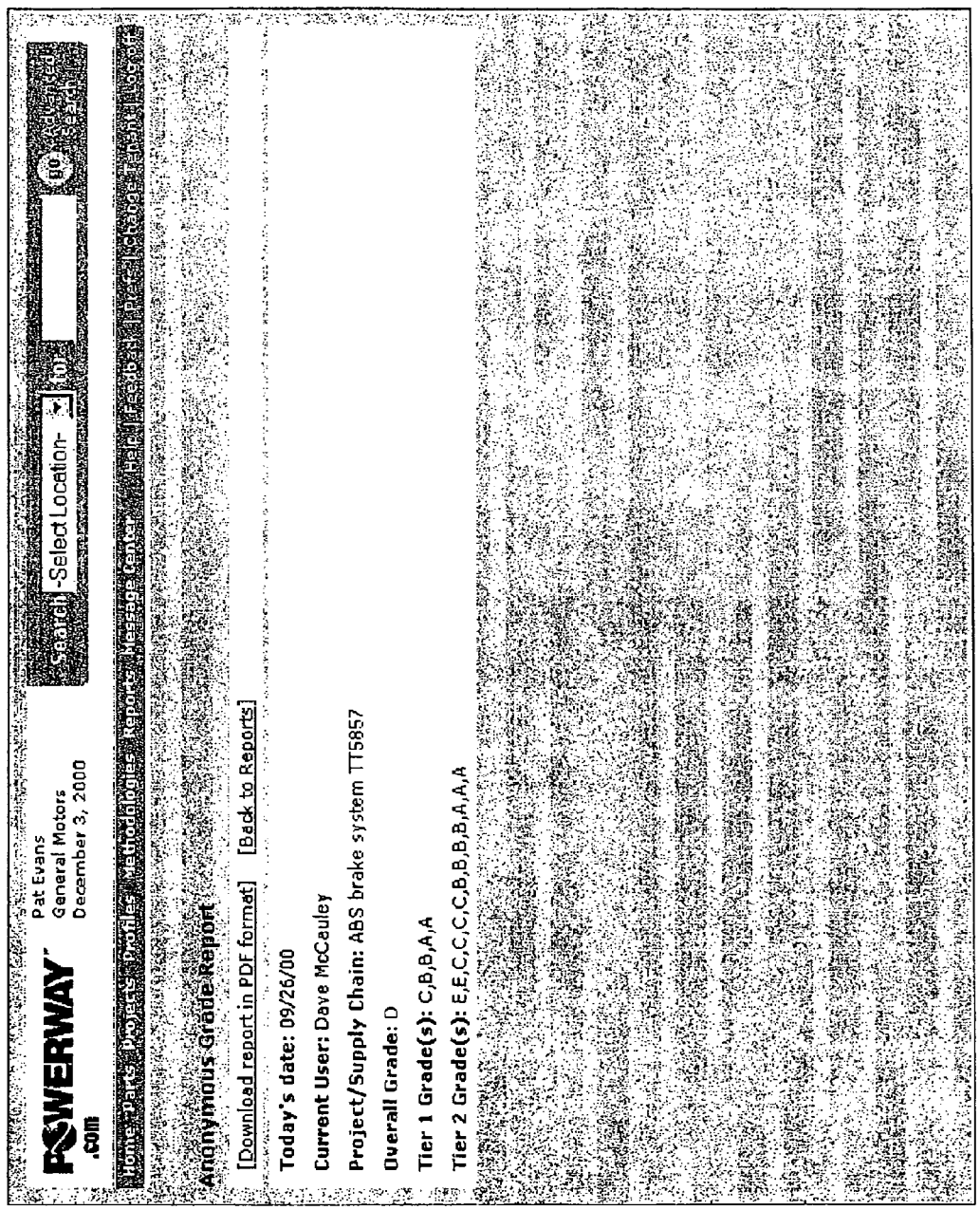
Figure: 39

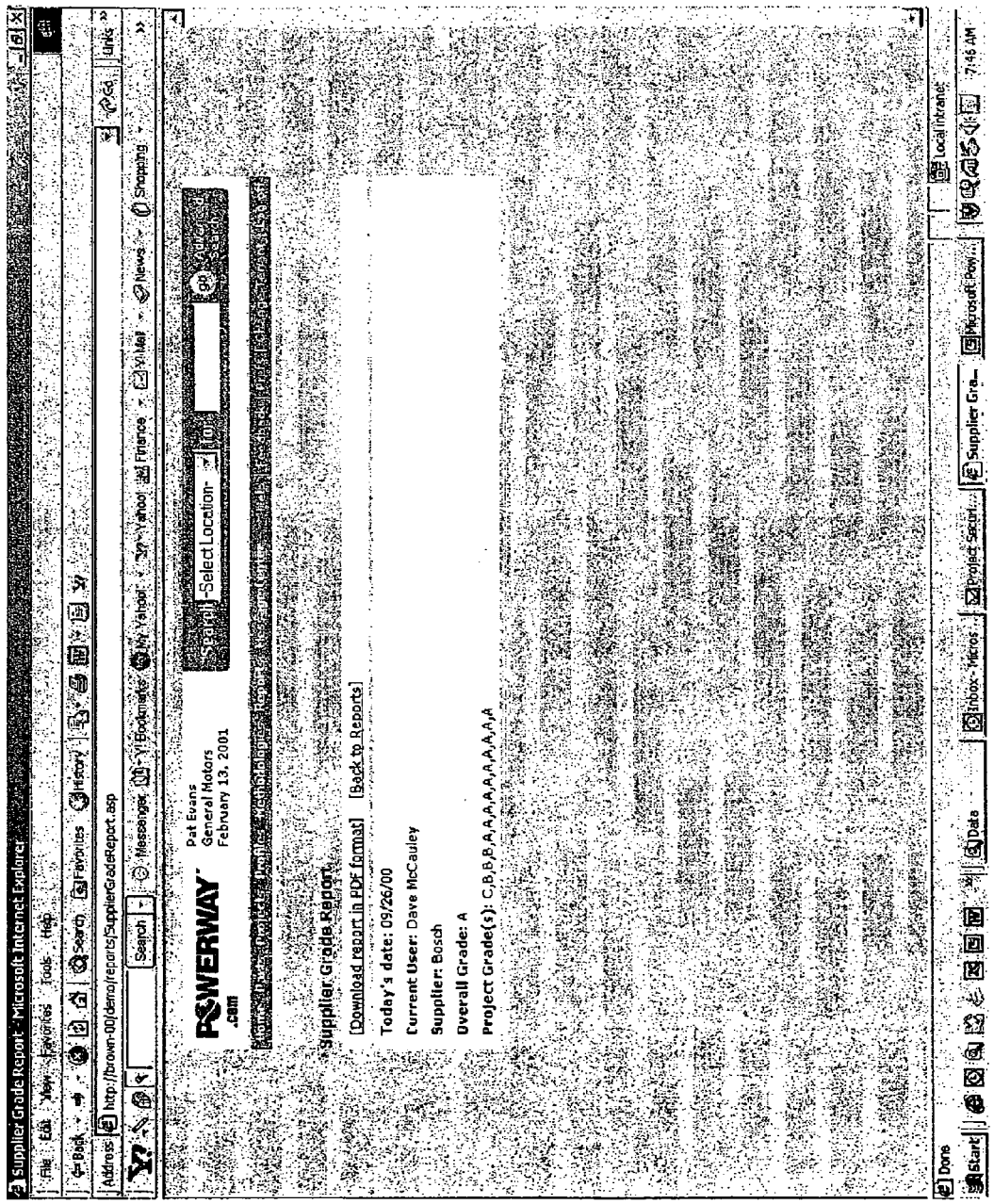
Figure: 40

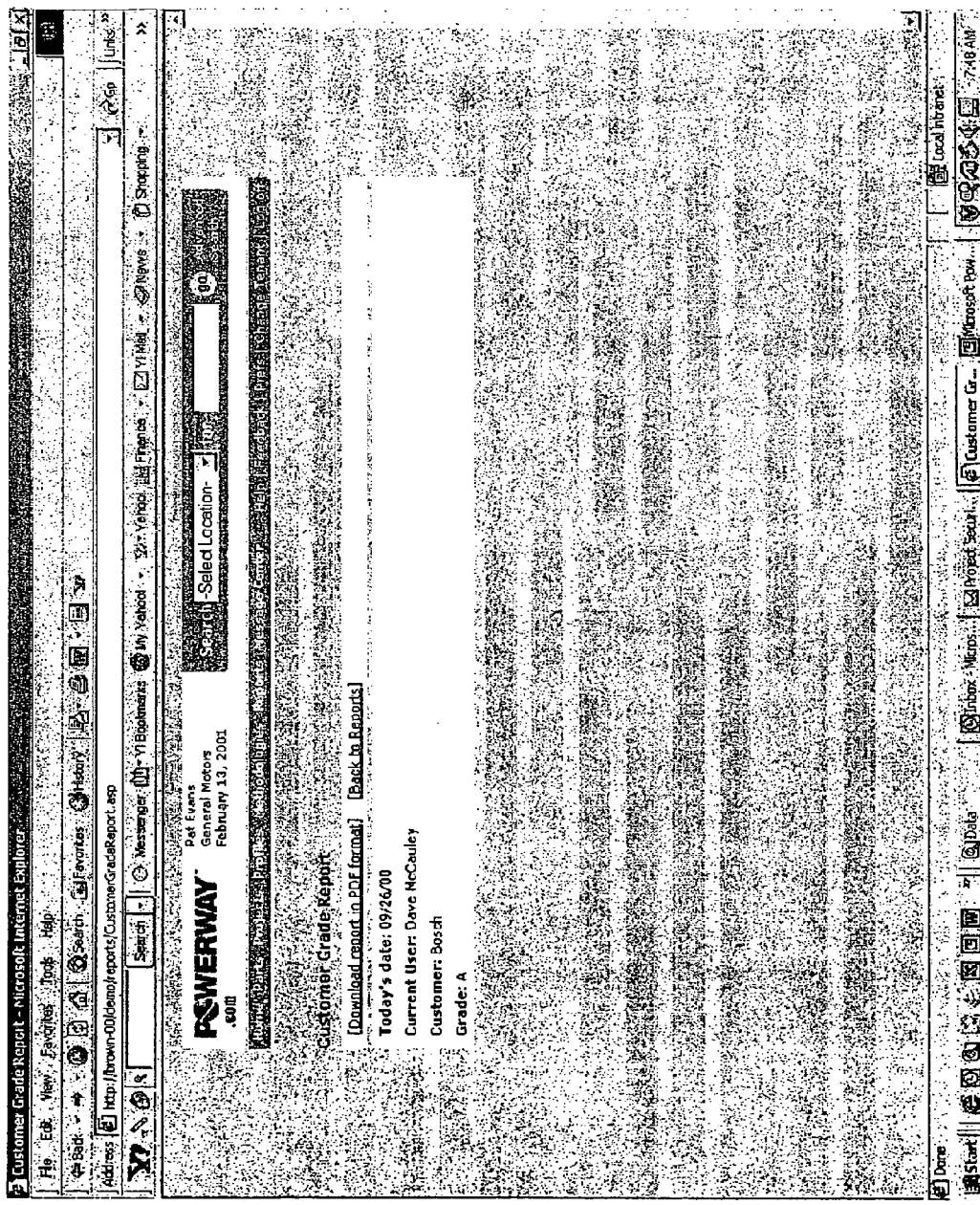
Figure: 41

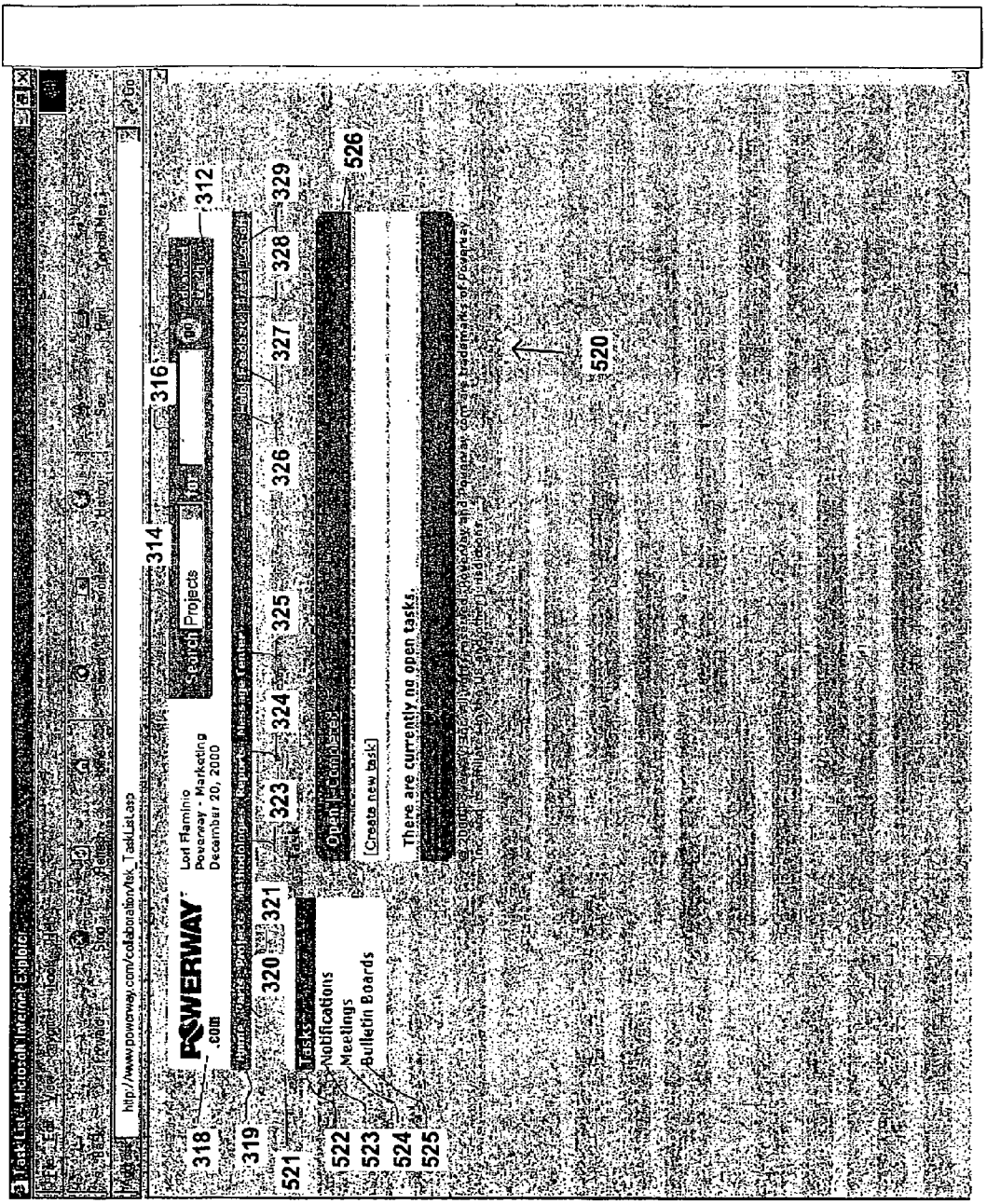
Figure: 42

METHOD AND SYSTEM FOR SUPPLY CHAIN PRODUCT AND PROCESS DEVELOPMENT COLLABORATION

RELATED APPLICATIONS

This is a non-provisional patent application based, in part, on provisional patent application Ser. No. 60/221,422, filed Jul. 28, 2000.

FIELD OF THE INVENTION

This invention relates to transaction systems and methods, and, more particularly, to a transactions system and method for collaboration between entities using networked computer systems.

BACKGROUND OF THE INVENTION

Many products are a complex combination of raw materials and/or components manufactured from a variety of sources. Supply chains (e.g., materials suppliers, component suppliers, assembly suppliers, integrators, and system suppliers) are commonly used to leverage multiple designs, processes and manufacturing specializations to deliver reliable and cost effective products to the global marketplace.

For example, in the automotive industry, a vehicle is comprised of major components (e.g., drive train, chassis, body, interior, etc.) produced by manufacturers with a high degree of expertise in integration. These major systems are, in turn, comprised of sub-systems, assemblies and components (e.g., gears, pistons, engine blocks, seats, etc.) produced by various manufacturers with expertise in transforming materials into parts. The materials (e.g., steel, magnesium, cloth, wire, glass, paint, etc.) are produced by manufacturers with expertise in the chemistry, metallurgy, and other material sciences required to achieve performance and manufacturing properties desired for the product.

A significant amount of the cost to produce any product is determined in the design phase. During the design phase of the product lifecycle, design engineers from multiple sources determine the specific construction of the product to meet desired specifications. Quality engineers define the measures and controls to be used to ensure product quality. Process and/or manufacturing engineers design the process flow, equipment, and measurement devices to be used in the manufacturing process to produce a sufficient quantity of high quality product to meet demand.

In many supply chains, these activities cross organizational boundaries between customer and suppliers. The supplier is commonly responsible for the design of the product and its reliability, performance, safety, and warranty cost. The customer commonly provides specifications, timing requirements, production volume targets, and oversight of the design and development processes.

FIG. 1A illustrates the advanced product quality planning ("APQP") process used in the automotive industry to control the design and development phase for part development. As used on this FIG. 1A, the steps indicated by the numerals in circles have the following meaning:

1. Receipt
2. Forward to Quality Control
3. Review for accuracy and content (forwarded to Quality Control, Engineering, Manufacturing, and Purchasing)
4. Approval by all appropriate departments
5. If in hard copy format at receipt, documents are scanned into electronic format
6. Reformat to meet standard format
7. Documents merged together
8. Copies made for departmental use
9. Storage in repository via hard copy warehouse, CD-ROM diskette, desktop hard drive, external database, or network server for example
10. Submittal In this embodiment, the original equipment manufacturer (OEM) is akin to the manufacturer of end product, such as an automobile. The Tier 1 party is the manufacturer of a major system, and the Tier 2 party contributes a component or material to the major system of the Tier 1 party.

A requirement of the industry standard known as QS-9000, APQP is mandated throughout the automotive industry as a standard method for communicating information, synchronizing activities, and approving parts for production and commerce in the supply chain. As a paper-based system, APQP is a very time consuming and labor intensive activity.

To assist in understanding the APQP process, below is a list of steps taken in the process and tasks involved in such steps. The following list of steps and tasks are excerpts taken from *GM Global APQP, Advanced Product Quality Planning*, General Motors Corporation, GM 1927, June 1999, and defines General Motors Corporation's global common APQP requirements necessary to develop and implement an APQP process for a product or service.

Step I

Pre-sourcing Activity

A. Buyer conducts Key Stakeholders' Meeting. (Task 1)
B. Purchasing sends out RFQ
C. Buyer conducts Technical reviews (Task 2)
D. Buyer/SQE/Engineer conduct risk assessment (Task 3)
   Supplier Quality SOR in RFQ
   Lessons learned added to RFQ (Task 17)
   Risk Assessment
   Preliminary timing charts, Flow charts, control plans and PFMEA strategy (Tasks 5, 7, 13, 13)
   Team Feasibility commitment

Step II

Plan and Define Program

A. SQE schedules APQP kick-off meeting (Task 4)
B. SQE hosts APQP kick-off meeting
C. Supplier provides updated draft of Timing, Open Issues, flow chart, PFMEA, control plan, etc. (Tasks 5, 7, 12, and 13)
D. Initial design and gage reviews (Tasks 9 and 10)
   Initial timing chart, open issues list, flow chart, PFMEA, control plan
   Schedule dates for required workshops (KCDS)
   Updated Lessons Learned checklist (Task 17)

Step III

Product Design and Development

A. SQE attends design reviews and conducts scheduled workshops (APQP Task 9)
B. SQE approves gage concept (Task 10)
C. SQE approves prototype draft of flow chart, PFMEA and PCP (Tasks 7, 12, and 13)

D. GP-11 plan approved by appropriate GM department (Task 11)
E. Program review #2 is conducted (Task 4 and 17))
Updated flow chart, PFMEA, and control chart
Gage concept
Feasibility Letter #1 (Task 6)
Updated timing charts & Issues list Step IV Process Design and Development A. SQE attends design reviews and promotes lessons learned (Tasks 9 and 17)
B. SQE approves gage design (Task 10)
C. SQE guides update of post-prototype flow chart, PFMEA, control chart (Tasks 7, 12, and 13)
D. GP-11 parts, modules and systems approved (Task 11)
E. Risk Assessment updated by SQE (Task 3)
F. Program Review #3 is conducted (Tasks 4 and 17)
Updated flow, PFMEA, control chart, timing charts, & Issues list
Approved gage design
Feasibility letter #2
GP-12 plan (Task 14)
Updated Risk Assessment Step V Product and Process Validation A. SQE attends design reviews and promotes lessons learned (Tasks 9 and 17)
B. SQE approves gage design (Task 10)
C. SQE guides update of post-prototype flow chart, PFMEA, control chart (Tasks 7, 12, and 13)
D. GP-11 parts, modules and systems approved (Task 11)
E. Risk Assessment updated by SQE (Task 3)
F. Program Review #3 is conducted (Tasks 4 and 17)
Updated flow, PFMEA, control chart, timing charts, & Issues list
Approved gage design
Feasibility letter #2
GP-12 plan (Task 14)
Updated Risk Assessment Step VI Feedback, Assessment and Corrective Action A. Supplier performs GP-8 and updates control plan
B. GP-12 is completed
C. Lessons learned captured and DFMEA/PFMEA are updated (Task 17)
D. APQP is concluded
Updated control plan
DFMEA/PFMEA updated with lessons learned The arrows (→) indicate an output as a result of the step. The tasks referred to in parenthesis in the above steps are:

| APQP Activity |
| --- |
| 1 Key Stakeholders Mtg. |
| 2 Technical Reviews |
| 3 Risk Assessment |

| APQP Activity |
| --- |
| -continued |
| 4 Supplier Program Reviews |
| 5 Timing Charts/Open Issues |
| 6 Feasibility Letters |
| 7 Flow Chart |
| 8 DFMEA |
| 9 Design Review |
| 10 Gage Review |
| 11 GP-11 |
| 12 PFMEA Strategy |
| 13 Control Plan |
| 14 GP-12 |
| 15 PPAP |
| 16 Run @ Rate (GP-9) |
| 17 Lessons Learned |

Some of the abbreviations used in the above steps are:

| Meaning of Abbreviation | |
| --- | --- |
| RFQ | Request for Quote |
| SOR | Statement of Requirements |
| SQE | Supplier Quality Engineer |
| PPFMEA | Process Failure Mode and Effects Analysis |
| DFMEA | Design Failure Mode and Effects Analysis |

As is evident from the above example, the APQP process is a complicated one, involving the participation of many different persons from both the supplier and the customer. APQP involves the application of numerous standards and requires the completion of many documents related to quality and/or specifications of the product to be produced. The above steps are applicable between each customer and supplier in the supply chain. With the addition of each tier in the supply chain, the coordination and collaboration of those in the supply chain becomes much more complex. Thus, the processes illustrated in FIGS. 1A, 1B, and 1C are simplified in comparison to the entire APQP process, but serve to provide a basis for the issues related to prior methods for dealing with the APQP process.

In FIG. 1B, the time-consuming aspect of the prior art process of FIG. 1A is illustrated. Specifically, the steps of receipt, forwarding to quality, and review for accuracy and content of the information provided by the Tier 2 to the Tier 1 may take thirty-six days to complete.

FIG. 1C illustrates the steps of the process of FIG. 1A to which value is added. Specifically, the OEM, Tier 1, and Tier 2 each add value to the process when performing their review for accuracy and content. Generally, all other steps are primarily administrative in nature.

Referring now to FIG. 2, there is shown a block diagram of the flow of products in an exemplary supply chain segment. FIG. 2 illustrates the hierarchy of products supplied to result in a particular final product. Specifically, OEM company 180 is a manufacturer of automobiles. OEM company 180 does not manufacture all parts of any automobile itself. Instead, it seeks parts from others. In the example of FIG. 2, seating assemblies are manufactured by seating manufacturer 182. Other parts are manufactured by first and second other suppliers 181 and 183, respectively. Seating manufacturer 182 has certain sub-parts manufactured by others. Specifically, seat covers, frames, and position adjustment motors are manufactured by seat cover manufacturer 184, seat frame manufacturer 185, and motor manufacturer 186, respectively. Seat cover manufacturer 184 obtains fabrics from fabric manufacturer 187. Motor manufacturer 186 obtains windings from winding manufacturer 188.

FIG. 2 illustrates that many companies in the supply chain serve as both a customer and a supplier. For example, seating manufacturer 182, is a supplier of seating assemblies to OEM company 180 and a customer to seat cover manufacturer 184, to frame manufacturer 185, and to motor manufacturer 186. Seat cover manufacturer 184 is a supplier to seating manufacturer 182 and a customer to fabric manufacturer 187. Each company receives a product or products from the tier below, adds value to the product(s) by transforming it (them) or assembling (it) them into new product(s), and supplies the transformed or assembled product(s) to the tier above.

A key concern is that the outsourcing of design and manufacture in a supply chain exposes those higher in the supply chain to risks delivered by those lower in the supply chain. To mitigate such risks effectively, a supply chain must coordinate design and development activities and provide customer (OEM) requirements available to all suppliers affected by those requirements. Measurements of a supplier's performance in meeting defined requirements must be in place and made available to those customers affected by such supplier performance.

To manage the risks associated with outsourcing, companies implement controls that tie the requirements and measurements together with an evaluation method that generally involves auditing the supplier. The high cost and long time frame associated with these controls often create the necessity to perform risk profiling. With such risk profiling, usually the number of suppliers that can be evaluated is reduced by selecting only those who generate highest risk. If this approach is taken, many suppliers, and thus products, go unmonitored, thereby exposing the company and end product to even more risk.

It is useful to consider the risks, requirements, measurements and evaluation in the context of an example that constitutes prior art and is illustrated in FIG. 2. OEM company 180 may submit a request for quotation ("RFQ") to manufacturer 182 of seating assemblies for vehicles. OEM company 180 specifies the requirements for a new seating assembly product. Seating manufacturer 182 is an assembler, and thus it, in turn, sends RFQs for seat covers to seat cover supplier 184, for frames to frame supplier 185, and for position adjustment motors to motor supplier 186. These three suppliers to the seating manufacturer 184, 185, and 186 may each be referred to as a trading partner with seating manufacturer 182.

A product team is established comprising members from seating manufacturer 182 and each of its trading partners 184, 185, and 186. As a first phase, the team performs planning and determines the overall feasibility of design and manufacture of a seating assembly in accordance with the requirements of OEM company 180. During this first phase, the product team determines if there is unusual risk to any participant based on the requirements of OEM company 180 and on the previous experiences of each participant. During this first phase, generally collaboration occurs in a one-to-one (individual to individual) basis with the customer central to communication with each of its suppliers.

Seating manufacturer 182 and each trading partner 184, 185, and 186 conclude this first phase of activity by exchanging documentation (prints, design specifications, quality criteria, etc.). If the project is agreed to, seating manufacturer 182 and its trading partners 184, 185, and 186 finalize their response to the RFQ of OEM company 180.

If OEM company 180 accepts the response to the RFQ, the product design phase begins to occur at OEM company 180, seating manufacturer 182, and trading partners 184, 185, and 186. As product designs are developed and documented by each participant, information must be shared among the participants to ensure that the designs will work well together. Any design change by any participant could have an effect on another design activity, so the need for timely communication is paramount. As in the first phase discussed above, communication is usually centered about the customer and is one-to-one with each of the customer's suppliers.

During this design phase, engineers are often required to determine and document the potential for failure in the design. Some failures could cause mere inconvenience, while other failures could threaten consumer safety. A failure in any component could result in failure of the end product. Failures in more than one component, or the potential thereof, can significantly impact the success and reliability of the end product.

An example of a tool used by the automotive industry for communicating design risk is known as the design failure mode and effects analysis ("DFMEA") tool. This tool provides an objective measurement of risk that is often used to determine the viability of a particular design. The document resulting from a DFMEA tool is often a required document for the automotive APQP process, and is commonly exchanged between participants in compliance with this requirement.

In the example presented, a design engineer at seating manufacturer 182, upon completion of a draft of the DFMEA for the new seat product, delivers the document to a design engineer at OEM company 180 for review. The company's design engineer evaluates the design risks described in the document. This activity often involves a meeting or discussion between the design engineers using a copy of the DFMEA document with the company's design engineer's comments attached.

If the product design is determined to be viable and has neared stability, seating manufacturer 182 and its trading partners 184, 185, and 186 each begin the process design phase. The process design phase is usually associated with a particular manufacturing facility for it involves definition of the method and sequence of manufacture, the equipment used in manufacture, and the measurement equipment used to ensure quality compliance with the requirements.

It is common for process and/or manufacturing engineers, quality engineers, and design engineers to collaborate during the process design phase. Such collaboration is necessary to define the flow of materials through the manufacturing facility. In the example presented, seating manufacture 182 creates a process flow diagram ("PFD") detailing the sequence of operations for assembly of the new seat. Each of the seating manufacturer's trading partners 184, 185, and 186 provides seating manufacturer 182 with a PFD for the seat covers, frame, and motor, respectively. Other documents exchanged during the process design phase are required in the automotive industry QS-9000 standard. These documents include, but are not limited to, a control plan, process failure mode and effects analysis, and a characteristics list. Some of the documents exchanged are uniquely specified by the customer purchasing the product. Thus, OEM company 180 could require special documents of seating manufacturer 182, and seating manufacturer 182 could require special documents of each of its trading partners 184, 185, and 186.

After the product design and process design phases have matured, the phase of validation and verification of the design begins. Validation and verification activities include the manufacture of prototype parts, taking measurements of the product and the processes, and analysis to determine if the equipment used in the processes is capable of producing a quality product at desired production rates. During this phase, the measurement equipment must also be verified to be substantially free from reliability and repeatability problems, even when used or operated by different inspectors. All these validation and verification activities generate objective evidence of the viability of the product and the processes to meet the company's requirements.

Following the automotive industry example, in the validation and verification phase, seating manufacturer 182 performs statistical process capability studies on each machine selected to perform a manufacturing process in creating the new seat. Each critical characteristic (product and/or process measurement) is measured during a manufacturing run of one hundred parts. The critical characteristics are analyzed using the specifications defined in the design phase to determine machine capability. All of the processes used by seating manufacturer 182 in manufacture of the new seat are evaluated in this manner and the results communicated to the company. Seating manufacturer 182 requires the same type of documentation from each of its trading partners 184, 185, and 186 for analysis by seating manufacturer 182.

The production part approval process ("PPAP") is the final phase of APQP. PPAP requires that specific documentation be submitted by a supplier to its customer. As this submittal process cascades up the supply chain from lower tiers to the original equipment manufacturer (OEM), the cumulative time required for paper handling, copy, distribution, analysis, redistribution, and communication processes delay production readiness. These delays extend the time-to-market for the product, and, therefore, increase the cost for the entire supply chain. Additionally, the last minute nature of this transfer of information commonly results in late engineering changes, production delays, and higher warranty costs.

In the example of seating manufacturer 182, each of its trading partners 184, 185, and 186 is required in the PPAP phase to deliver documentation specified by seating manufacturer 182 to seating manufacturer 182. Seating manufacturer 182 is required to deliver documentation specified by OEM company 180 to OEM company 180. Of course, the documentation required by seating manufacturer 182 of its trading partners 184, 185, and 186 is used, in part, to create the documentation required by OEM company 180 of seating manufacturer 182. Conversely, or additionally, the contents of the documentation required by seating manufacturer 182 of its trading partners 184, 185, and 186 may be determined, in part, by the content of the documentation required by OEM company 180 of seating manufacturer 182.

Certain isolated instances of the APQP process have been automated. For example, systems such as Advanced Quality Planning by Pilgrim Software of Tampa, Fla. and Powerway Quality Planner by Powerway, Inc. of Indianapolis, Ind. produce the DFMEA document referred to above. Documents related to the QS-9000 standards, and the management thereof, are available from Powerway, Inc. of Indianapolis, Ind. Software does exist for placing documentation in electronic format and for transmitting electronic files between various entities. Many times in the prior art, disparate document authoring and communication systems have dictated the abandonment of the electronic form that these software applications produce. The lack of a common medium for communication has resulted in reliance on the manual exchange of paper documents. There is a need to develop a more efficient way of handling the APQP process to avoid many of the shortcomings addressed herein.

For example, because the goals of supply chain participants are common, it is desirable to provide a system and method for supply chain product and process development that permits electronic participation by all participants in the supply chain. It is also desired that the system and method accommodate the collaboration of many types of individuals and systems from each participant who contribute to the phases of RFQ, planning and feasibility, product design, process design, validation and verification, and PPAP. Of course, such collaboration should provide persons with access to the appropriate information and functionality while preserving system integrity and security, and while protecting the level of security desired by any of the participants.

It is also desired to develop an APQP system and method that expedites the time-consuming steps in today's APQP process. It is further desired to: enhance the planning and feasibility phase by support of the product team; coordinate and culminate failure analysis; allow various types of engineers to collaborate during the process design phase; coordinate documentation required and/or produced throughout all phases of APQP; and reduce the possibility of product failure, production delays, late engineering changes, or quality issues in the end product.

It is also desired to develop a system and method applicable to project, process, and product design and development other than the APQP process. As noted above, the APQP process is comprised of six basic steps: (1) pre-sourcing activity; (2) plan and define program (3) product design and development; (4) process design and development; (5) product and process validation; and (6) feedback, assessment, and corrective action. While the specific tasks and outputs of each step may vary for a process other than APQP, these basic steps may be applicable to such other process. Further, it is desired that the system and method for project, process, and product design and development be capable of accommodating steps differing from those of the basic six steps of APQP to permit for even more applications of the system and method.

In many industries, the approach taken to address project, process, and product planning has resulted in distributed systems. An entity develops one or more automated programs to provide that entity with a competitive advantage over others similarly situated to that entity. To accommodate communication between programs operated by that entity, interfaces are required to be developed.

In recent years, business has realized that it is advantageous to enhance communication with others with whom that business conducts business. The prevalence of the Internet is just one of the technologies that has made this communication possible. However, the evolution and movement toward distributed systems has made this communication very difficult. Generally, a business must develop interfaces to each of its partners in order to realize this communication. Thus, it is desired to develop a system and method for project, product, and process management that permits for standardized communication between those businesses that participate in the design, development, and/or manufacture of that project or product. This includes the need to standardize communication between entities under the same company umbrella (subsidiaries, divisions, facilities, etc.) as well as departments or groups within the same entity.

In providing standardized communication, it is also desired that the participating entities not be required to make significant capital investments to achieve that result. Generally, each participant has probably already invested a great deal in the legacy, distributed systems it operates. Also, it is conceivable that a project/product management software offering does not address all of the business's needs. For example, the accounting functions of the business may be handled by the business's legacy accounting system. Thus, it is preferable that the participant be able to use some of those legacy systems, i.e., that a project/product management system does not require that the participant replace all such legacy systems.

Various types of project management software are available. Some project management software is generic, i.e., intended for a myriad of project management uses. For example, Microsoft Corporation's Project™ software may be used by professionals and engineers for their projects. Other project management software is specifically built for specialized types of projects. In all instances, however, project management software's primary focus is in planning the project. The user generally must identify the tasks and resources, and develop timelines and milestones for the project. These project management software applications therefore do not help to ensure compliance with quality standards or required methodologies. Thus, it is desired to provide a management system that ensures that appropriate standards are addressed and completed for the project.

With regard to product management, it is desirable for the OEM to identify the risks associated with the product and related processes. If the product is comprised of several components, each component contributes risk to the end product. Today, the OEM is usually only privy to its own quality and risk information and that of its direct suppliers. The OEM is generally not permitted to ascertain risks of the lower tiers in the supply chain. Such determination can be made, but only with significant effort as has been discussed herein. A company generally lacks the ability to gather project-related data from one central data source and use the gathered data to generate scores to measure historical and future project performance and risk. In general, a company is limited to historical data gathered from disparate systems with different data and rules, making the integration of that data very difficult, if not impossible. A company is not able to customize project goals within a system to immediately view a project is progressing, and cannot view trends occurring throughout the lifetime of a project. It is even more difficult to assess the performance metrics and risk in a multi-tier supply chain to get a complete picture of product and process risk. Therefore, it is desired to provide a system operable for a supply chain that is capable of identifying risks at any point in the supply chain, and, of course, to quantify such risks.

BRIEF DESCRIPTION OF THE DRAWINGS

FIG. 1A shows a diagrammatic view of typical production part approval process according to the prior art.

FIG. 1B shows a diagrammatic view of the process of FIG. 1A identifying some processes that take as long as thirty-six days to complete according to the prior art.

FIG. 1C shows a diagrammatic view of the process of FIG. 1A identifying those steps in which value is added to the process in accordance with the prior art.

FIG. 2 shows a block diagram of the flow of products in an exemplary supply chain segment in accordance with the prior art.

FIG. 3A shows a diagrammatic view of one embodiment of the system of the present invention.

FIG. 3B shows a diagrammatic view of the system of FIG. 3A identifying several of the functions included in this embodiment.

FIG. 4 shows a block diagram of one embodiment of the system according to the present invention.

FIG. 5 shows a diagram of the software architecture of one embodiment of the system of the present invention.

FIG. 6 shows a graphical representation of the design model according to one embodiment of the system of the present invention.

FIG. 7 shows a graphical representation of the tenant and project model according to one embodiment of the present invention.

FIG. 8 shows a diagrammatic view of the information flow between supplier and a customer for product and process design according to one embodiment of the present invention.

FIG. 9 shows a screen printout of one embodiment of a login page according to one embodiment of the present invention.

FIG. 10 shows a screen printout of one embodiment of a home page according to the present invention.

FIG. 11 shows a screen printout of one embodiment of the parts list page according to the present invention.

FIG. 12 shows a screen printout of one embodiment of the parts information page according to the present invention.

Figure 13:
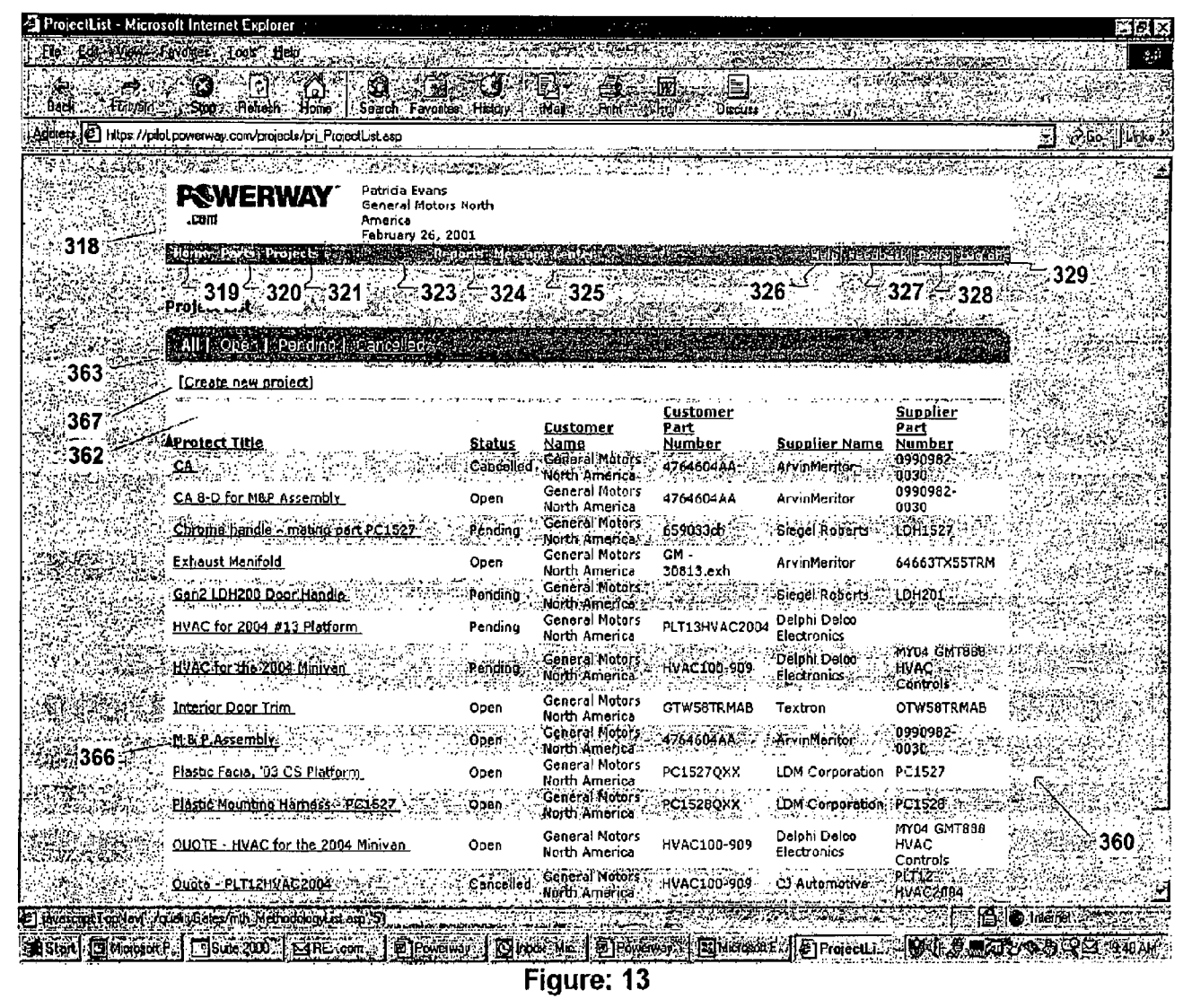

FIG. 13 shows a screen printout of one embodiment of a project list page according to the present invention.

FIG. 14 shows a screen printout of one embodiment of a project information page according to the present invention.

FIG. 15 shows a screen printout of the project information page of FIG. 14 having a help screen superimposed thereon according to the present invention.

FIG. 16 shows a screen printout of one embodiment of a quality gates page according to the present invention.

FIG. 17 shows a screen printout of one embodiment of a project documents page according to the present invention.

FIG. 18 shows a screen printout of the project documents page of FIG. 17 having a document screen superimposed thereon according to the present invention.

FIG. 19 shows a screen printout of one embodiment of a project team list page according to the present invention.

FIG. 20 shows a screen printout of one embodiment of a project planned visits page according to the present invention.

FIG. 21 shows a screen printout of one embodiment of a Project visit information page according to the present invention.

FIG. 22 shows a screen printout of one embodiment of a project meeting page according to the present invention.

FIG. 23 shows a screen printout of one embodiment of a project meeting information page according to the present invention.

FIG. 24 shows a screen printout of one embodiment of a project bulletin board page according to the present invention.

FIG. 25 shows a screen printout of one embodiment of a security project access page according to the present invention.

FIG. 26 shows a screen printout of one embodiment of a security document access page according to the present invention.

FIG. 27 shows a screen printout of one embodiment of a tenant list page according to the present invention.

FIG. 28 shows a screen printout of one embodiment of a tenant information page according to the present invention.

FIG. 29 shows a screen printout of one embodiment of a tenant users page according to the present invention.

FIG. 30 shows a screen printout of one embodiment of a tenant project jobs page according to the present invention.

FIG. 31 shows a screen printout of one embodiment of a methodologies list page according to the present invention.

FIG. 32 shows a screen printout of one embodiment of a methodologies information page according to the present invention.

FIG. 33 shows a screen printout of one embodiment of a reports page according to the present invention.

FIG. 34 shows a block diagram of one embodiment of the performance and risk scoring functions of the present invention.

FIG. 35 shows a graphical illustration of performance measurement and scoring according to one embodiment of the present invention.

FIG. 36 shows a graphical illustration of risk measurement and scoring according to one embodiment of the present invention.

FIG. 37 shows a screen printout of one embodiment of a health check report page according to the present invention.

FIG. 38 shows a table for illustration of the application of reporting functions according to one embodiment of the present invention.

FIG. 39 shows a screen printout of one embodiment of an anonymous grade report page according to the present invention.

FIG. 40 shows a screen printout of one embodiment of a supplier grade report page according to the present invention.

FIG. 41 shows a screen printout of one embodiment of a customer grade report page according to the present invention.

FIG. 42 shows a screen printout of one embodiment of a message center page according to the present invention.

SUMMARY OF THE INVENTION

The present invention comprises a system and method for supply chain product and process development collaboration. Both the system and method of the present invention are based on a supply chain model comprised of projects. A project is the combination of a part (or family of parts), a supplier to supply the part, and a customer to be supplied (e.g., purchase) the part. A project based on a part which is a sub-part (component, sub assembly, unfinished part, material, etc.) of a part of another product is referred to as a sub-project.

Also important in the model of the present invention are the methodologies imposed by those in the supply chain. A methodology template describes the phases or milestones (quality gates) required of a project and the document deliverables that are expected at those quality gates. Methodologies are key to ensuring that the proper part and a part of appropriate quality are produced. It is conceivable, for example, that an OEM company desires that certain specifications and quality measures apply to all parts and sub-parts comprising the product desired by the OEM customer. Because a part is a component of a project, it is appropriate to state that a methodology is applicable to a project. By applying a methodology to a project, the part is designed, developed, tested, manufactured, etc. in compliance with the methodology(ies) applied to the project.

In one embodiment of the system of the present invention, the system includes a processor and a project data storing and retrieving means operably connected to the processor. The project data stored includes, for each project of the supply chain, a project identifier, a supplier identifier, a customer identifier, data representative of at least one methodology applicable to the project, and data representative of at least one control (quality gate) associated with processing of the project. The data storage and retrieval means may comprise memory and/or a hard drive, for example. A user system may be operably connected to the processor for selective retrieval of project data. The system may involve use of telecommunications technology, such as the Internet, for connection of one or more user systems to the processor of the management system.

In another embodiment of the present invention, the processor includes a means for monitoring and controlling the progression of a project through its quality gate(s). Such monitoring and controlling means ascertains whether the applicable methodology(ies) is (are) complete and stores and indicator of complete or incomplete, accordingly.

In one embodiment of the method of the present invention, at least one requirement (such as a document deliverable) and an associated measurement criterion indicative of whether the requirement is met is created and stored. This is the creation and storage of a methodology—a document deliverable and quality gate or specifications. For a project, a project record is created and stored, with that project record containing identifiers for the project, the part, the supplier, and the customer, and including an indicator of which requirement(s) is (are) applicable to the part of the project. The next step is monitoring for entry of data related to the project record. When entered dated is detected, it is evaluated for relevance to the at least one requirement associated with the project. If the entered data is relevant to the at least one requirements, the entered data is further examined to determine whether the measurement criteria for the applicable requirement is met.

These basic embodiments of the system and method of the present invention provide a framework for collaboration on all projects of a supply chain using a communicative platform. The imposition of requirements, measurement, and control ensure that the appropriate methodology(ies) is (are) applied to the projects of the supply chain. In prior art systems, there exists no means to ensure such imposition and no platform to enable revision of the methodologies and application of the latest revision. Instead, prior art systems are dependent upon disjointed communication between individuals in the supply chain.

In another embodiment of the present invention, the supply chain management system includes a first database containing at least one methodology applicable to the supply chain and a second database containing a project record for each of the projects of the supply chain. Each project record includes identifiers for the part, the supplier, and the customer of the project, and an indicator of which methodology(ies) apply to the project. The system also includes a means for controlling the progress of the project using the indicated applicable methodology(ies).

In alternate embodiments, the system further includes collaborating means for data entry and retrieval by each of the suppliers and customers of the supply chain projects. The system may also include a means for establishing one or more tasks (work assignments) for a supplier or customer. Another feature is the addition of a notification generating means to inform a user of his/her tasks, meeting, etc. requiring that user's attention based on the aggregation of roles on multiple projects to which the user is assigned. The system may also include a bulletin board for exchange of information between team members of a project about the project. Further, the system may include a means for setting up a meeting between team members associated with a project.

The system of the present invention utilizes the concept of team members. Team members for a project are those individuals from the project supplier and project customer who have a need to collaborate regarding the project. Thus, team members include, but are not limited to, those users assigned the roles of Project Manager, Design Engineer, Quality Engineer, etc. for both the supplier and customer.

With these alternate embodiments, the system provides various collaboration tools for collaboration about a project in the supply chain and among suppliers and customers up and down the supply chain. Such collaboration introduces efficiencies in the product and process design, development, and manufacturing phases and reduces the time-to-market cycle. Such efficiencies also help to reduce costs associated with the phases.

In another embodiment, the supply chain management system includes two levels of security for users of the system. The first security level is related to general project functions (tasks, notifications, meetings, planned visits, project information, bulletin boards, etc.) and the second security level is related to documents associated with the methodologies. The security levels are assigned based on project roles rather than individual users. Individual users are assigned a project role. In this manner, it is not necessary to establish security levels for each new user, thereby reducing administration time associated with establishing new users to the system.

In yet another embodiment of the invention, the supply chain management system includes a processor and a data storage device operably connected to the processor. Stored on the data storage device are a project record and a sub-project record. The system also includes data representative of at least one methodology imposed on the project and/or sub-project. The system also includes an evaluation subsystem operable by the processor for evaluating the project/sub-project in view of the applicable methodology. The system may also include a reporting subsystem for reporting the results of the evaluation subsystem.

The evaluation and reporting features permit for determination of levels of completion and risk for all projects of the supply chain. Completion is converted to performance by establishing expectations (dates, data values, etc) as goals and comparing "completion" data to these goals to result in a score for completion. Information about the levels of completion and risk are available to project team members and up and down the supply chain. In this manner, completion and risk can be determined without an audit of a participant's facility.

DESCRIPTION OF THE INVENTION

Referring now to FIG. 3A, there is shown a diagrammatic view of one embodiment of the system of the present invention. In this embodiment, system 200 is connected to original equipment manufacturer ("OEM") system 202, tier 1 system 204, and tier 2 system 206. System 200 generates and maintains documents 208 from functions described herein.

System 200, OEM system 202, tier 1 system 204, and tier2 system 206 are connected by one or more networks. In one embodiment, the network may comprise a global network, such as the Internet. The network may comprise other networks, such as a local area network, wide area network, telecommunications wire and/or fiber network, satellite network, or other wireless networks, as are well known in the art, or any combination thereof.

System 200 generally comprises at least one server having means for connection to the network, a processor, memory and a database. Each of OEM system 202, tier 1 system 204, and tier 2 system 206 also include a means for connection to the network, memory, and some processing power. In one embodiment, OEM system 202, tier 1 system 204, and tier 2 system 206 each comprise a personal computer having an Internet browser, such as Microsoft Corporation's Internet Explorer™ or Netscape Corporation's Navigator™, residing thereon. OEM system 202, tier 1 system 204, and tier 2 system 206 may comprise other devices capable of bi-directional communication with a network, such as a personal data assistant, a Palm™ Pilot™, laptop computer, or telephone, for example.

In the Internet-based environment, most of the processing required for the invention is accomplished at system 200, with the peripheral OEM system 202, tier 1 system 204, and tier 2 system 206 primarily used for interaction and access to information and programs residing at system 200. One skilled in the art will recognize and appreciate, however, that the distribution of processing power and the location of data stored need not be dominated by system 200. It will also be appreciated by those of skill in the art that system 200 can be operably connected by means well known in the art to other systems of any participant (OEM, tier 1, tier 2, etc.). Such integration might be useful for interaction with a participant's CAD system, product data management ("PDM") system, or product lifecycle management ("PLM") system, or integration with a participant's enterprise requirement planning ("ERP") system, for example.

The components illustrated in FIG. 3A are representative of participants in the supply chain. OEM system 202 is operated by a company seeking design, development, and/or manufacture of at least one end product. Each end product is composed of one or more components provided by others. Tier 1 system 204 is operated by a supplier of one or more sub-assemblies or components to the OEM. Tier 2 system 206 is operated by a supplier of one or more sub-assemblies or components to the tier 1 supplier, with those sub-assemblies or components comprising all or a portion of the sub-assemblies or components provided by the tier 1 supplier to the OEM. Referring to the example discussed in the Background of Invention section of this patent application, the OEM is the company requiring a new seating assembly, the tier 1 supplier is the seating manufacturer, and the tier 2 supplier is one of the trading partners to the seating manufacturer.

System 200 may be operated by any of those involved in the supply chain. Alternatively, system 200 is operated by a third party who serves one or more OEMs. If the OEM generates system 200, then system 200 and OEM system 202 may be one and the same.

Referring now to FIG. 3B, there is shown a diagrammatic view of the system of FIG. 3A identifying several of the functions included at system 200 and showing additional participants. System 200 provides many functions including: (1) Quality Analysis (product, process, and push); (2) Gate Readiness; (3) Supplier Development; (4) Performance Management; (5) Warranty Management; (6) Development Lead Time; (7) Automation of Program Management; (8) Measurement and Control; and (9) Failure Analysis. These and other functions of system 200 will be discussed in greater detail herein.

System 200 is capable of interacting with other systems for functions provided by other parties. Those functions include, but are not limited to, product data management ("PDM") systems, advanced planning and scheduling systems, manufacturing execution systems ("MES"), supply exchange networks, and ERP systems, such as those offered by SAP, J. D. Edwards, BaaN, Oracle, and PeopleSoft, for example.

Referring now to FIG. 4, there is shown a block diagram of the hardware of one embodiment of the system according to the present invention. In the embodiment of FIG. 4, system 200 comprises Internet subsystem 210, production subsystem 211, training subsystem 212, testing subsystem 213, and pilot subsystem 214. System 200 also includes EMC Connectrix 215 and EMC Symmetric 216. EMC Connectrix 215 and EMC Symmetrix 216 are the EMC Connectrix Enterprise Director ED01032 and EMC Symmetrix 8000 products, respectively, offered by EMC Corporation. Collectively, EMC Connectrix 215 and EMC Connectrix 216 serve as a massive data storage system operably connected to the servers of system 200. Internet subsystem 200 contains first switch 217, firewalls 218, 219, and 220, servers 221 and 222, and second switch 223 for connection to Internet 224.

Production subsystem 211, training subsystem 212, testing subsystem 213, and pilot subsystem 214 each comprise several servers. The function of each type of server is described below. Production subsystem 211 is the environment supporting production use of system 200. Training subsystem 212 is the environment used to support training in use of system 200. Testing subsystem 213 is the environment supporting testing of system 200. Pilot subsystem 214 is the environment used for development of system 200 for use by a third party, such as an OEM, or supplier. The designation "(x2)" used in FIG. 4 means that there are two (2) servers of that type in this embodiment of system 200.

Each of the types of servers used in subsystems 211, 212, 213 and 214 are now described. Web/application server, denoted as "Web/App Server" is responsible for management of tenant (user) interaction with the system website. In this embodiment, the system website is serviced by Internet subsystem 210 and is located at the URL of http://www.powerway.com. The primary purposes of each Web/App Server are to: (1) serve up web pages (also referred to as ASP pages, where "ASP" means, in this context, active server page) to the user's web browser; and (2) control business logic and access to the database(s) to which the Web/App Server is operably connected. Software applications for supply chain services ("SCS"), document control services ("DCS"), business process engine ("Concentus"), and session management ("User-Session") reside local to each Web/App Server.

The SCS application includes the handling of business objects for tenants, users, methodologies, projects, parts, and documents. The DCS application includes document metadata and life cycle management. The Concentus (also referred to BPE) application includes workflow and project state management. The User-Session application includes establishing, authenticating, and validating user session states in an otherwise stateless environment. The control of workflow in system 200 is described herein.

It will be appreciated by those of skill in the art that the primary functions of a Web/App Server could be operated on two different severs, resulting in a system architecture that includes Web servers to serve up web pages and App Servers to control business logic and access to the database(s). In so separating these functions, the App Servers may be useful in providing business logic to other applications. For example, an App Server may also service integration with a legacy system for interaction of system 200 and the legacy system with one or more databases of system 200.

Each database server, denoted as "DB Server," contains the appropriate workflow and ("DCS/SCS") databases, containing data relevant to the processes and components within the underlying website application. For example, the DB Server of training subsystem 212 contains data relevant to the training software application. Each DB Server also contains database management software, such as Microsoft SQL Server, for management of the database. In the absence of any File Servers (as discussed below), the DB Server assumes the role of the primary database server. If File Servers are used in system 200, the DB Server assumes the role of the File Server in the event the File Server (discussed below) becomes inoperable.

The optional file servers (denoted as "File Server") of production subsystem 211 and testing subsystem 213 are operably connected by means well known in the art to EMC Connectrix 215 and EMC Symmetrix 216. Each File Server provides the ability to massively scale the number of Web/App Servers. As the number of Web/App Severs increase, it may no longer be feasible to separately upgrade all of the application logic on each Web/App Server. In such instance, all web pages, graphics, and application logic of a subsystem resides on a File Server and is accessed and sued by the Web/App Servers. Further, the File Servers provide a cache of engineering documents frequently accessed from the Doc Servers (see description below), and provide a means for dynamic update of Web/App Servers without removing the Web/App Servers from service to upgrade them. The ability to upgrade the Web/App Servers dynamically greatly reduces the time required for scheduled application maintenance. Thus, when present, each File Server contains the appropriate website application, namely, the production software for production subsystem 211, and to-be-tested software for testing subsystem 213. Also residing on each File Server is a database management system such as Microsoft SQL Server.

Each subsystem 211, 212, 213, and 214 includes a workflow server (denoted as "Workflow Server"). Each Workflow Server contains the Concentus business process engine. The primary responsibility of each Workflow Server is to provide functionality to the application for the project and work item components, and to manage these components' effort throughout the online project collaboration process. A second (warm) Workflow Server is present in production subsystem 211 to act as a backup to the first Workflow Server.

The SMTP (simple mail transport protocol) server of each subsystem 211, 212, 213, and 214 (denoted as "SMTP Server/Domain Controller") has the primary responsibility of sending outbound messages to users based on project status, data entered on a particular page within the website, etc. Residing on the SMTP Server/Domain Controller of production subsystem 211 is software having the function of the primary active directory controller. A second (warm) SMTP Server/Domain Controller is present in product subsystem 211 to serve as a backup in the event the first SMTP Server/Domain Controller becomes inoperable or is unable to perform its intended duties.

The responsibilities of each document server (denoted as Doc Server) of subsystem 211, 212, 213, and 214 include pictorial document format ("PDF") rendering, interaction with EMC Connectrix 215 and EMC Symmetrix 216 for document upload and download, and storage of ASP, ASP pages, associated PDF rendering DLLs (dynamic linked libraries), and Cimmetry Systems, Inc.'s view technology DLLs. Also located on each Doc Server are Adobe's PDF Writer and PDF Distiller, which are used in the PDF rendering process as is well known in the art. Each Doc Server requires its own external IP address on the Internet, as tenant may be pointed to a Doc Server in order to post and update documents through connection with EMC Connectrix 215 and EMC Symmetrix 216 and also for the PDF rendering process. In this embodiment, because users will be accessing the Doc Server directly, the presence of document repository services ("DRS") ASP pages on the Doc Server is also necessary. In production subsystem 211, a second (warm) Doc Server is provided which assumes the role of the first (primary) Doc Server in the event the primary Doc Server is no longer operable.

It will be appreciated by those of skill in the art that the DRS services of a Doc Server need not reside on Doc Server, but could be placed on its own server (system). For a widely distributed user base, multiple distributed DRS systems, or multiple distributed Doc Servers could be used to service the user base.

In one embodiment, the service standard for the above-described Web/App Servers, DB Servers, File Servers, Workflow Servers, SMTP Server/Domain Controllers, and Doc Servers is the Proliant Series offered by Compaq. The Compaq Proliant 5500 platform with at least 2 Gigabytes of RAM is used for the File Servers and DB Servers of production subsystem 211. All the other servers in production subsystem 211 and all other servers in training subsystem 212, testing subsystem 213, and pilot subsystem 214 are Compaq Proliant DL380 platforms with at least 1 Gigabyte of RAM.

The servers of subsystems 211, 212, 213, and 214 are connected using Ethernet cards in one embodiment. For high-speed connections, such as those to the servers of production subsystem 211 and testing subsystem 213, 3Com's gigabit Ethernet network card or Compaq's gigabit Ethernet network card may be used. For servers that do not necessarily require high-speed network connections, such as the servers of training subsystem 212 and pilot subsystem 214, Compaq's fast Ethernet cards may be used.

Referring now to FIG. 5, there is shown a diagram of the software architecture of one embodiment of the system of the present invention. In this embodiment, software 240 of system 200 comprises web pages layer 241, security services layer 242, business process engine 243, collaborative business objects 244, document control services layer 245, document repository services layer 246, database 247, online analytical processing and reporting layer 248, data warehouse layer 249, messaging system layer 250, e-mail layer 251, text layer 252, file transfer protocol ("FTP") layer 253, incoming and outgoing message queues 254, and ANX services layer 255. ANX services layer 255 is, in one embodiment, the ANX® Network provided by ANXeBusiness Corp., a wholly owned subsidiary of SAIC, which is a managed service platform using Internet technologies on which high value processes will run.

Web pages layer 241 includes the following functionality: (a) user interface screens to system 200; (b) navigation through software 240 of system 200; (c) organization and presentation of screens, data, and documents to a user; (d) visualization of data held by or accessible to system 200; (e) viewing of documents; (f) access to online functions such as linking to other sites, real-time messaging, and electronic meetings; and (g) access to online analytical processing ("OLAP") and reporting functions.

Beneath web pages layer 241 is security services layer 242. In general, security services layer 242 allows or prohibits, as appropriate, access to the various functions and content of software 240. For example, security services layer 242 includes the following functionality: (a) sign on; (b) authentication; (c) secure transmission utilities; (d) supplier network security model; (e) access control over content on system 200; and (f) access control over functions of system 200.

Beneath security services layer 242 are business process engine (BPE) 243, collaboration business objects 244, and online analytical processing and reporting layer 248. Business process engine 243 includes project state management, work management, task lists, and scheduling processing (such as Health Checks as is explained herein).

Collaboration business objects 244 is the same as the supply chain services ('SCS') application discussed earlier herein, and are those objects used for collaboration activities and to drive application processes. As is later explained, collaboration objects from different areas can be pulled together to create a distinct process within the application. Collaboration business objects 244 include projects, parts, tenants, users, roles and teams, documents, key performance indicators, and methodologies. Each of these objects is discussed in greater detail herein.

Database 247 contains information related to all objects. For example, with regard to projects, database 247 contains information such as project name, participants (tenants, roles, teams, etc.), milestones, etc. For a tenant, database 247 contains name and address of the tenant, users of the tenant, roles of those users in the tenant, etc. Database 247 also contains metadata for documents ancillary to collaboration business objects 244. Such documents may include specifications, quality requirements, drawings, etc., contained in the document repository.

Document control services layer 245 and document repository service layer 246 have access to the documents and document-related data residing in database 247. Document control services layer 245 handles submission, viewing, versioning, and indexing of documents. Document repository services layer 246 handles upload, download, rendering, processing, and data extraction of documents in support of the functionality of document control services layer 245.

Also residing under security services layer 242 is online analytical processing and reporting layer 248. As projects go through the lifecycle, events occur to cause the performance and risk of the project to be analyzed. The resulting performance and risk indicators can be thought of as "facts" which are categorized by tenant, time period, part, part relationships, part attributes (What type of part? What platform does the part support? What material is the part made from? Etc.), etc. Online analytical processing and reporting layer 248 provides a user accessible method (through web pages) for exploring these facts in the context of categories, such as trending performance or risk, aggregating performance or risk, comparing performance or risk, etc.

Beneath online analytical processing layer 248 is data warehouse layer 249. Data warehouse layer 249 handles the storage and organization of facts and categories in support of online analytical processing and reporting layer 248.

Messaging system 250 resides below data warehouse layer 249 and collaboration business objects 244. Messaging system layer 250 is event driven, handling messages in XML format. Messaging system layer 250 further handles subscription support, queuing of messages, and warehousing of messages (in support of data warehouse layer 249).

Beneath message system layer 250 are incoming and outgoing message queues, e-mail layer 251, test layer 252, and FTP layer 253. Messages to be transmitted and those received are queued by incoming and outgoing message queues 254. E-mail layer 251, text layer 253, and FTP layer 253 handle e-mail, text transfer, and FTP transfer as the names suggest.

Below incoming and outgoing message queues 254 is ANX services layer 255. ANX services layer 255 handles communication over a virtual private network to business systems of tenants in a secure manner.

FIG. 6 shows a graphical representation of the design model according to one embodiment of the system of the present invention. The representation of FIG. 6 is consistent with the system architectures shown in FIGS. 3A, 3B, 3C, 4 and 5. In this embodiment, system design model is comprised of core technologies component 261, industry component 262, customer component 263, and supplier component 264. Design model 240 is intended to be a global utility—for use anywhere throughout the world. Design model 240 uses a common set of tools; is data driven; is capable of supporting many industries including but not limited to the automotive (car, truck, bus, etc.), aerospace, and medical device industries; addresses the overlaps between supplier networks; and preserves competitive advantage of those involved in the supply chain. These and other features of system 200 are discussed in greater detail herein.

Core technologies component 261 include security, document control, business process engine, projects, tenants, teams, collaboration, a light version of bill of material (also known as a supply chain bill of material and bill of projects), and scoring. In fact, all of the functionality of software 240 as illustrated in FIG. 5 may be included in core technologies component 261.

Industry component 262, which comprises data, may be tailored for various industries. Functionality achieved by industry component 262 includes business standards and regulations (such as QS-9000, APQP, and PPAP, for example), standard methodologies, standard documents, and standard business rules for the industry(ies) supported by design model 260. Configuration files may serve, in whole or in part, to identify the industry specific data, information, and processes, as is well known in the art.

Customer component 263 of design model 260, which comprises data in one embodiment, addresses specific requirements above those of the applicable industry. For example, a customer may have quality standards more stringent than those of QS-9000. Customer component 263 also provides for methodology extensions for the customer, customer-specific documents, customer-specific business rules, key performance indicators according to the customer, various degrees of risk and complexity permitted by the customer, and back office integration to the customer's other systems. Back office integration may include messaging with legacy systems, design push (engineering change notice/number ("ECN")), risk pull (scoring), and handling events in the supplier network. Configuration files may serve, in whole or in part to identify customer component 263 for a customer.

Supplier component 264 of design model 260, which, in one embodiment comprises data, deals with specific requirements for suppliers. Functionality of supplier component 264 includes compliance support, document authoring integration, collaboration (with others in the supply chain(s) to which the supplier is a party), back office integration, and handling various degrees of risk and complexity permitted by the supplier and/or the customer(s) the supplier services. It is common for some suppliers to comply with the requirements of multiple industries and/or multiple customers. Configuration files may serve, in whole or in part, to identify supplier component 264 for a suppler.

Design model 260 manages, for a given process, data and behavior to concurrently support the requirements, measurements, and controls of an industry, the customer, and the supplier. By connecting customer and suppliers together with the supply chain bill of material, design model 260 manages the data and behavior of a supply network of the industry.

Referring now to FIG. 7, there is shown a graphical representation of the tenant and project model according to one embodiment of the present invention. As used herein, a "tenant" is a proprietorship, company, plant, division, business unit, or site who participates in the system. A tenant may either be a customer or a supplier in any APQP activity, depending on whether the tenant is buying or selling the part, respectively. A tenant may be, if in a middle tier, both a customer and a supplier in a supply chain. A tenant may also be a customer, a supplier, or a customer/supplier in more than one supply chain handled by the system according to the present invention.

A "project" is a unique combination of a customer, a supplier, and a part (or family of parts). Thus, a project is a bill of relationships defined by a part to be supplied (e.g, sold) by a supplier to the customer. For a product comprising two components manufactured by two distinct manufacturers, assembled together by an integrator, and sold to a single OEM, the project is comprised of a part sold to the OEM by the integrator, and two sub-projects are composed of the two subparts and the respective relationship of each of the suppliers to the integrator. A sub-project is a referential label given to a project that has a sub-tier relationship to the "current" project the user is using.

To explain the relationships of tenants and projects, consider the scenario illustrated in FIG. 7. General Motors Corporation requires the design and manufacture of a right-side interior door trim for its next model of the Impala automobile for sale in the United States. Of course, the right-side interior door trim is just one part of the many parts required for manufacture of the Impala automobile. The interior door trim is to be made available in three different color combinations to match the three colors of Impalas to be manufactured. The three color combinations form a family of parts—one part (the right-side interior door trim) with three clearly identifiable variations (three color combinations).

Lear has been used by General Motors for production of interior door trims for other vehicles, and, in fact, was used to produce the interior door trims (both left and right side) for the previous model of the Impala. General Motors Corporation and Lear thus enter into a contract whereby Lear GM North America, a division of Lear, is to provide the right-side interior door trim to General Motors North America, a subsidiary of General Motors Corporation.

Lear generally does not manufacture the door handle and interior door switch included on the interior door trim assemblies it provides to General Motors. Instead, Lear engages the services of Siegel Roberts to provide the door handle, and Eaton to provide the door switch. Thus, Lear enters into contractual relationships with Siegel Roberts and Eaton for the door handle and door switch of the new Impala right-side interior door trim.

Eaton has numerous capabilities in developing switches, but generally does not produce plastic parts. Thus, to meet its obligations to provide the door switch for the new Impala right-side interior door trim to Lear GM North America, Eaton enters into to a contract with LDM for the plastic casing for the switch.

Returning now to FIG. 7, the relationships of entities (tenants), parts, and projects for the above scenario is illustrated. For the right-side interior door trim part of the new Impala model, seven tenants are involved. Specifically, tenant GM HQ 270 is representative of General Motors Corporation. Tenant GM N.A. 271 is representative General Motors North America, the subsidiary of General Motors Corporation. Lear HQ tenant 272 is representative of the corporate headquarters of Lear, with subsidiary Lear GM N.A. 273 representative of Lear GM North America. The other tenants identified in FIG. 7 are Siegel Roberts tenant 274, Eaton tenant 275, and LDM tenant 276, representative of Siegel Roberts, Eaton, and LDM, respectively.

Four different "products" are to be manufactured according to the scenario. First, the "Interior Door Trim-R" is to be provided by Lear GM N.A. tenant 273 to GM N.A. tenant 271. Second, "Interior Door Handle" is to be provided by Siegel Roberts tenant 274 to Lear GM N.A. tenant 273. Third, "Interior Door Switch" is to be provided by Eaton tenant 275 to Lear GM N.A. tenant 273. Fourth, "Plastic Casing" is to be provided by LDM tenant 276 to Eaton tenant 275.

The scenario described results in four projects according to the present invention. The components of each project are:

| Project (Ref. No. on FIG. 7) | Part | Customer | Supplier |
|---|---|---|---|
| 277 | Interior Door Trim-R | GM N.A. | Lear GM N.A. |
| 278 | Interior Door Handle | Lear GM N.A. | Siegel Roberts |
| 279 | Interior Door Switch | Lear GM N.A. | Eaton |
| 280 | Plastic Casing | Eaton | LDM |

Each of first project 277, second project 278, third project 279, and fourth project 280 is thus a relationship identified by a part, a customer and a supplier.

Note that in this embodiment, neither GM HQ tenant 270 nor Lear HQ tenant 272 serve as a customer or supplier for any of the first, second, third, and fourth projects 277, 278, 279, and 280, respectively. Although the parties represented by GM HQ tenant 270 and Lear HQ tenant 272 entered into a contractual relationship related to the right-side interior door trim part, the activities related to the project do not, in this example, involve the personnel of either GM HQ tenant 270 or Lear HQ tenant 272. Instead, the subsidiary of GM HQ tenant 270, namely, GM N.A. tenant 271, and the division of Lear HQ tenant 272, namely, Lear GM N.A. tenant 273, are the entities which will interface for the right-side interior door trim part, and therefore are considered to be the customer and supplier, respectively, of the part. Thus, the legal contracting parties need not be the same as the parties comprising the customer and supplier under the present invention.

GM N.A. tenant 271 is considered part of the family of the General Motors tenant family. GM HQ tenant 270 is the parent tenant, and GM N.A. tenant 271 is a child tenant to parent GM HQ tenant 270. Similarly, Lear GM N.A. tenant 273 is a child tenant to parent Lear HQ tenant 272. Thus, note that the system and method of the present invention do not require that all those of a tenant hierarchy be considered a customer or supplier for a part. Also, with the present invention there is no forced correlation between the tenant hierarchy and parts and sub-parts or projects and sub-projects. It will be appreciated that the customer and supplier organizations can exist with the same tenant family, or tenants could be designated as departments within a single company such that supplier and/or customers comprise those departments.

In this embodiment, the Interior Door Handle part and the Interior Door Switch part are sub-parts (components) to the Interior Door Trim-R part. The Plastic Casing part is a sub-part to the Interior Door Switch part. Second project 278 and third project 279 are sub-projects to first project 277, and fourth project 280 is a sub-project to third project 279.

FIG. 7 also identifies a few exemplary team members of projects 277, 278, 279, and 280.

The system and project roles illustrated include:
TA: Tenant Administrator (system role)
PM: Project Manager (project role)
GU: General User (project role)

The meanings and privileges of these roles are discussed in greater detail herein.

Beside each project role designator is a code, such as "gmc.pevans" and "etn.mherendeen", which is intended as a unique identifier for a particular user (person) having a unique user name and password for entry into system 200. In this embodiment, the three alphanumeric prefix is a designator of the tenant name, while the multi-alphanumeric suffix is the prefix of the e-mail address for that user at the tenant. For example, the user name for system 200 designated as "gmc.pevans" is used to identify a user of General Motors Corporation (hence the prefix "gmc"), with the user's company e-mail address being pevans@generalmotors.com. The use of this schema for the user name in system 200 distinguishes between users at different tenants, even if they have the same name, and makes it easy for the user to remember. Further, the user's company e-mail address for retention by system 200 could be automatically determined.

FIG. 8 shows a diagrammatic view of the information flow between a supplier and a customer for product and process design according to one embodiment of the present invention. For both the supplier and customer, the personnel involved in design engineering, quality, and process engineering are involved in the collaboration between the supplier and the customer. The purchasing department of the customer is also involved for placement of orders from the supplier. For product and process designs, the personnel of supplier submit documents to the customer. The customer's personnel review and either approve or disapprove. If disapproved, the supplier edits the documents and resubmits them to the customer. This simplified retention of collaboration is further complicated by the various other phases of APQP and by the numerous number and types of participants at all levels of the supply chain.

In the embodiment of the present invention to be described in FIGS. 9-33, 37, and 39-42, the system of the present invention provides a secure online workplace for collaboration between organizations in at least one supply chain. The system provides industry-specific process management so customers and suppliers can work together as virtual enterprises, enabling these tenants to deliver quality products while reducing costs and increasing profits. The industry example presented is that of the automotive industry, but, as previously explained, other industries are supported by the present invention and are contemplated to be within the scope of the invention.

The system and method of the present invention are grounded in the Advanced Product Quality Planning (APQP) process. The APQP process, in general, involves the compilation and communication of various documents between a customer and a supplier. The documents describe the part to be traded and attest to the supplier's ability to consistently produce the part at a high level of quality and a predefined volume. The core technologies of the system, as described in association with FIG. 6, support this relationship by accepting electronic documents to the website, rendering a PDF image of each document, and securely controlling the documents' distribution within the supply chain. By providing real-time access to APQP documents and project information in one virtual location, the system and method of the present invention accelerates knowledge transfer between trading partners. This knowledge transfer, in turn, provides the opportunity to accelerate product development, decrease risk, and cut warranty costs.

The system and method of the present invention organizes APQP information and allows users to instantly view:
All APQP activities ("projects") in which the user is involved.
Documents expected by the customer for a project.
Current project and part information.
Deadlines for document submission.
Submitted documents.
Methodologies.
Project team lists.
Meetings and their content.
Notifications.
Reports on risk.

By associating assemblies and their component parts, the system and method of the present invention builds a unique map of the supply chain that can be navigated by participants. This supply chain model organizes product quality and risk information into an intuitive and valuable framework. The supply chain bill of material provided is unavailable in the prior art, and thus very valuable to participants in the supply chain.

While the embodiments described herein specifically implement the APQP process for automotive industry examples, system 200 is applicable to other processes that may not be referred to as "APQP" and to other industries. With regard to the processes modeled, they are general in scope for any product or project. The fundamentals of APQP are applicable, for example, for development of a software product, such as the development of the software of system 200, or to development of legal documents for a large merger or acquisition. As to industry, as previously discussed, design model 260 (see FIG. 6) includes industry component 262 for tailoring system 200 to any industry in which the above-described process fundamentals are applicable.

The embodiment of FIGS. 9-33, 37, and 39-42 divides the functionality of the system into eight major sections. The first section is the login functionality shown in FIG. 9. The second major section is "Home" illustrated in FIG. 10. The "Home" location is a push of recent information that guides the user to the information that requires that user's attention. The "Home" location also provides a list of resources the particular user might find helpful.

The third major section is that of "Parts". Some of the "Parts" functionality is illustrated in FIGS. 11-12. The parts are those required in the supply chain and may comprise finished goods, assemblies, subassemblies, component parts, and/or materials.

The fourth major section is that of "Projects" which is illustrated in FIGS. 13-26. As previously stated, a project is a combination of a customer, a supplier, and a part that forms a minimal supply chain. The fifth major section is that of "Profiles" as illustrated in FIGS. 27-30. In "Profiles" the tenants, their administrators, and their users are set up and associated with each other.

The sixth major section is that of "Methodologies" which is illustrated in FIGS. 31-32. Generally, "Methodologies" are templates created by the quality director and used on projects. A methodology template describes the phases or milestones (quality gates) and goals (document deliverables, tasks, data, etc.) that are expected at those quality gates. A methodology governs the project to ensure that the correct process(es) is (are) followed to establish the manufacturing capability to reliably produce parts of a given quality to a given set of specifications.

The seventh major section, illustrated in FIGS. 33, 37, and 39-41 is that of "Reports". The "Reports" are intended to highlight areas of performance and risk as it relates to a particular part. The types of reports may be tailored to the particular industry of the supply chain.

The final, eighth, major subsection is that of the "Message Center". The Message Center provides collaboration vehicles for users. In this embodiment those collaboration tools include tasks, notifications, meetings, and bulletin boards.

Referring now to FIG. 9, there is shown a screen printout of one embodiment of a login page according to the present invention. To invoke login page 300, a user at OEM system 202, tier 1 system 204, tier 2 system 206, or any other system of a participant in the supply chain (hereinafter, generally referred to as a "user"), with a browser located on the user's system, goes to the designated web page, in this instance, the web page located at the web address http://www.powerway.com. Login screen 300 includes general information about the operator of system 200, in this instance, Powerway, Inc. Login screen 300 also includes user name field 302 and password field 304 for entry by the user of the user's assigned user name and password for entry into the functionality of system 200. Such user name and password is likely assigned by a participant in the supply chain or the operator of system 200, such as is explained herein in association with FIGS. 27-30. Regardless of who assigns the user name and password for any user of system 200, system 200 must be informed of valid user names and passwords to allow valid entry and prohibit invalid entry into systems 200.

To enter beyond login screen 300 into system 200, a user enters his/her user name and password in user name field 302 and password field 304, respectively. The user then activates "logon" button 308. If system 200 recognizes the entered user name and password, the user is allowed into system 200. Otherwise, as is well known in the art, the user is informed that the user name and/or password is invalid and is, perhaps, given the opportunity to re-enter a valid name and valid password. Login screen 300 also includes "Forgot your password?" link 306 for invocation of programs well known in the art to assist the user in remembering his/her password. For additional security, the user may be permitted to change his/her password and/or required to change the password from time to time, by means well known in the art.

FIG. 10 shows a screen printout of one embodiment of a homepage for users according to the present invention. Home page 310 is intended for a specific user or users of a certain system role of supply chain. Thus, system 200 determines the supply chain(s) and system roles to which the entered user name and password belong and displays the corresponding home page for that user of that (those) supply chain(s). The specificity of the content of home page 310 for a user is discussed in greater detail herein.

Home page 310 includes search bar 312, for searching the supply chain information, by means well known in the art. In search bar 312 includes "category" selector 314 and search field 316 for designating the category of information to be searched and the text to be searched, respectively. A search engine, as is well known in the art, is used to execute these searches. For example, in one embodiment, a search engine is written in Microsoft Corporation's SQL.

Main menu bar 318 is used for high level navigation through the functions of system 200. Main menu bar includes "home" button 319, "parts" button 320, "projects" button 321, "profiles" button 322, "methodologies" button 323, "reports" button 324, "message center" button 325, "help" button 326, "feedback" button 327, "preferences" button 328, and "logoff" button 329. Selection of "home" button 319 takes the user to home page 310. Selection of "parts" button 320 takes the user to the parts information of system 200, such as is illustrated in FIG. 11. "Projects" button 321, when selected, takes the user to the projects information, such as is illustrated in FIG. 13. Selection of "methodologies" button 323 takes the user to the methodologies information of system 200, such as is illustrated in FIG. 31. "Reports" button 324, when selected, takes the user to the reports functions, such as is illustrated in FIG. 33. Selection of "message center" button 325 takes the user to the message center functions of system 200, such as is illustrated in FIG. 42.

"Help" button 326, when selected, displays help screens for the screen currently displayed. An example of a help screen is illustrated in FIG. 15 and is discussed later herein. When "feedback" button 327 is selected by the user, the user is permitted to provide feedback, such as through an e-mail, to the operator of system 200. "Preferences" button 328 allows the user to select certain preferences, such as changing the user's password, modifying contact information, editing notification methods, display options, and information subscriptions. "Logoff" button 329, when selected, logs the user off system 200.

Home page 310 of FIG. 10 displays information specific to the user. Methodologies section 330 informs the user of any updated methodologies that may impact that user. Methodologies are sets of quality gates, required documents, supporting documents, events and any other materials required for a project, as established by the customer. A methodology is asserted on one or more projects. Completion of a methodology on a project ensures that the project phase(s) represented by that methodology is (are) completed to the customer's satisfaction. For example, consider a Methodology X having two phases with requirement A for Phase 1 and requirements B and C for Phase 2. If Methodology X is applied to a project, that project has a target date for Phase 1 completion (quality gate date) of Feb. 3, 2004, and target date for Phase 2 completion of Mar. 4, 2004. The processor of the present invention evaluates the project data submitted as of Feb. 3, 2004, to determine if requirement A has been met. If so, Phase 1 is complete for the project. Assuming that Phase 1 is complete, the processor also evaluates the project data submitted as of Mar. 4, 2004, to determine if requirements B and C have both been met. If so, Phase 2 is complete for the project.

With the present invention, customers can create many methodologies and use them on various projects, thus avoiding the time-consuming, repetitive process of setting up all the requirements for every project. Only those methodologies for those projects that the specific user has authority under the security functions hereof to view are listed in methodologies section 330.

Also presented on home page 310 is tasks section 332. In tasks section 332, the user is informed of any recent open tasks he/she needs to perform. Notifications section 334 of home page 310 informs the user of the status of any recent notifications received for the user. Notifications are issues or notices, such as meeting invitations, role designations, and project updates. Resources section 335 of home page 310 provides the user with information on the use of system 200. In resources section 336 as shown in FIG. 10, such information includes instructions on getting started with use of the system, frequently asked questions and their answers on use of system 200, a glossary of terms, access to an online forum for queries, links to other resources applicable to the supply chain's industry, and information about getting technical support from the operator of system 200.

Depending on the system role of the user logged in to system 200, additional information may be posted on home page 310. If the user is a Part Administrator (the role of Part Administrator and other roles are presented later herein), a list of recently updated parts for which the Part Administrator has responsibility will be displayed. If the user is a Project Manager or General User, a list of recently updated projects for which the user as "view" authority will be displayed on home page 310. For a Tenant Administrator, a list of recently updated users will be displayed on home page 310. The user of FIG. 10 is likely a Quality Administrator, for home page 310 includes a list of recently updated methodologies. Thus, home page 310 provides information of interest and responsibility to the user based on that user's role in the supply chain.

At this point, it is helpful to discuss tenants and users, the selection of which is discussed later herein in association with FIGS. 27-30. As previously discussed, a tenant is an entity that is a supplier and/or customer in a supply chain. Types of users in a tenant include:

1. Tenant Administrator. The Tenant Administrator has the responsibility of setting up all users for the tenant, or at a tenant's site, and the users' respective roles (system level privileges) at each of the tenant sites the tenant will be active in. The Tenant Administrator also has the responsibility of establishing and maintaining the tenant hierarchy. For example, in the event of a merger or acquisition of a tenant, the tenant hierarchy will need to be maintained accordingly.
2. Quality Administrator. The Quality Administrator for a tenant site has the responsibility of establishing and maintaining the methodology templates that will be used in the APQP processes where the tenant is assuming the role of customer.
3. Part Administrator. The Part Administrator has responsibility for creating and maintaining parts. The part creation process involves establishing a part number, revision and engineering change notice/number ("ECN"), as well as general part information.
4. Project Manager. Project Managers are responsible for creating and managing projects. A project is an environment for customer and supplier(s) to share information and to measure quality process performance and risk for a part. The customer or a supplier may initiate a project. The initiating Project Manager of a project begins by identifying that tenant's part, the tenant location, and the corresponding Project Manager of the other tenant. The corresponding Project Manager then completes the project by assigning that tenant's part to the project.
5. General User. General Users are those other than the above roles who participate in a project. The Project Manager chooses the project roles of the General Users, including the teams to which the General Users belong and access levels to project information.
6. Technical Support. The Technical Support system role is established for the purpose of providing technical support to users of the system. If system 200 is operated by a non-tenant, the tenant may wish to give the Technical Support user designation to an employee of the operator of system 200.

One type of users is established for the operator of system 200. That user type is:

1. System Administrator. The System Administrator establishes new supply chains and tenants, including the assignment of the initial Tenant Administrator.

It will be appreciated by those of skill in the art that system 200 may be operated by a third party to a supply chain, or by a tenant in the supply chain. It will also be appreciated that other types of users may be established and/or that a single individual may serve in a multi-user capacity.

Referring now to FIG. 11, there is shown a screen printout of one embodiment of a parts list page according to the present invention. Parts list page 340 is displayed upon selection by the user of "parts" button 320 at any time during which the user is logged onto system 200. Listed in parts list window 342 of parts list page 340 are the parts to which the user is privy. In this instance, the part for which user Patricia Evans has access is "PLT13HVAC2004". More information about a part or parts list window 342 is available by selecting the part of interest.

If the user selects "PLT13HVAC2004" selector 344, part info page 350 for PLT13HVAC2004 of FIG. 12 is displayed. Part info page 350 includes parts sidebar 352 and parts information window 354. Parts sidebar 352 includes "part information" selector 355, "history" selector 356, and "components" selector 357, for displays of parts information, a history, or list of components, respectively, for the part selected. Part information window 354 includes information about, in this instance, the PLT13HVAC2004 part. Within part information window 354 is "edit" button 358. Activation of "edit" button 358 allows the user to edit information about the part selected.

The user, Patricia Evans, has the authority to edit part information for the PLT13HVAC2004 part, and hence "edit" button 358 is activatable by the user. If another user does not have such edit authority, "edit" button 358 may not be displayed or may not be activated by means well known in the art. It will be appreciated by those of skill in the art that many features and functions can be related to an individual's authority and thus made available or unavailable, as the case may be, in accordance with methods well known in the art.

The information displayed on part info page 350 includes part numbers, part name, part description, ECN (engineering change notice), revision number, unit weight, and author. It will be appreciated by those of skill in the art that other or additional information for a part may be accommodated by system 200, as is required by the supply chain. For example, if color is a common variable for parts of a supply chain in an industry, the part information displayed on part info page 350 may include color. In other words, system 200 accommodates a family of parts using a designator to distinguish the members of the family. Such designators may include color, fabric, a dimension, or other measurement or characteristic of the part.

If part "history" selector 356 is selected, the user is provided with access to the history of part activity for the selected part. This history includes changes made since the part was created, including but not limited to changes to the part, part revision, or engineering change.

If part "components" selector 357 is selected by the user, the user is provided with access to the part/subpart relationships for the selected part. The Part Administrator has the authority to define the relationship between a finished good part and the purchased parts that are used in the manufacturing process. Thus, system 200 supports a one-level bill of material (finished good to purchased part). This bill of material is used to support the sub-project feature discussed hereinafter. By continuing the sub-projects at lower tiers, a supply chain bill of material is created for an entire supply chain/network from the OEM to the lowest tier supplier.

Referring now to FIG. 13, there is shown a screen printout of one embodiment of a project list page according to the present invention. Project list page 360 is displayed upon selection of "projects" button 321 of main menu bar 318 at any time during log-in to system 200. Projects are at the center of the operation of system 200. A project is defined as the relationship between a customer and supplier for a particular part or family or parts. Any part, sub-assembly, component, or material that makes up another part is represented by a sub-project of the project. Thus, a supply chain may be represented by many projects and sub-projects. System 200 is also capable of handling "pre-sourced" or "tenant not active" projects. Pre-sourced projects are those that refer to a part that has been identified as a requirement, but no supplier has been identified. Tenant Not Active Projects are those projects that refer to a part that has been sourced (i.e., a supplier has been selected), but the supplier tenant has not yet joined system 200.

In exemplary project list page 360 of FIG. 13, many projects are listed in project window 362. Project window 362 includes several options. All projects to which the user has authority to view are listed in project window 362 if "all" button 363 is selected. Only open projects are displayed if "open" button 364 is selected. Only pending projects are displayed if "pending" button 365 is selected, and only cancelled projects will be displayed if "cancelled" button 366 is selected. A project may be opened by selecting the project, such as by selecting M&P Assembly selection 366. This user also has the option of creating a new project by selecting "create new project" button 367. Thus, this user is likely a Project Manager for either the customer or the supplier.

Either the customer Project Manager or the supplier Project Manager is able to initiate projects. The corresponding tenant is chosen from the tenant list (list of all tenants participating in system 200) and the part is selected from the part list or created during the project creation process. The customer Project Manager has the authority to define the methodology template(s) used on the project and establishes the quality gate dates.

Note that the parts are each identified by a customer name, a customer number, a supplier name, and a supplier number. While this might appear to be redundant, it is a very valuable feature in many industries. It is not uncommon, and, in fact, is more common, for a customer and supplier to designate different part numbers and names for the same part. System 200 therefore supports this practice. Of course, the display of part name and part number throughout most of system 2000 is dictated by the user's classification as either a customer user or a supplier user. For example, parts list page 340 of FIG. 11 includes the customer part name and number if viewed by a customer user and includes the supplier part name and number if view by a supplier user.

FIG. 14 shows a screen printout of one embodiment of a project information page according to the present invention. Project information page 370 is displayed in response to opening the SCS Powerway.com project as described in association with FIG. 13. Displayed on project information page 370 are projects sidebar 371 and project information window 372. Project information window 372 displays general information about the selected project. Project sidebar 371 includes several selectors for selection of different types of information about the selected project. Specifically, project sidebar 371 includes "project information" selector 373 "quality gates" selector 374, "documents" selector 375, "team list" selector 376, "sub-projects" selector 377, "planned visits" selector 378, "tasks" selector 379, "meetings" selector 380, "bulletin board" selector 381, and "security" selector 382. Selection of any of these selectors results in access (display) of information described by the selector name. Some of these selectors are discussed hereinafter.

Project information window 372 summarizes critical information about the project. Project information window 372 also allows the user to access the part revision history by selecting the "history" fields of project information window 372 for both the supplier and customer part.

Referring now to FIG. 15, there is shown a screen printout of the project information page of FIG. 14 having a help screen superimposed thereon according to one embodiment of the present invention. Help screen 383 is displayed after activation of "help" button 326 at FIG. 14. Help screen 383 provides useful information to the user regarding projects.

FIG. 16 shows a screen printout of one embodiment of a quality gate page according to the present invention. Quality gate screen 390 includes quality gate window 392 showing information about the first quality gate for the selected project, project M&P Assembly, and is invoked upon selection of "quality gates" selector 374 of project sidebar 371 at any time that project sidebar 371 is displayed. The user may select other quality gates associated with the selected project by selection of one of quality gate indicators 391.

A quality gate is an element of a methodology. A quality gate is a major project milestone by which the customer evaluates the performance of a supplier. Generally, the customer requires the supplier to submit certain documents, meeting certain specifications, by a deadline date—all of which one defined in the quality gate. Generally, the methodology's phases dictate the document classes expected in that phase. Once the methodology is used on a project, the Project Manager may add additional document expectations (standard and custom). Document classes that are expected of the quality gates by way of the methodology can never be removed from the quality gate document expectations, while document classes that were added after the project was created may be removed from the quality gate expectations.

Gate number 1 for the M&P Assembly project shown in quality gate window 392 is in the process of being developed. The name of the gate is "Phase O" and the gate's description is "Design Phase". Several documents, such as a Characteristics List and Control Plan, are identified as required for this quality gate.

Referring now to FIG. 17, there is shown a screen printout of one embodiment of a document list page according to the present invention. Document list page 395 includes document list window 396 and is displayed in response to selection of document selection 375 of project sidebar 371 at any time project sidebar 371 is displayed. The user may view all, required, optional, or supporting documents associated with the selected project by selecting "all" button 397, "required" button 398, "optional" button 399, or "supporting" button 400, respectively. The user may also submit a new document to the selected project by selecting "submit new document" button 401. Further, the user may view a document listed in document list window 396 by selecting that document. FIG. 18 shows a screen printout of document list page 395 of FIG. 17 having document window 402 superimposed thereon in response to selection of the Technical Design Specification—2 document.

Generally, team members submit documents to the project. When a document is submitted, it is tied to a document class. A class is a title that describes the contents of the document. The document may be submitted to a required document class (document classes defined by the methodology used on the project or document classes that were subsequently added), to an optional document class (all document classes), or as a supporting document. In one embodiment, the standard document classes are:

Appearance Approval Report
Dimensional Results
Material Test Results
Performance Test Results
Characteristics List
Process Flow Chart
Prototype Drawing
Control Plan
Design FMEA (Failure Mode and Effects Analysis)
Process FMEA
Team Feasibility Commitment
Capability Study
Part Submission Warrant
Nonconformance Report
7D Problem Report
8D Problem Report
Recovery Plan Supporting documents are those documents that do not clearly fit into a predefined document class, but still contain relevant project information. For example, drawing notes may not be consistently used by a tenant, and, therefore, do not require a custom document class, but notes about the drawing may have been documented for a particular project, and thus, be considered a supporting document. Supporting documents are submitted to the "supporting document" class and linked to other documents on the project that have been submitted as a standard or custom document class.

In the embodiment of FIGS. 9-33, 37, and 39-42, all documents submitted to the project are rendered in view-only images, such as PDF images readable using the Adobe Acrobat™ reader. These images are viewable by team members on the project, depending, of course, on each team member's defined security access to those documents. All documents otherwise submitted to system 200 are stored in the applicable application format (such as DXF format for CAD drawings) and translated and stored as PDF rendered images. The application-formatted document is downloadable by any project team member that shares the same project role as the individual who submitted the document. However, generally users only view the rendered images.

As a project evolves, documents may go through revisions and updates. A document revision history is maintained (see "Revision Number" on document list page 395 of FIG. 17). Maintenance of a revision history allows the user to view when document revisions were submitted as well as standard audit information (i.e., who submitted the revision, when, etc.).

It will be appreciated by those of skill in the art that other document viewing technology may be used for rendering images to the users of system 200 and still be within the scope of the present invention. The use of other document viewing technology may be driven by bandwidth and processing loads imposed on the system by use of the PDF images. Each time a PDF image is viewed, the image must be downloaded to the user's machine where it can be viewed. This downloading can result in significant bandwidth requirements of system 200 to support many suppliers and customers. Alternate document viewing technologies would be selected to permit the viewing to take place at the server requiring transmission of less data to the user. Nonetheless, it is still very useful to select a "viewing only" technology for a majority of the users of system 200, for most users do not have the need to (and will not have the authority to) modify the documents associated with that user's projects.

FIG. 19 shows a screen printout of one embodiment of a project team list page according to the present invention. Project team list page 405, including team list window 406, is displayed in response to selection of "team list" selector 376 of project sidebar 371. Project teams are comprised of those individuals in departments necessary to complete a project. By designating team members when a project is created, individuals at different locations can communicate, collaborate, and share project-related information. Each team member can be assigned different rights depending on the role that team member is assigned. Such rights assignment ensures the security of documents and other information.

Team members are designated by role and by a tenant. A tenant is an entity that participates in system 200, just as it participates in the supply chain. As previously described, tenant may be a corporate entity, a plant or division within a company, or an individual. The term tenant is preferred to the term supplier or customer, for in fact a tenant may be both a supplier and a customer in the supply chain. It is also possible for a tenant to be a supplier to two or more customers in the supply chain or to be a customer to supplier(s). Generally, a tenant and its users must be recognized by the operator of system 200. User names and passwords are assigned to the users of the tenant. User roles that an individual may serve include but are not limited to General User, Project Manager, Part Administrator, Quality Administrator, Tenant Administrator, and Technical Support. The user roles are described hereinabove. Team roles that an individual may serve include but are not limited to:

Project Manger "Owner"
Project Manager
Quality Manager
Tooling Specialist
Process Engineer
Design Engineer
Quality Engineer
Quality Specialist
Quality Auditor
Design Studio
Service Engineer
Manager 1
Manager 2
Manager 3
Guest
Customer Guest
Supplier Guest
Buyer These roles are assigned as described in association with FIGS. 27-30 hereof and maybe modified by the Tenant Administrator as discussed in association with FIG. 30.

Returning to FIG. 19, if "sub-projects" selector 377 of project sidebar 371 is selected, the user is presented with information regarding sub-projects for the selected project. Sub-projects generally can be defined by the part/subpart relationship defined by the Part Administrator. Using this relationship, it is possible to build a flattened, supply chain/network wide, bill of material for a given part. As described later herein, system 200 allows for navigation of the supply chain bill of material to highlight part risk and facilitate resolution of issues that may resolve more than one tier deep in the supply chain.

Referring now to FIG. 20, there is shown a screen printout of one embodiment of a project planned visits page according to the present invention. Planned visit page 410, including planned visit list window 411, is displayed in response to selection of "planned visits" selector 378 of project sidebar 371. By highlighting planned visits selection 378 of project sidebar 371 when planned visit list window 411 is displayed, the user may get either visit information, as shown in FIG. 21, or date history, for "visit information" subselector 412 and "date history" subselector 413, as shown in FIG. 21, will be displayed. FIG. 21 shows a screen printout when "visit info" subselector 412 has been selected, resulting in display of visit information window 414.

Planned visits are used to capture information for a planned meeting of a customer and a supplier. The planned visit allows for setting of a date, previsit date, visit type, and visit location, among other things. Attendees can be added to the planned visit from either the project team lists or added as a guest to the planned visit from outside the customer and supplier organizations. If an attendee is added to the planned visit from outside the customer and supplier organizations, additional contact information is captured (e.g., phone numbers, e-mail address, organization name and address).

If "tasks" selector 379 of project sidebar 371 is selected, the user is taken to information about tasks associated with the project. A task is an assignment of responsibility for the project to one or more team members of the project.

FIG. 22 shows an example of meetings page 415 including meeting list window 416. By selecting a listed meeting, in this instance the "Quality Gates JAD Session" meeting, meeting info window 418 of FIG. 23 is displayed. These meetings are generally conducted online while the meeting participants are connected to system 200. In this manner, the participants in a meeting can view and discuss documentation specifically relevant to that meeting.

A meeting is a collaboration event where team members of a project simultaneously share access to thoughts and documents. In addition to project documents, other documents may be submitted, tied to the meeting, and viewed by those on the meeting invitee list. Such other documents may include, for example, the meeting agenda, or minutes from a previous related meeting. When a team member is designated as a meeting invitee, the user will receive a notification (similar to an e-mail) via system 200. Generally, the meeting is conducted by a conference call among the invitees, with each invitee logged onto system 200 for the purpose of viewing the related documents. After the meeting has occurred, additional documents, such as meeting notes from one of more of the invitees or meeting minutes, can be uploaded and associated by system 200 with that meeting.

Referring now to FIG. 24, there is shown a screen printout of one embodiment of a project bulletin board page according to the present invention. A bulletin board is a collection of threaded topics of messages within a project. Team members can informally share information and respond with opinions in a bulletin board. A project bulletin board may be moderated or unmoderated. If moderated, the Project Manager must review each item submitted to the bulletin board by team members before the item is posted to the bulletin board.

Returning now to FIG. 24, bulletin board page 420, including bulletin board message list window 421, is displayed in response to the selection of "bulletin board" selector 381 of project bar 371. Bulletin boards can be set up for each project and are used as a communication medium when real-time responses, such as those described in a meeting, are not necessary.

Figure 26:
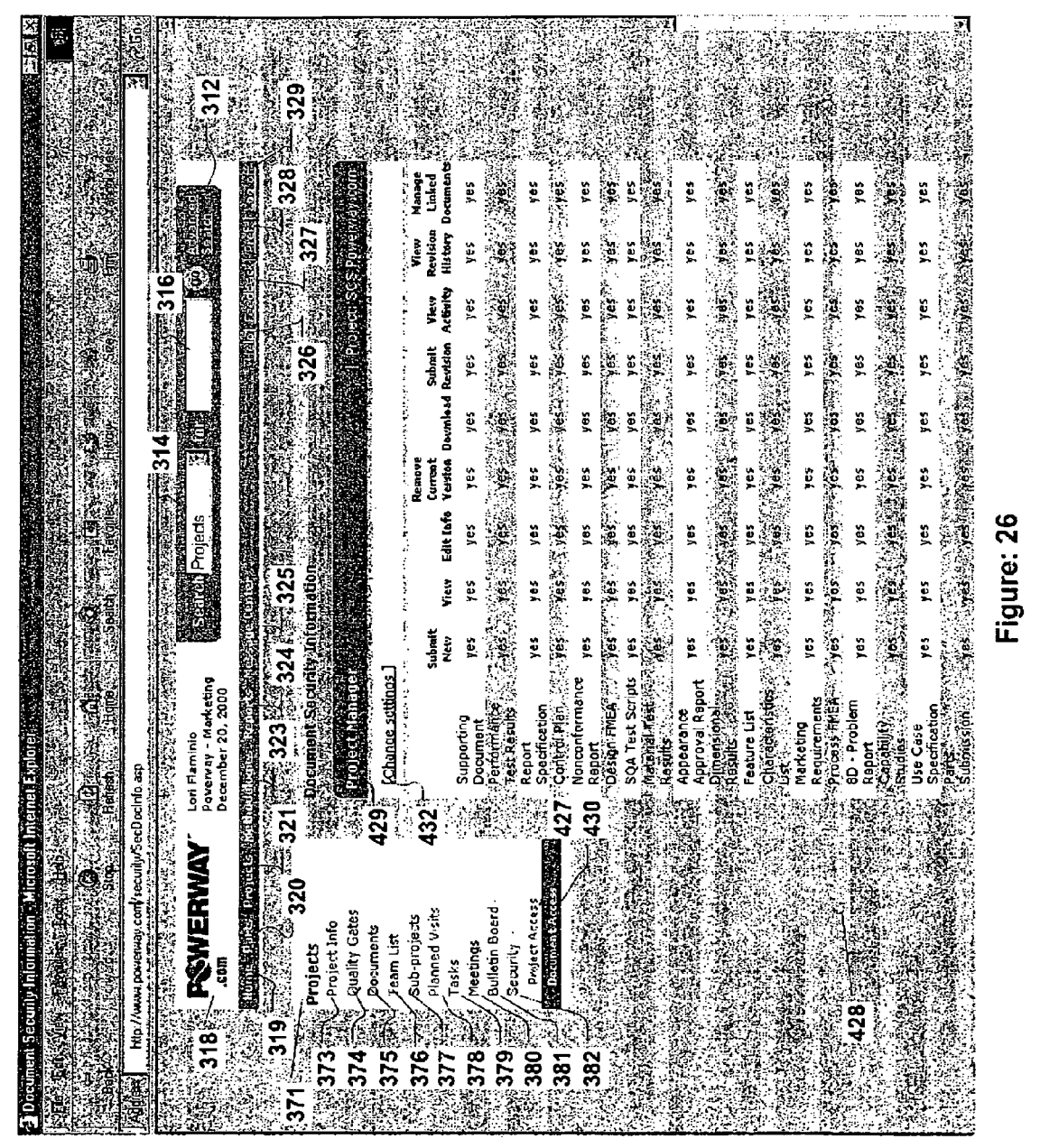

FIGS. 25 and 26 show screen printouts of security pages according to the present invention. Generally, only team members to a project and guest users for that project are able to access that project. Project security is used to control access by users to various areas of the project. The customer and supplier Owner Project Managers have rights to set security levels for the project team. Create, read, update, and remove access is set for each project role (See FIG. 25) for project information, quality gates, tasks, sub-projects, meetings, bulletin board, and security (referred to as "project level security"). Document level security (See FIG. 26) is used to control access by users of the various document classes. For each project role, the following security access levels are defined for each document class: submit new, submit revision, view, remove current revision, edit information, download, view activity, review revision history, and manage links.

Referring now to FIG. 25, project security page 425, including project security information window 426, is displayed in response to selection of "project access" subselector 427 under "security" selector 382 of project sidebar 371. Document security page 428 of FIG. 26, including document security information window 429, is displayed in response to selection of "document access" subselector 430 under "security" selector 382 of project sidebar 371. As previously described, project security page 425 and document security page 428 are not available to many users of system 200. Some users are given the ability to change settings for security by selecting "change settings" button 431 of project security information window 426 or "change settings" button 432 of document security information window 429.

Project security information window 426 presents information about the ability to make, read, update, and delete various functions related to the selected project. Document security information window 429 gives information about documents for the selected project and the ability of users to submit new versions, view, edit, remove, download, revise, view activity, view revision history, and manage linked documents.

The settings for both the project level security and the document level security are initially established by a default set of privileges by project role as defined by the administrator of system 200. The security may then be tailored by any user with a project role having "update" access to the security area of the project. Initially, the default is that only those in the Owner Project Manager role have the "update" access level of security. The Owner Project Manager can, by this privilege, give other project roles "update" access for the project areas and/or document classes.

Two project roles are always present for any given project—Customer Guest and Supplier Guest. The Supplier Guest role is assigned to users navigating up the supply chain, and is therefore the reverse of the Customer Guest User discussed below. If, for example, a tier 3 supplier wishes to see the component into which the tier 3's sub-component is included, as a Supplier Guest, the tier 3 supplier can see appropriate information about that project based on the access rights granted by the Project Manager.

The Customer Guest Role is assigned for users navigating down the supply chain (projects and sub-projects). As users leave the context of their own project and try to access sub-projects, they will inherit the rights of the Customer Guest project role.

The customer and supplier in any project relationship determine the rights of the Customer Guest and Supplier Guest roles. Specifically, the customer and supplier determine whether the Customer Guest or Supplier Guest will have read access to the areas of the applicable project and document classes. The Customer Guest and the Supplier Guest is never permitted to have more than "read" access privileges. Once access to the areas of the project or document class has been blocked to a Customer Guest or Supplier Guest, that project area or document class will not be visible by the Customer Guest at any lower levels in the supply chain or will not be visible by the Supplier Guest at any higher levels in the Supply Chain.

It will be appreciated by those of skill in the art that the security protections of the present invention are rooted in project roles. By so doing, security levels do not have to be re-addressed for each new user of the system. A new user will be assigned a role, and that role will have security levels associated therewith. Also, the project access and document access level securities provide a great deal of flexibility in the applicable security for any project role. Sensitive documents can be hidden from all those who have no need to know the information. A user's knowledge of other users, by virtue of the project role, can be limited.

Referring now to FIG. 27, there is shown a screen printout of one embodiment of a tenant list page according to the present invention. Tenant list page 440 is displayed in response to selection of "profiles" button 322 of main menu bar 318. The administrator of system 200 is given the opportunity to create new tenants and create new Tenant Administrators, and create new users using "create new tenant" button 442, "create new tenant administrator" button 443, and "create new users" button 444, respectively. A Tenant Administrator is given the right to create new sub-tenants (entities related to the tenant, including but not limited to divisions, subsidiaries, and the like), to create new Tenant Administrators for the sub-tenants, and to create new users for that tenant using "create new tenant" button 442, "create new tenant administrator" button 443, and "create new user" button 444, respectively.

Figure 28:
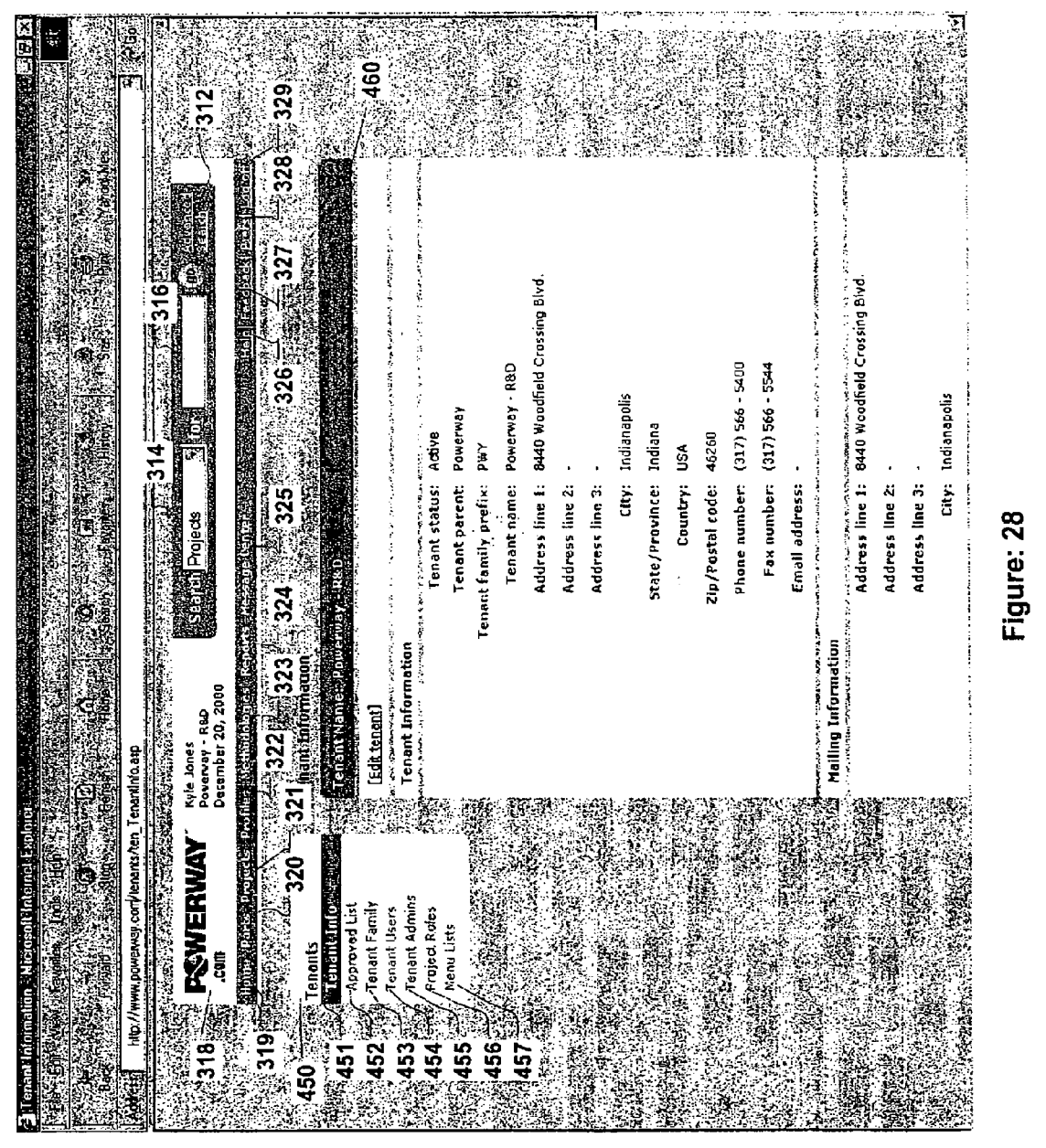

If a tenant is selected on tenant list page 440, tenant sidebar 450, as shown in FIG. 28 is displayed. Tenant sidebar 450 includes "tenant info" selector 451, "approved list" selector 452, "tenant family" selector 453, "tenant users" selector 454, "tenant admins" selector 455, "project roles" selector 456, and "menu lists" selector 457. When "tenant info" selector 451 is selected, tenant information window 460, such as that of FIG. 28 is displayed. When "tenant users" selector 454 of tenant sidebar 450 is selected, tenant user list 470 of FIG. 29 is displayed. When "project roles" selector 456 of tenant bar 450 is selected, project roles page 480 of FIG. 30 is displayed.

Selection of "approved list" selector 452 results in display of functions related to that tenant's "approved list". The "approved list" is used to assist users in the site by providing an additional filter where the user may need to search for another tenant within system 200. For example, a user may want to identify the customer of a finished good that will be used in a project. Using the "approved list" also allows the tenant to tie "custom codes" to other tenants within system 200. This feature allows tenant to use existing identifiers like DUNS (Dun & Bradstreet) or supplier codes in addition to searching for the tenant based on name.

Selection of "tenant family" selector 453 results in display of information related to a tenant family or hierarchy. These tenant/sub-tenant relationships are a reflection of the organization of an entity, as well as when APQP activity occurs within tenant sites and whose standards will be pushed through an entity, such as the entity's APQP methodology. The highest tenant in a family (such as a world headquarters) is the Ultimate Parent Tenant. Any tenant with a child tenant (sub-tenant) is referred to as a Parent Tenant.

Selection of "tenant admins" selector 455 results in display of information about the Tenant Administrator(s) for a given tenant. This display allows the user to identify all users that have Tenant Administrator role/privileges to ensure the appropriate level of system administrator access.

Selection of "menu lists" selector 457 results in display of information about the data attributes of certain drop-down menu lists: methodology risk, planned visit type, planned visit resolution, planned visit resolution remarks, planned visit completion date violation remarks, PPAP disposition, and project risk. The screens at which each of these drop-down menu lists are available to the user and the default valves for the menu are:

| Menu List | Appears on . . . | Default Valves |
|---|---|---|
| Methodology Risk | Methodology creation | High, Medium, Low |
| Planned Visit Type | Planned visit create/view | On-site, documentation reviewed |
| Planned Visit Resolution | Planned visit complete/view | Approved, partial approval, unsatisfactory |
| Planned Visit Resolution Remarks | Planned visit/create/edit | NA, Supplier not ready, Completed visit |

| Menu List | Appears on... | Default Valves |
|---|---|---|
| Planned Visit-Completion Date Violation Remarks | Planned visit create/edit | Supplier not ready, NA, not ready for PPAP |
| PPAP Disposition | PPAP/edit/view | — |
| Project Risk | Project create/edit/view | High, Medium, Low |

It will be appreciated that other entry items in system 200 may have associated there with drop-down menu lists, and that such menu lists could be edited in accordance with this feature. The default options for the drop-down menu lists can be changed at the tenant level. The ability to change the default options allows the tenant to customize system 200 to the tenant's business environment. Once the menu lists have been customized, any child tenants created will inherit the customized menu lists of the direct parent tenant while retaining full latitude to change the list for the child tenant itself.

Referring now to FIG. 31, there is shown a screen printout of one embodiment of a methodologies list page according to the present invention. Methodologies list page 490 includes methodology list window 492 to list the active, inactive, and pending methodologies for the tenant. A user can create new methodologies by selecting "create" new methodology button 493. If a methodology is selected, methodologies sidebar 494, as shown in FIG. 32 is displayed. Methodologies sidebar 494 includes "methodology info" selector 495 for display of methodology information page 498 as shown in FIG. 32.

Selection of "quality gates" selector 496 results in display of information about quality gates for that methodology. As discussed herein, certain documents are expected to be provided at each quality gate, with those documents from the standard document classes or the tenant-defined custom document classes of system 200. The display resulting from selection of "quality gates" selector 496 of methodologies sidebar 494 shows the documents for each quality gate.

Selection of "past revisions" selector 497 results in display of information about any revisions made to the selected methodology. It may be useful to view the revisions made, and thus past revisions of methodologies can be maintained by system 200, even though the past revision has been superceded by the present version of the methodology. Both active and inactive revisions may be viewed by selection of "past revisions" selector 497 of methodologies sidebar 494.

Referring now to FIG. 33, there is shown a screen printout of one embodiment of a reports page according to the present invention. Reports page 510 includes reports window 511 that identifies the types of reports that can be created for the selected project. The Health Check/Quality Gate Scorecard, the Supplier Grade Report, the Anonymous Grade Report, and the Customer Grade Reports offered with system 200 are intended to highlight areas of risk as it relates to a particular part, supplier, or customer. Summary risk data is also used to provide a user with a view of the performance of a given supplier for a particular customer.

System 200 provides two types of scoring functionality: performance scoring and risk scoring. Performance scoring focuses on analyzing a "snapshot" or historical view in time against a predetermined set of criteria for a project relationship. Performance scoring focuses on areas that are clearly defined in the methodology(ies) used on the project. Risk scoring is predictive in nature. In risk scoring, system 200 identifies trends in the data to determine the direction in which the project is headed. Unlike performance scoring, risk scoring is not necessarily limited to items discussed in the methodology(ies) applicable to the project. Both the performance scoring and risk scoring functions of system 200 support varying targets over the course of time allowing for the scoring criteria of a project to support continuous improvement expectations and promote the right behaviors. For example, it may be acceptable for the DFMEA document to have high risk priority numbers ("RPNs"), but it may be unacceptable for the DFMEA document to have high RPNs within the six months prior to launch of the part of the project.

To better understand performance and risk scoring, it is necessary to understand the components that drive the scoring process. Those components include measure, an actual, performance goal, risk goal, performance indicator, risk indicator, weight, and indicator-roll up.

A measure is a data element that helps a tenant measure project progress. In system 200, these measures are usually indicative of performance or risk. Examples of measures include:

RPNs (Risk Priority Numbers, found in the Design Failure Modes and Effects Analysis document, a standard automotive industry document)

Importance Level (similar to that as is found on standard e-mail messages)

Meeting Dates

"Calculated Indicators" (see "Performance Indicators" and "Risk Indicators" below)

Major event completion, such as all supplier selected for an assembly

Process control value like Cpk

An actual is a value or values of the measure. For example, in the Design Failure Mode Effects and Analysis document, the Risk Priority Number (measure) might have actual values of 38, 40, 39, 41, 42, and 43.

A performance goal is a target value that is set for a particular measure. Performance goals assess a project's progress at a specific point in time against a set of criteria for that point in time. The goal will help to determine the calculation method used to compare the actual values against the goals to define a score. Goals for measures are anticipated to vary over the course of a project. For example, the performance goal for RPNs might be 10% of the values are under 41 during the first phase of the project, while the performance goal for RPNs might be 60% of the values are under 41 during the $3^{rd}$ phase.

A risk goal is a target value that is set for a particular measure. Risk goals predict a project's ability to stay within an accepted range of performance using mechanisms like trending. The goal will help to determine the calculation method used to compare the actual values against the goals to define a score. Goals for measures are anticipated to vary over the course of a project. For example, if % RPNs over 41 were plotted as a function of time, the slope of the line should be less than $-\frac{1}{2}$.

A performance indicator is the result of the manipulation (or calculation) of actual data versus performance goals; performance indicators can be calculated as percent scores. Performance indicators are a gage of how well certain areas of the project (such as documents, meetings, tasks, and planned visits) are performing at a certain point in time, against a predetermined set of goals. The performance indicator assesses the extent to which the goal was met by the actual data, and produces a score based on a predefined calculation or lookup table (i.e. tiered scoring for the actual data meeting, to varying extents, the goals).

A risk indicator is the result of the manipulation (or calculation) of actual data versus performance goals; indicators can be calculated as percent scores. Risk indicators are a gage of how certain areas of the project (such as documents, meetings, tasks, and planned visits, project teams, parts, and quality gates) will progress based on predetermined goals and trend data. The risk indicator assesses the extent to which the goal was met by the actual data, and produces a score based on a predefined calculation or lookup table (i.e. tiered scoring for the actual data meeting, to varying extents, the goals).

Referring now to FIG. 34, there is shown a graphic illustration of the relation of measures, actual values, goals, and indicators. The schema illustrated in FIG. 34 is used for both performance scoring and risk scoring. At the beginning of the scoring process, project measures are defined prior to the commencement of a project. During the project, actual values are captured and goals are established. Indicators are used to compare the goals against the actual values. The comparison is converted into a score (such as through calculations or a lookup table, for example. If any weights are applicable, they are applied at the indicator, element, and phase levels. Next, the scores are aggregated to product element, phase, and ultimately project performance and risk ratings.

Consider the following example for performance scoring without the application of weights. The performance goal for DFMEA RPNs might be 10% of the values are under 41 during the first phase of the project, while the performance goal for DFMEA RPNs might be 60% of the values are under 41 during the $3^{rd}$ phase. In the Design Failure Mode Effects and Analysis document in the first phase of the project, the Risk Priority Number (measure) has actual values of 38, 40, 39, 41, and 42, 43. The actual data shows 50% RPNs from the DFMEA during the first phase of the project might were under 41. Based on the indicator, the following describes how the result of 50% of the DFMEA RPN values under the 41 threshold would translate into a score of 100%.

| % RPNs lower than 41 | Resulting Score |
|---|---|
| 0-3 | 20% |
| 3-5 | 40% |
| 5-7 | 60% |
| 7-10 | 80% |
| 10+ | 100% |

Consider the following example for risk scoring without the application of weights. If % RPNs over 41 were plotted as a function of time, the goal is that the slope of the line should be less than $-\frac{1}{2}$. % RPNs over 41 have the following actual values: 50%, 47%, 44%, and 41% in as many periods. Assessing the actual data shows that the slope of the line is actually $-\frac{4}{9}$. Based on the indicator, the following describes how the result of $-\frac{4}{9}$ slop of the % of RPN values under the 41 threshold would translate into a score of 90%.

| Slope of % RPNs lower than 41 | Resulting Score |
|---|---|
| 0-(-.2) | 40% |
| (-.2+)-(-.4) | 50% |
| (-.4+)-(-.5) | 90% |
| (-.5+) and lower | 100% |

A weight is a multiplier that increases or decreases the importance of a particular indicator. For instance, for a particular project, the project manager may realize that a particular document is not as important as in other projects, so he will give it a weight to decrease its importance.

In indicator roll-up, indicators are aggregated into element scores. For performance related goals, the elements will be defined by the methodology used on the project, whereas for risk scoring, the elements may or may not be directly tied to expectations identified in the methodology. To illustrate indicator roll-up or aggregation, consider the following examples:

Example 1

The DFMEA is identified as a required document throughout the entire project. Tied to the DFMEA are 3 performance goals for phase one: one for % RPNs under 41, one for % safety-related RPNs under 41 and one for % critical characteristic-related RPNs under 41. The total DFMEA score for the project would be the aggregation of all three goals for that document, after any weighting for the individual goals were applied.

Example 2

The DFMEA is identified as a required document throughout the entire project. Tied to the DFMEA is one risk goal: trend RPN values as a function of time. This risk-oriented goal for the DFMEA will drive the DFMEA element's risk rating.

Example 3

The team list is monitored over the course of the project. Even though the methodology has not specified any team-list expectations for the project, high turnover may be a good indicator of project risk. A risk goal is then established for the project that calls for decreasing turnover rates as the project progresses.

Multiple levels of aggregation may occur for both performance and risk related scoring. In performance scoring, specific indicators are rolled up and are candidates for relative weighting within elements. Elements are further rolled up and are candidates for relative weighting within phases of the project. The phases are then rolled up and are candidates for relative weighting within the entire project. Aggregation within risk scoring is, for the most part, the same as performance scoring. The only exception is that risk is generally not organized into phases; risk exists for the project as a whole across past and future phases.

Project "Performance" refers to taking a historical view of the project determining how the project is doing against a predefined set of criteria (goals). The performance criteria, or goals, are established targets for actual measurements that are defined by the methodology.

Measurements are defined in the methodology through various elements, which include:
- Documents—A logical grouping and presentation of measurements and a description of product and process design and testing
- Tasks—Action items to be completed by team members
- Meetings—A collaboration between two or more parties involved in a project
- Planned Visits—A scheduled time for a customer to discuss project-related concerns with a supplier One element in the methodology may have multiple measurements.

Referring now to FIG. 35, there is shown a graphical representation of performance measurement and scoring according to one embodiment of the present invention. In the example of FIG. 35, the user is informed of his/her actual score and his/her goal in the Planned Visit Area within Phase 3 of the project. The performance measure in this example is "days early" for a planned visit, and the performance goal is the number of days early before Phase 3 of the project. The graph of FIG. 35 indicates that as of today (some date during Phase 3), the days early for the planned visit is 50. The goal to be reached is 75.

System 200 also captures informative risk-related data. This type of data tends to be predictive in nature. Risk reporting encompasses most or all of the areas within system 200, such as:
- Quality Gate Dates—Dates that signify completion of a project milestone
- Documents—A logical grouping of measurements and a description of product and process design and testing
- Tasks—Action items to be completed by team members
- Meetings—A collaboration between two or more parties involved in a project
- Planned Visits—A scheduled time for a customer to discuss project-related concerns with a supplier
- Project Teams—Members of the project with defined roles
- Parts—Products that are being created for a customer by a supplier Risk reporting is used primarily as a tool to help identify trends in different areas. These trends can be viewed in various graphical formats such as bar or line charts. For instance, a Project Manager may wish to monitor team turnover over the life of a project or the number of times a planned visit has been re-scheduled. Viewing these types of risk indicators can help a project manager identify a larger issue, such as low team morale, or a "problem" supplier.

Referring now to FIG. 36, there is shown a graphical representation of risk measurement and scoring according to one embodiment of the present invention. To continue the example previously used in FIG. 35, the user may now want to know how the Planned Visit area will fare through future phases of the project. He/she may now instruct system 200 to calculate the expected scores (both historical and future) of the user's planned visits based on the performance actuals and goals entered into the system. Illustrated on FIG. 36 are the days early of each planned visit (the "Actual" line with diamond symbols, and the days early for each planned visit (the "Goal" line with square symbols). The risk scoring engine of system 200 calculates expected future values based on trends in the historical data for both risk goals and actual risk values. The black solid line of FIG. 36 gives the user an idea of days early to expect based on the actual past performance. The information of FIG. 36 is beneficial to the user as it indicates that he/she will need to improve performance in planned visits in order to meet the initial goal. As the graph illustrates, the initial goal of 100 was set to occur at phase 4. If the user continues to perform at the same level as the previous planned visits, the system estimates that the goal of 100 will not be achieved until Phase 7.

Thus, according to the present invention, project health then becomes an aggregation of project performance and project risk. The overall health could be displayed in a similar context to the example below:

Project Health—87%
Project Performance—98%
 Phase 1—100%
  Documents—80%
   DFMEA—100%
    10% of Safety RPNs<40—100%
    15% of Critical RPNs<40—100%
    DFMEA Weighting: 0.8
   PFMEA—70%
    9% of Safety RPNs<40—100%
    13% of Critical RPNs<40—100%
    PFMEA Weighting: 0.7
  Cross Document Validations—98%
   95% of the Safety Characteristics in the Control Plan=Safety Characteristics in the Characteristics List—98%
   95% of the Critical Characteristics in the Control Plan=Critical Characteristics in the Characteristics List—97%
  Tasks—100%
   Supplier Selection—100%
   Actual Date < or =to Target Date—100%
 Phase 2—96%
  Documents—92%
   Testing Results—98%
    % variability in tensile strength <0.001%—96%
    % variability in color test <0.15%—100%
    % variability in cyclical test load—98%
   PSW—80%
    PSW submission=Approved—80%
  Planned Visits
   PSO—100%
    Actual Date< or =to Target Date—100%
    Planned Visit Resolution=Full Approval—100%
Project Risk—76%
Documents—100%
 DFMEA—100%
  RPN trend < or =(−½)—100%
 Team Rollover—74%
  Team rollover <75%–72%
  Rate of Team stabilization forecast—76%
 Part Number Changes—74%
  Part, revision, or ECNs>2 per month—74%

In the above example, the overall project health was calculated to be 87% (out of 100%). The overall score was determined by averaging the indicators for project performance and project risk. Within project performance, indicators are calculated for each phase or milestone of a project. In this particular project phase (Phase 1), certain documents and tasks have been assigned goals to meet. In addition to goals, the documents were also assigned a weighting factor. The weightings assigned for the DFMEA and the PFMEA indicate that these documents are probably not as important to the overall health of the project as other documents might be. In Phase 2 of the project, certain documents and planned visits determined progress.

When assessing project risk, there is less focus on a certain point in time than with project performance. Within project risk, the documents, teams, and part number changes being assessed are not reported by phase; rather, they indicate overall risk for the project. However, the goals for the risk measures are anticipated to change over the life of the project.

Due to the limitations in scoring systems and methods that project managers and team members currently have available to them, it is evident that the scoring mechanism of system 200 proves invaluable. Through the ability of system 200 to allow users to enter customized goals and weightings for performance and risk goals, system 200 provides flexibility. With the ability to capture data throughout multiple tiers (as opposed to a strict one customer to one supplier relationship), the scoring methodology of system 200 provides a new, more comprehensive way to analyze overall project progress and risk. With the ability to delineate between project performance and project risk, project managers are better able to identify potential concerns before it is too late to make a positive improvement. All of the foregoing analysis can be performed automatically for the users of system 200. If automatically determined, the users can then be notified only if the performance or risk exceeds predefined goals, thereby eliminating the need for the user to remember to periodically check on the health of the project.

Considering some of the actual reports generated by system 200, the Health Check/Quality Gate Scorecard, accessible by selecting "Health Check" button 512, a sample of which is shown in FIG. 37, summarizes the health checks of each quality gate for the selected project. This report analyzes that document set associated with the project against predefined standards or requirements. In one embodiment, those predefined standards or requirements are the PPAP requirements.

Three primary analysis mechanisms are used to generate the Health Check/Quality Gate Scorecard:
1. Document Class Presence: PPAP documents are checked to make certain they were submitted to the subject. If the document is submitted in a final state, it receives 10 out of 10 possible points. If the document is submitted in a draft status, it receives 7 out of 10 possible points. If the document is submitted in a partial status, it receives 3 out of 10 possible points. If the document has not been submitted, it receives 0 out of 10 possible points.
2. Document Quality: Certain documents have key performance indicators (KPIs) associated therewith. These KPIs represent summary data that describes the quality of the design or process the document is referring to. KPIs within a subset of the PPAP documents are compared against predefined criteria that further refine the scoring methods (e.g., percent risk priority numbers (RPNs) greater than or equal to forty).
3. Document Set Consistency: The APQP process dictates that certain documents be present based on data that resides in other documents. System 200 uses these rules to assess the document set as a whole. For example, are enough Gage Repeatability and Reproducibility (GR&Rs) present in the document set based on how many are expected from the Characteristics List? The cross document validation should count the number of GR&Rs and compare this count with the summary element "Number of Characteristics" tied to the Characteristics List document.

Referring now to FIG. 38, there is shown a table for illustration of the application of reporting functions according to one embodiment of the present invention. FIG. 38 shows the documents required by methodology for quality gates 1, 2, 3 and 4 of a project. For example, the methodology of the project requires that documents 2.1, 2.2, and 2.3 be complete for quality gate 2. The table of FIG. 38 indicates that only documents 2.1 and 2.3 are scored for presence at quality gate 2, i.e., at the date set for quality gate 2. If documents 2.1 and 2.3 are both complete, then the document presence score would be 20 out of a possible 20 points. If document 2.1 were complete but document 2.3 were only partially complete, then the document presence score would be 13 out of a possible 20 points.

For the document quality scoring of the Health Check/Quality Gate Scorecard, measurements of information from document 2.1 are assessed against goals set forth in goal 2.1.1 and goal 2.1.2. The extent to which an element of document 2.1 matches a comparable element of either goal 2.1.1 or goal 2.1.2 is examined to determine the score for that element. Aggregation of all of the scores for the measurements of a document results in a document score expressed as a percentage of the possible score. For example, if document 2.1 contains five measurements A, B, C, D, and E, two of which (A and B) are to match comparable values in goal 2.1.1 (A' and B', respectively), and three of which (C, D, and E) are to match comparable values in goal 2.1.2 (C', D', and E', respectively), if the only matches are A to A' and D to D', the document quality score would be 40% (2 matches/5 required matches). Ranges for a "match" can be defined, giving partial match credit for a "close" value.

With regard to the document set consistency portion of the Health Check/Quality Gate Scorecard, also known as cross document validation, the document set is analyzed as a whole to ensure that it "makes sense". In the example of FIG. 38, the question asked is whether goal 2.1.1 exceeds goal 1.62.

The Anonymous Grade Report, accessible by selecting "Anonymous Grade Report" button 513, generates a scorecard report for every project in the supply chain bill of material for tiers below the selected supplier. An example screen printout of one embodiment of an anonymous grade report page is shown in FIG. 39. The Anonymous Grade Report is a view of an entire supply chain's performance to the Health Check/Quality Gate Scorecard. The report is calculated by grading each tier supplier for the selected project. The performance evaluations are summarized to provide the user with an overall grade for the tiers below the selected supplier. The grades of this report are not associated with any customer or supplier as the report is intended to highlight whether risk is present in the supply chain, not where the risk(s) is (are) present.

The Supplier Grade Report, accessible by selecting "Supplier Grade Report" button 514, generates a scorecard for the user's supplier(s). An example screen printout of one embodiment of a supplier grade report is shown in FIG. 40. The report is calculated by grading the various key performance indicators (KPIs) and quality gate documentation for the supplier on all of the projects with the supplier for which the user is a team member with security access to view reports. The performance evaluations of the project are summarized to provide the user with an overall grade for its selected supplier.

The Customer Grade Report, accessible by selecting "Customer Grade Report" button 515, is a scorecard report on the user's projects for a specified customer. An example screen printout of one embodiment of a customer grade report is shown in FIG. 41. The report is calculated by grading the various KPIs and quality gate documentation for the selected customer on all of the projects with the customer for which the user is a team member with security access to view reports. The performance evaluations of the project are summarized to provide the user with an overall grade for the selected customer. This report is intended for use to provide a proactive view to the supplier of how the supplier is performing for a given customer.

In the embodiment of FIGS. 37, 39, 40, and 41, "grades" are given to a project and/or to a tenant in the supply chain. These grades are calculated based on the same criteria as the Health Check/Quality Gate Scorecard. Grades are stored as a percentage and can be displayed as "A", "B", "C", "D", "E", or "F", as "Red", "Yellow", or "Green", or as any other grading system based on percentage ranges that a tenant specifies. Those ranges could be, for example, 0%-50%=F, >50%-60%=E, >60%-70%=D, >70%-80%=C, 78%-90%=B, and 79%-100%=A.

Referring now to FIG. 42, there is shown a screen printout of one embodiment of a message center page according to the present invention. The message center is an area where tasks, meetings, notifications, and bulletin boards are consolidated, independent of their relationship to a project. It is advantageous to consolidate these items into a single area because the items represent the quantitative workload for the user. Message center page 520 is displayed in response to selection of "message center" button 325 of main menu bar 318. Message center page 520 includes message center sidebar 521 having "tasks" selector 522, "notifications" selector 523, "meetings" selector 524, and "bulletin boards" selector 525. In the embodiment of FIG. 42, the user has selected "tasks" selector 522 of message center sidebar 521 to result in display of task list window 526. Displayed in task list window 526 are all tasks for the user across all of the user's projects. Note that the task list includes an association to a specific project, a description of the required effort, and an expected completion date. Tasks for a project can be created by the Project Manager for a project. Once the task is created, it is sent to the corresponding user through the task list. After the task has been completed, a notification is sent back to the user who initiated the task.

If the user selects "notifications" selector 523 of message center sidebar 521, a display is shown of the notifications for that user. A notification is a system-generated alert to certain transactions in system 200. These transactions represent events in the APQP business process that require attention by key members of the project teams in a timely manner, and therefore are "pushed" to the user. Notifications may or may not require an acknowledgement from the user. In one embodiment, notifications produced include: quality gate changes, quality gate closed, quality gate reached, and health check date reached.

If the user selects "meetings" selector 524 of message center sidebar 521, displayed is information about the meetings pertinent to the user (either as an invitee or as the creator of the meeting) across all projects in which that user is a team member. The information displayed is similar to that of FIG. 22, except that it is not limited to a specific project as is displayed in FIG. 22.

If the user selects "bulletin boards" selector 525 of message center sidebar 521, displayed is information about the bulletin boards for that user (either as a participant or as Project Manager) across all projects in which that user is team member. The information displayed is similar to that of FIG. 24, except that it is not limited to a specific project as is displayed in FIG. 24.

In considering the use of system 200, a few examples are set forth herein. The following is a general description of the steps that could be taken for general use of the system of the present invention:

1. The System Administrator sets up at least one entity as a tenant, and creates a Tenant Administrator for at least one tenant. This step is illustrated in FIG. 27, where the system administrator may select "create new tenant" button 442 of tenant list page 440 to create a new tenant, and select "create new tenant administrator" button 443 to create the Tenant Administrator.
2. The Tenant Administrator sets up the tenant hierarchy and creates users. The Tenant Administrator may do so by going to tenants list page 440 as shown in FIGS. 27-30.
3. The tenant's Quality Administrator (defined by the Tenant Administrator (see "tenant admins" selector 455 of tenant sidebar 450 of FIGS. 28-30)) creates the methodologies. The creation of methodologies begins by going to methodologies list page 490 shown in FIG. 31. At methodologies list page 490, the Quality Administrator selects "create new methodology" button 442 and then completes information for that methodology as illustrated, in part, in FIG. 32.
4. The tenant's Parts Administrator (defined by the Tenant Administrator) creates parts (see FIGS. 11-12, for example).
5. A supplier Project Manager works with a customer Project Manager to create a project (See FIGS. 14-15, for example). Generally, when a project is created, the following sub-steps are taken:
    a. A methodology is selected.
    b. Users to participate in the project are selected.
    c. Security levels are set for those users.
    d. Key dates (milestones, deadlines, etc.) are identified. These sub-steps are illustrated, in part, in FIGS. 13-15.
6. Users submit documents to a project (see FIG. 17) in the context of the chosen methodology. A methodology divides a project into phases (See FIGS. 31-32). At the conclusion of each phase is a "quality gate" (see FIG. 16).
7. Throughout the project, users contribute by use of the system's collaboration tools: tasks, notifications, meetings, and bulletin boards.
8. When the supplier has submitted all documents for a quality gate, the customer's Project Manager may close that gate. When all gates are closed, the project is complete.

To further illustrate the method of the present invention, below is a description of the use of system 200 for the project and sub-project relationships of FIG. 7. GM HQ tenant 270 and Lear HQ tenant 272 contact the operator of system 200. In this embodiment, the operator of system 200 charges fees for use of system 200. The operator of system 200 explains the nature of fees and the requirement of all tenants to agree to the operator's services agreement. GM HQ tenant 270 and Lear HQ tenant 272 agree to the operator's services agreement and agree that all tenants producing parts and subparts for the right side interior door trim will likewise participate in system 200.

The System Administrator of system 200 then proceeds to set up the tenants for the supply chain illustrated in FIG. 7. Specifically, the System Administrator enters system 200 by going to www.powerway.com using the web browser installed on the System Administrator's personal computer that is operably connected to the Internet. At login screen 300 (see FIG. 9), the System Administrator enters his/her username and password in user name field 302 and password field 304, respectively. The System Administrator then activates "login" button 308.

Upon activation of "login" button 308, system 200 compares the entered username and password to those in system 200 and determines the entered values to be valid and to belong to the System Administrator of system 200. Then, system 200 displays the home page for the System Administrator (akin to home page 360 of FIG. 10.) At the System Administrator's home page, the System Administrator selects "profiles" button 322 of main menu bar 318.

In response to selection of "profiles" button 322, system 200 displays tenant list page 440 (see FIG. 27). The System Administrator then selects "create new tenant" button 442 to create GM HQ tenant 270, GM N.A. tenant 271 (as a member of the GM HQ tenant family and a child tenant to GM HQ tenant 270), Lear HQ tenant 272, and Lear GM N.A. tenant 273 (as a member of the Lear HQ tenant family and a child tenant of Lear HQ tenant 272).

The System Administrator then returns to tenant list page 440 and selects "create new tenant administrator" button 443 to create tenant administrators for GM N.A. tenant 271 and Lear GM N.A. tenant 273. As shown on FIG. 7, the user names of those tenant administrators are "gmc.mherendeen" and "lea.mherendeen", respectively. The System Administrator may then logoff by selecting "logoff" button 329 of main menu bar 312.

At some point, when any of Siegel Roberts tenant 274, Eaton tenant 275, and LDM tenant 276 agree to participate in system 200, the System Administrator of system 200 returns to system 200 to set up these tenants 274, 275, and 276. Of course, when adding Siegel Roberts tenant 274, Eaton tenant 275, and LDM tenant 276, the System Administrator will also set up a Tenant Administrator for the tenant.

It should be noted that a Tenant Administrator may also set up tenants and Tenant Administrators for any child tenant of the Tenant Administrator's organization. To do so, the Tenant Administrator follows the procedures set forth above for the system administrator.

After a Tenant Administrator for a tenant has been set up by the System Administrator, the system administrator is rarely involved in any other aspect of the system as to that tenant. If the Tenant Administrator has difficulty in working with system 200, the Tenant Administrator may contact Technical Support such as by sending an e-mail to the e-mail address associated with the Technical Support user.

Each Tenant Administrator then enters into system 200 to identify and define key roles for that Tenant. By selecting "profiles" button of main menu bar 312, a Tenant Administrator is taken to tenant list page 440. By selecting a tenant listed (only those tenants for which the Tenant Administrator is defined as the "Tenant Administrator" and those tenants (child tenants) set up by the Tenant Administrator will be listed), the Tenant Administrator is taken to tenant information window 460 (see FIG. 28). The Tenant Administrator may then select "project roles" selector of tenant sidebar 450 to modify, roles, select "tenant admins" selector 455 to define key roles such as The Tenant Administrator, Project Manager, the Quality Administrator, and the Parts Administrator; select "tenant users" selector 454 to create, add, delete, or modify users of the selected tenant; or select any other functions of tenant sidebar 450. The most important roles to be defined and user assigned are those of Quality Administrator, Part Administrator, and Project Manager. The Quality Administrator defines methodologies for that tenant, and the Part Administrator defines parts for that tenant. The tenant Project Manager is the individual who generally sets up projects for that tenant.

The Quality Administrator defines the methodologies to be available for application to the projects (parts) of that tenant. To define methodologies, the Quality Administrator selects "methodologies" button 323 of main menu bar 317. Upon such selection, system 200 takes the Quality Administrator to methodologies list page 490 (see FIG. 31). At methodologies list page 490 (see FIG. 31), the Quality Administrator may create a new methodology by selecting "create new methodology" button 493. For created methodologies, the Quality Administrator can select a listed methodology to invoke methodology information page 498 (See FIG. 32) and the functions of methodology sidebar 494.

The Part Administrator defines the parts to be supplied to or by that tenant. To define the parts, the Part Administrator selects "parts" button 320 of main menu bar 312. Upon selection of "parts" button 320, the Part Administrator is taken to parts list page 340 (see FIG. 11) Because the Part Administrator has authority to define new parts, a "create new part" button would be displayed on parts list page 340 (not shown in FIG. 11). The Part Administrator can create new parts by selecting the "create new part" button, and for created parts, select the part to invoke part information page 350 (See FIG. 12) and the functions of parts sidebar 352.

The tenant level Project manager generally sets up projects for that tenant. To do so, the tenant level Project Manger selects "projects" button of main menu bar 312 to go to project page 360 (see FIG. 13). The tenant level Project Manager can then select "create new project" button 367 to create a new project. Once a project is created, the Project Manager can select the created project on project page 360 to invoke project list page 370 (see FIG. 14). From project list page 370, the Project Manager can invoke any or all of the functions of project sidebar 371.

Generally, the supplier Project Manager and customer Project Manager work together to define the project to which they are the tenants. The Project Managers select the methodologies, designate users to participate as project team members, set security levels for users, and key dates (milestones, deadlines, etc.) are identified.

Throughout the projects, users from GM N.A. tenant 271 and Lear GM N.A. tenant 273 submit documents and collaborate (using tasks, notifications, meetings, and bulletin boards) for first project 277; users from Lear GM N.A. tenant 273 and Siegel Roberts tenant 274 submit documents and collaborate for second project 278; Lear Gm N.A. tenant 273 and Eaton tenant 275 submit documents and collaborate for third project 279; and users from Easton tenant 275 and LDM tenant 276 submit documents and collaborate for fourth project 280.

Also, throughout the projects, tenants 271, 273, 274 and 275 can access reports by invoking "reports" button 324 of main menu bar 312. Doing so takes the user to reports page 510 (See FIG. 33). At reports page 510:

1. A user from GM N.A. tenant 271 can obtain Health Check/Quality Gate Scorecard for first project 277; an anonymous grade report for first project 277, second project 278, third project 279, and fourth project 280; and a supplier grade report for Lear GM N.A. tenant 273.
2. A user from Lear GM N.A. tenant 273 can obtain a Heath Check/Quality Gate Scorecard for each of the first project 277, second project 278, and third project 279; an anonymous grade report for second project 278, or for third and fourth projects 279 and 280; a supplier grade report for Siegel Roberts tenant 274 and Eaton tenant 275; and a customer grade report for GM N.A. tenant 271.
3. A user from Siegel Roberts tenant 274 can obtain a Health Check/Quality Gate Scorecard for second project 278; and a customer grade report for Lear GM N.A. tenant 273 with regard to second project 278.
4. A user from Eaton tenant 275 can obtain a Health Check/ Quality Gate Scorecard for third project 279 and fourth project 280; an anonymous grade report for fourth project 280; a supplier grade report for LDM tenant 276, and a customer grade report for Lear GM N.A. tenant 273 with regard to third project 279.

5. A user from LDM tenant 276 can obtain a Health Check/Quality Gate Scorecard for fourth project 280, and a customer grade report for Eaton tenant 275 with regard to fourth project 280.

When a supplier has submitted all documents required for a quality gate for a project, the customer Project Manager for that project may close that quality gate. When all quality gates for a project are closed, the project is complete. It is thus likely that fourth project 280 will be closed prior to closing of third project 279, and second project 278 and third project 279 will be closed prior to the closing of first project 277.

Relating the operation of system 200 to the Servers of FIG. 4 and the software architecture of FIG. 5, the project state is managed by the BPE (Concentus) application residing on the Web/App Server of production subsystem 211. Each phase/gate combination in a methodology of the project can be thought of as a step in a process flow diagram. It is a function of the BPE to make certain that the application "decides" that it is acceptable to move to the next phase. BPE consults the data associated with the gates of the project to determine what state the project should be in. All activities involving a project are governed by this determined state.

When a work process is initiated, a similar process flow model is invoked to move work items (tasks) to people (roles-users) for their attention. When the work is completed, the BPE determines the next state of the work process.

It will be appreciated by those of skill in the art that system 200 provides many advantages over the prior art. Among those advantages is the ability to measure and identify the source of risk throughout all tiers of a multi-tier supply chain. Such risk measurement and identification is done without the cost and time associated with auditing of suppliers and can be accomplished for all suppliers—not just those who the customer suspects may be contributing risk to the product.

It will also be appreciated that system 200 provides a vehicle for maintenance and compliance with the customer's methodologies. A supplier is "forced" to comply with the methodologies at each quality gate, or the project does not proceed to completion. Also, the customer can assure that the methodologies are up-to-date, and that the latest revision of the methodology is applied. This is advantageous over the prior art that utilized only paper versions of the methodologies and the documents associated therewith. The automation of monitoring and controlling of methodologies helps insure the quality desired and/or required by the customer.

It will also be appreciated that the system of the present invention does not require a significant investment by any tenant. The users access system 200 with a browser on a computing or telecommunication device connected to the Internet. These resources are generally already provided to each user. Further, the only other hardware or software required is Adobe Acrobat reader for reading documents residing in system 200.

It will be further appreciated that the use of standardized rendering of documents provides a standard format for use by all participants. Further, the system provides a means of standardized communication between tenants.

It will be still further appreciated that the system and method of the present invention eliminates delays associated with the paper handling, copying, distribution, analysis, redistribution, and communications associated with manual processes and/or processes consisting only in part of any electronic processing means. Thus, system 200 substantially reduces time-to-market and thereby reduces cost of the product.

It will be yet further appreciated that the system and method of the present invention provide collaboration tools useful to many involved in product and process development. Specifically, users can collaborate by messages, on bulletin boards, in meetings, and in tasks.

It will also be appreciated that the system and method of the present invention not only is useful in planning, as is typically achieved with typical project management software, but is also useful to manage and control progress of the projects by use of methodologies and quality gates. The system and method of the present invention is applicable to a myriad of applications other than APQP as discussed in greater detail herein. Specifically, the system and method are applicable to a series of defined steps, with each step having at least one defined task and at least one defined output associated therewith. Further, the steps should be subject to at least one defined requirement (methodologies) to control the progress of the project through those steps.

It will be further appreciated that the security subsystem of the present invention is multi-faceted. Different levels of security are established based on project roles for both aspects of the project and document classes. This dual level of security is useful to provide appropriate rights to appropriate team members without compromising the confidentiality concerns of the supplier and customer. Also, by use of project roles, the administrator of users (Project Manager) need not make changes or security decisions with each new user. Instead, the new user is assigned a role and the security levels are automatically determined based on that role.

While the specific embodiments of the invention have been described and illustrated, it should be understood that various modifications, substitutions, and alterations can be made hereto without departing from the spirit and scope of the invention as defined in the appended claims and equivalents thereof.

We claim:

1. A system for management of at least one project, each of the at least one projects comprising a part, a supplier that is to supply the part, a customer that is to be supplied the part, at least one methodology applicable to the project, such methodology being indicative of at least one requirement, and at least one control associated with processing of the project, the system comprising: means for processing project data to compare data entered by a user to the at least one methodology to ensure that correct process(es) is (are) followed to establish a manufacturing capability to reliably produce parts of a given quality to a given set of specifications; and means for storing and retrieving the project data, the project data storing and retrieving means operably connected to the processing means, and the project data comprising, for each of the at least one projects, a project identifier to identify the project, a project part identifier to identify the part of the project, a project supplier identifier to identify the supplier of the project, a project customer identifier to identify the customer of the project, data representative of the at least one methodology of the project, and data representative of the at least one control of the project.

2. The system of claim 1, wherein the project data storing and retrieving means comprises memory.

3. The system of claim 1, wherein the project data storing and retrieving means comprises a data storage device.

4. The system of claim 1, further comprising: a user system operably connected to the processing means, such that a user operating the user system is able to selectively retrieve project data stored on the project data storing and retrieving means.

5. The system of claim 4, wherein the connection between the processing means the user system comprises a network.

6. The system of claim 5, wherein the network comprises a global computer network.

7. The system of claim 6, wherein the global computer network comprises the Internet.

8. The system of claim 1, wherein the system is further capable of management of at least one sub-project, each of the at least one sub-projects comprising a part, a supplier that is to supply the part, and a customer that is to be supplied the part, the part of one of the at least one sub-projects comprising a sub-part of the part of one of the at least one projects, the project data further comprising, for each of the at least one sub-projects, a sub-project identifier to identify the sub-project, a sub-project supplier identifier to identify the supplier of the sub-project, and a sub-project customer identifier to identify the customer of the sub-project.

9. The system of claim 1, wherein the project part comprises a family of parts, and wherein the project part identifier includes a descriptive field to distinguish among the family of parts.

10. A method of supply chain management, the supply chain comprising at least one project, each of the at least one projects including apart, a supplier that is to supply the part, and a customer that is to be supplied the part, the method of comprising the steps of: (a) creating and storing, in a computerized system, at least one requirement applicable to at least one of the at least one projects of the supply chain, wherein one of the at least one requirements comprises at least one methodology, the at least one methodology including a document and, for each of the at least one requirements, at least one measurement criterion indicative that the requirement has been satisfied, the at least one measurement criterion comprising a document complete indicator; (b) creating and storing, in the computerized system, a project record representative of one of the at least one projects of the supply chain, the project record including a project identifier, a part identifier to identify the project part, a supplier identifier to identify the project supplier, customer, identifier to identifier the customer, and an indicator of which of the at least one requirements is applicable to the project; (c) monitoring the computerized system for entry of data by the supplier identified by the supplier identifier of the project record; (d) evaluating the entered data to the at least one methodology to ensure that correct process(es) is (are) followed to establish a manufacturing capability to reliably produce parts of a given quality to a given set of specifications for relevance to the at least one requirements applicable to the project, and, if not relevant returning to step (c); and (e) comparing the entered data to the at least one measurement criterion of the relevant at least one requirement, and, if the entered data does not satisfy the at least one measurement criterion, returning to step (c); wherein that in steps (d) and (e) the entered data is compared to the document and the document is checked for completeness to satisfy the document complete indicator.

11. A supply chain management system, the supply chain including at least one project, a supplier to supply the part, and a customer to be supplied the part, the system comprising: a first database comprising data representative of at least one methodology applicable to the project, such methodology being indicative of at least one requirement; a second database comprising a project record for each of the at least one projects, each project record comprising a project identifier, a part identifier, a supplier identifier, and a customer identifier to identify the project, the project part, the project supplier, and the project customer, respectively, and each project record further including an indicator indicating which of the at least one methodologies is (are) applicable to the project; and means for controlling the progress of the at least one project, the controlling means operably connected to the first database and the second database, the controlling means using the indicated methodology(ies) of the project for such control to compare data entered by a user to the at least one methodology to ensure that correct process(es) is (are) followed to establish a manufacturing capability to reliably produce parts of a given quality to a given set of specifications.

12. The system of claim 11, further comprising: collaborating means for data entry and retrieval by a team member of each of the project suppliers and a team member of each of the project customers represented in the second database.

13. The system of claim 12, further comprising: means for establishing at least one task for at least one project, where such task is to be completed by a team member of the project supplier or the project customer.

14. The system of claim 12, further comprising: means for generating at least one notification related to the at least one task, the notification made available to a team member of the project supplier or project supplier who is to complete the task.

15. The system of claim 11, further comprising: a bulletin board for exchange of information between a team member of the project supplier and a team member of the project customer of at least one of the at least one project.

16. The system of 11, further comprising: means for setting up at least one meeting between a team member of the project supplier and a team member of the project customer of at least one of the at least one projects.

17. A supply chain management system, comprising: processing means; data storage and retrieval means operable connected to the processing means, the data storage and retrieval means including a project record representative of a project of the supply chain, the project comprising a project part, a project supplier of the part, and a project customer of the part, the project record including a project identifier identifying the project, a project part identifier identifying the part, a project supplier identifier identifying the project supplier, a project customer identifier identifying the project customers, and data representative of a methodology imposed on the project, such methodology being indicative of at least one requirement, and a sub-project record representative of a sub-project to the project, the sub-project comprising a sub-part which is a sub-part of the project part, sub-project supplier to supply the sub-part, and a sub-project customer to be supplied the sub-part, the sub-project customer the same as the project supplier, the sub-project record including a sub-project identifier identifying the sub-project, a sub-project supplier identifier identifying the sub-project supplier, a sub-project customer identifier identifying the sub-project customer, and data representative of methodology imposed on the sub-project; and an evaluation subsystem operable by the processing means for evaluating the project in view of the project methodology, and for evaluating the sub-project in view of the sub-project methodology, the processing means to compare data entered by a user to the methodology to ensure that correct process(es) is (are) followed to establish a manufacturing capability to reliably produce parts of a given quality to a given set of specifications.

18. The system of claim 17, further comprising: a reporting subsystem operable by the processing means for reporting the evaluation of the project and subproject as determined by the evaluation subsystem.

19. The system of claim 17, wherein the project methodology includes at least one document to be completed, and wherein the evaluation subsystem measures the extent to which the document is complete.

20. The system of claim 17, wherein the project methodology includes a first risk factor, and wherein the evaluation subsystem measures the risk of the project based on the first risk factor.

21. The system of claim 20, wherein the sub-project methodology includes a second risk factor, and wherein the evaluation subsystem measures the risk of the sub-project based on the second risk factor.

22. The system of claim 17, further comprising: a user system operably connected to the processing means, such that a user operating the user system is able to obtain the evaluations made by the evaluation subsystem.

* * * * *